(12) United States Patent
Minnen

(10) Patent No.: US 8,896,531 B2
(45) Date of Patent: *Nov. 25, 2014

(54) FAST FINGERTIP DETECTION FOR INITIALIZING A VISION-BASED HAND TRACKER

(75) Inventor: David Minnen, Santa Monica, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/430,626

(22) Filed: Mar. 26, 2012

(65) Prior Publication Data

US 2012/0326963 A1     Dec. 27, 2012

Related U.S. Application Data

(63) Continuation-in-part of application No. 12/572,689, filed on Oct. 2, 2009, and a continuation-in-part of application No. 12/572,698, filed on Oct. 2, 2009, and a continuation-in-part of application No. 12/109,263, filed on Apr. 24, 2008, now Pat. No. 8,407,725, and a continuation-in-part of application No. 12/417,252, filed on Apr. 2, 2009, and a continuation-in-part of application No. 12/487,623, filed on Jun. 18, 2009, and a continuation-in-part of application No. 12/553,845, filed on Sep. 3, 2009, now Pat. No. 8,531,396, and a continuation-in-part of application No. 12/557,464, filed on Sep. 10, 2009, and a continuation-in-part of application No. 12/579,340, filed on Oct. 14, 2009, and a continuation-in-part of application No. 12/579,372, filed on Oct. 14, 2009, and a continuation-in-part of application No. 12/773,605, filed on May 4, 2010, and a continuation-in-part of application No. 12/789,129, filed on May 27, 2010.

(60) Provisional application No. 61/467,738, filed on Mar. 25, 2011.

(51) Int. Cl.
*G06F 3/033*     (2013.01)

(52) U.S. Cl.
USPC ............ 345/158; 345/174; 345/175; 345/207

(58) Field of Classification Search
CPC ......... G06F 3/017; G06F 3/038; G06F 3/042; G06F 3/0304; G06F 3/0317; G06F 3/0321; G06F 3/0346; G06F 3/0425
USPC .................. 345/156–166, 173–179, 204–215
See application file for complete search history.

(56) References Cited

U.S. PATENT DOCUMENTS 8,407,725 B2 *   3/2013   Kramer et al. ................. 719/318
8,531,396 B2 *   9/2013   Underkoffler et al. ........ 345/158

* cited by examiner

*Primary Examiner* — Vijay Shankar
(74) *Attorney, Agent, or Firm* — IPR Law Group, PC

(57) ABSTRACT

Systems and methods for initializing real-time, vision-based hand tracking systems are described. The systems and methods for initializing the vision-based hand tracking systems image a body and receive gesture data that is absolute three-space data of an instantaneous state of the body at a point in time and space, and at least one of determine an orientation of the body using an appendage of the body and track the body using at least one of the orientation and the gesture data.

110 Claims, 24 Drawing Sheets

1. Depict pose with left hand as viewed from back p = pinkie finger
r = ring finger
m = middle finger
i = index finger
t = thumb ^ = curled non-thumb
\> = curled thumb
| = straight finger or thumb pointed straight up
\ or / = straight finger or thumb pointed at angle
- = thumb pointing straight sideways
x = finger or thumb pointing into plane

| Pose name | p | r | m | i | t |
|---|---|---|---|---|---|
| | | | Hand Pose | | |
| flat | \| | \| | \| | \| | \| |
| fist | ^ | ^ | ^ | ^ | > |
| mime gun | ^ | ^ | ^ | \| | - |
| 2 or peace | ^ | ^ | \ | / | > |
| one-finger point | ^ | ^ | ^ | \| | > |
| two-finger point | ^ | ^ | \| | \| | > |
| x·y·z | ^ | ^ | x | \| | - |
| ok | \| | \| | \| | ^ | > |
| pinkie point | \| | ^ | ^ | ^ | > |
| bracket | x | x | x | x | x |
| 4 | \ | \ | \| | / | > |
| 3 | ^ | \ | \| | / | > |
| 5 | \ | \ | \| | / | / |

FIG. 3

2. Add hand orientation to complete pose must specify two variables:
    1. palm direction (if hand were flat)
    2. finger direction (if hand were flat)

| | |
|---|---|
| - | medial |
| + | lateral |
| x | anterior |
| * | posterior |
| ^ | cranial |
| v | caudal | orientation variables come after colon, e.g.:

| | | |
|---|---|---|
| ^ ^ x \| - : - x | = | x·y·z start position |
| ^ ^ \ / > : * v | = | upside-down v |

FIG. 4

3. Two-hand combos

| Hand 1 | Hand 2 | Pose |
|---|---|---|
| ^ ^ ^ ^ > : x ^ | ^ ^ ^ ^ > : x ^ | full stop |
| ^ ^ ^ \| - : x - | ^ ^ ^ \| - : x ^ | snapshot |
| \| \| \| \| \| : v x | \| \| \| \| \| : - x | rudder and throttle start position |

FIG. 5

| Gest I.D. | Description | Hand 1 Pose | Hand 1 Motion | Hand 2 Pose | Hand 2 Motion |
|---|---|---|---|---|---|
| 1 | point at object (invoke and move cursor) | ^^^\|-:-x | point mime gun | | |
| 2 | select object | ^^^\|-:-x | drop thumb to select | | |
| 3 | move spatially / zoom in / out | ^^x\|-:-x | rotate / translate | | |
| 4 | snapshot | ^^^\|-:x- | make square with 2 hands | ^^^\|-:x^ | make square with 2 hands |
| 5 | demarcate rectangular region | ^^^\|-:x- | make square then adjust size | ^^^\|-:x^ | make square then adjust size |
| 6 | clear the decks | \|\|\|\|-:+x | sweep hand laterally | \|\|\|\|-:-x | sweep hand medially |
| 7 | organize objects into a circle | ^^^\|-:-^ | look through circle of O.K. sign | | |
| 8 | two-finger point at objects | ^^\|\|-:-x | point | | |
| 9 | two-finger select object | ^^\|\|-:-x | drop thumb to select | | |
| 10 | mark start time | xxxx:-^ | strike pose | | |
| 11 | mode change 1 | \|\|\|\|:-^ | strike pose-make "T" with two hands | \|\|\|\|:v- | strike pose-make "T" with two hands |
| 12 | mode change 11 | \|\|\|\|:-^ | strike pose - parallel hands | \|\|\|\|:-^ | strike pose - parallel hands |
| 13 | push back and slide workspace | \|\|\|\|-:x^ | push palm toward screen -- move sideways to find new regions | | |

FIG. 8

| 14 | enter sub-application | ‖‖‖‖ : x ^ strike pose | ‖‖‖‖ : x ^ strike pose |
|---|---|---|---|
| 15 | return from sub-application | ‖‖‖‖ : . ^ strike pose | ‖‖‖‖ : . ^ strike pose |
| 16 | select option | ^^^ \| - : - x medial roll | |
| 17 | roll time forward/back | ‖‖‖‖ : v x Yaw hand at elbow while keeping hand parallel to floor | |
| 18 | stop time | ‖‖‖‖ : x ^ strike pose | |
| 19 | loop time | ^^^ \| - : x ^ circular motion with "L" | |
| 20 | demarcate irregular region | ^^^ \| - : v x start with 2 finger tips together. 1 hand holds start position. | ^^^ \| - : - x other hand traces out shape - select "click" for vertices |
| 21 | tag object | \| ^^^ > : - x pinky-point at object then roll hand medially | |
| 22 | group data streams | ^^^ \| - : v x bring finger tips of two hands together | ^^^ \| - : v x bring finger tips of two hands together |
| 23 | restore encapsulated workspace | ‖‖‖‖ : + x sweep hand medially | ‖‖‖‖ : - x sweep hand laterally |

FIG. 8 first quadword of every slaw

|  | 76543210 | 76543210 | 76543210 | 76543210 |
|---|---|---|---|---|
| length-follows: | 1xxxxxxx | xxxxxxxx | xxxxxxxx | xxxxxxxx |
| eight-byte length: | 11xxxxxx | xxxxxxxx | xxxxxxxx | xxxxxxxx |
|  |  |  |  |  |
| wee cons: | 01xxxxxx | xxxxxxxx | xxxxxxxx | xxxxxxxx |
| wee cons quadlen: | rrqqqqqq | qqqqqqqq | qqqqqqqq | qqqqqqqq |
| wee string: | 001xxxxx | xxxxxxxx | xxxxxxxx | xxxxxxxx |
| wee string quadlen: | rrrqqqqq | qqqqqqqq | qqqqqqqq | qqqqqqqq |
| wee list: | 0001xxxx | xxxxxxxx | xxxxxxxx | xxxxxxxx |
| wee list quadlen: | rrrrqqqq | qqqqqqqq | qqqqqqqq | qqqqqqqq |
|  |  |  |  |  |
| full string: | 1*100000 | 00000000 | 00000000 | 00000001 |
| full cons: | 1*100000 | 00000000 | 00000000 | 00000010 |
|  |  |  |  |  |
| full list: | 1*100000 | 00000000 | 00000000 | 00000011 |

(the penulti-MSB above is zero or one as the length is contained in the next one or two quadwords, i.e. if it's a four or eight byte length, per the 'eight-byte length' bit description second from top)

|  | | | | |
|---|---|---|---|---|
| numeric: | 00001xxx | xxxxxxxx | xxxxxxxx | xxxxxxxx |
|  |  |  |  |  |
| numeric float: | xxxxx1xx | xxxxxxxx | xxxxxxxx | xxxxxxxx |
| numeric complex: | xxxxxx1x | xxxxxxxx | xxxxxxxx | xxxxxxxx |
| numeric unsigned: | xxxxxxx1 | xxxxxxxx | xxxxxxxx | xxxxxxxx |
| numeric wide: | xxxxxxxx | 1xxxxxxx | xxxxxxxx | xxxxxxxx |
| numeric stumpy: | xxxxxxxx | x1xxxxxx | xxxxxxxx | xxxxxxxx |
| numeric reserved: | xxxxxxxx | xx1xxxxx | xxxxxxxx | xxxxxxxx |

FIG. 14B (wide and stumpy conspire to express whether the number in question is 8, 16, 32, or 64 bits long; neither-wide-nor-stumpy, i.e. both zero, is sort of canonical and thus means 32 bits; stumpy alone is 8; stumpy and wide is 16; and just wide is 64)

| | | | | |
|---|---|---|---|---|
| numeric 2-vector: | xxxxxxxx | xxx01xxx | xxxxxxxx | xxxxxxxx |
| numeric 3-vector: | xxxxxxxx | xxx10xxx | xxxxxxxx | xxxxxxxx |
| numeric 4-vector: | xxxxxxxx | xxx11xxx | xxxxxxxx | xxxxxxxx | for any numeric entity, array or not, a size-in-bytes-minus-one is stored in the last eight bits -- if a singleton, this describes the size of the data part; if an array, it's the size of a single element -- so:

| | | | | |
|---|---|---|---|---|
| num'c unit bsize mask: | 00001xxx | xxxxxxxx | xxxxxxxx | mmmmmmmm | and for arrays, there're these:

| | | | | |
|---|---|---|---|---|
| num'c breadth follows: | xxxxxxxx | xxxxx1xx | xxxxxxxx | xxxxxxxx |
| num'c 8-byte breadth: | xxxxxxxx | xxxxx11x | xxxxxxxx | xxxxxxxx |
| num'c wee breadth mask: | xxxxxxxx | xxxxx0mm | mmmmmmmm | xxxxxxxx |

FIG. 14B

FAST FINGERTIP DETECTION FOR INITIALIZING A VISION-BASED HAND TRACKER

RELATED APPLICATIONS

This application claims the benefit of U.S. Patent Application No. 61/467,738, filed Mar. 25, 2011.

This application is a continuation in part application of U.S. patent application Ser. Nos. 12/572,689, 12/572,698, 12/109,263, 12/417,252, 12/487,623, 12/553,845, 12/557,464, 12/579,340, 12/579,372, 12/773,605, and 12/789,129.

TECHNICAL FIELD

Embodiments are described relating to control systems and devices and, more particularly, for detecting and initializing in vision-based tracking systems.

BACKGROUND

Tracking algorithms typically rely on information about the position of the target in previous frames. A critical aspect of all target tracking algorithms is the issue of target acquisition and track initialization. Initialization is the process of simultaneously determining that a new target exists and estimating its position along with any other relevant shape and appearance characteristics. In tracking systems, therefore, continuous hand detection and track initialization is needed to support multiple targets and to recover from errors.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 3 is a diagram of poses in a gesture vocabulary, under an embodiment.

FIG. 4 is a diagram of orientation in a gesture vocabulary, under an embodiment.

FIG. 5 is a diagram of two hand combinations in a gesture vocabulary, under an embodiment.

FIGS. 8/1 and 8/2 show example commands, under an embodiment.

FIGS. 14B1 and 14B2 show a slaw header format, under an embodiment.

DETAILED DESCRIPTION

Figure 1:
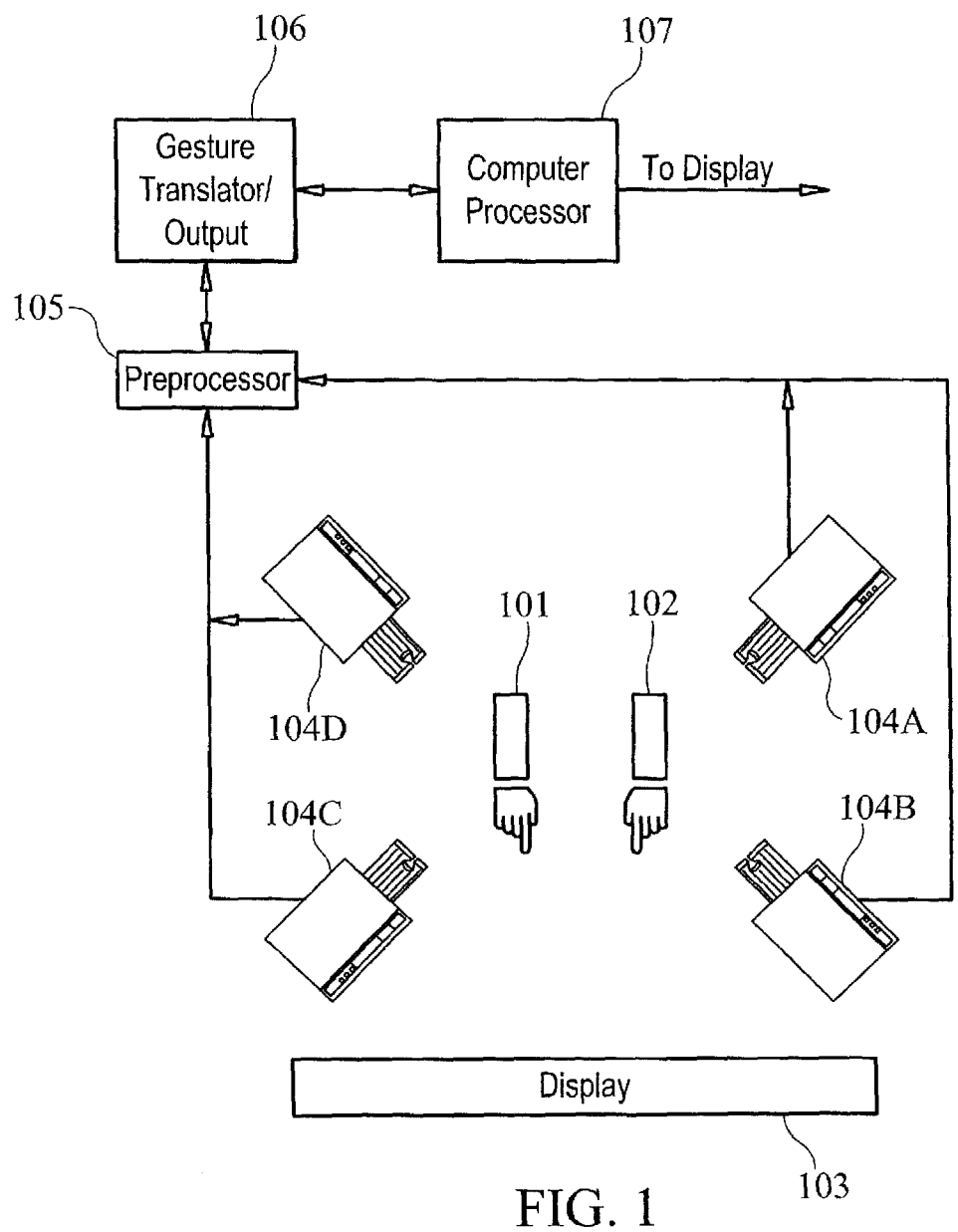
FIG. 1 is a block diagram of a gestural control system, under an embodiment.

Embodiments described herein include systems and methods for initializing real-time, vision-based hand tracking systems. Systems and methods described herein combine fast fingertip detection with robust local hand tracking, but are not so limited. While, when used in isolation, neither component may be wholly sufficient for a reliable gesture-based interface, the combination forms a complementary pair that is robust to a wide range of challenging perceptual scenarios. Embodiments of the systems and methods are provided in the context of a Spatial Operating Environment (SOE), described in detail below. For example, FIG. 1 is a block diagram of a Spatial Operating Environment (SOE), under an embodiment. The SOE, which includes a gestural control system, or gesture-based control system, can alternatively be referred to as a Spatial User Interface (SUI) or a Spatial Interface (SI).

The gestural control system detects, identifies, tracks, and/or localizes the position of one or more user's hands using captured gesture data. The gesture data of an embodiment is absolute three-space data of an instantaneous state of a body at a point in time and space. The gesture data includes but is not limited to one or more of pixels, voxels, pixel data, voxel data, still image data, camera data, video image data, video data, sensor data, depth data, spatial data, and data of volume along a surface implied by depth data. For example, hand tracking as described in particular embodiments herein includes the process of detecting and localizing the position of one or more user's hands in consecutive frames of a video stream. In the context of a spatial operating environment or other gestural interface, such tracking is used to determine when the user is trying to communicate with the system, to provide basic information needed for detecting and recognizing temporally extended gestures, and to allow for real-time control and feedback for interactions such as pointing, dragging, selecting, and other direct manipulations, to name a few.

Tracking algorithms typically rely on information about the position of the target in previous frames. This information, often coupled with shape and appearance characteristics, can help bound and direct the search for the target in new frames. The resulting reduction in the overall computational burden allows for real-time processing rates, while the spatio-temporal context helps distinguish the true location from other locations that are incorrect but visually similar.

A critical aspect of all target tracking algorithms is the issue of target acquisition and track initialization. Initialization is the process of simultaneously determining that a new target exists and estimating its position along with any other relevant shape and appearance characteristics. In a robust system, track initialization is an ongoing process since new targets must be detected whenever they appear. In the case of a gestural interface, the initialization process is tasked with finding each previously unobserved hand when it enters the field of view of a camera or when it becomes visible after temporary occlusion by some other object in the scene. Furthermore, multiple hands may exist in the scene either because more than one user is present or because a single user is using both hands in a coordinated interaction. Finally, false detections may arise due to challenging perceptual input, which can lead to incorrect tracks that distract from the true hand location. In all of these cases, continuous hand detection and track initialization is needed to support multiple targets and to recover from errors.

Fingertip Detection for Track Initialization

Figure 1A:
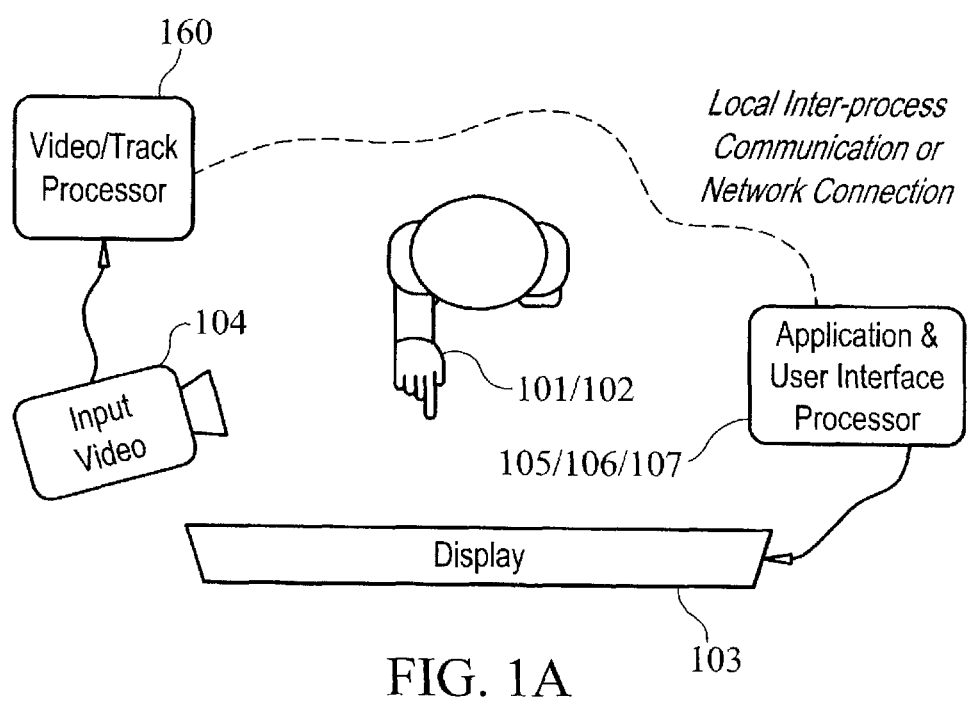
FIG. 1A is a block diagram of a fingertip detection and hand tracking 160 in a gestural control system, under an embodiment.
Figure 1B:
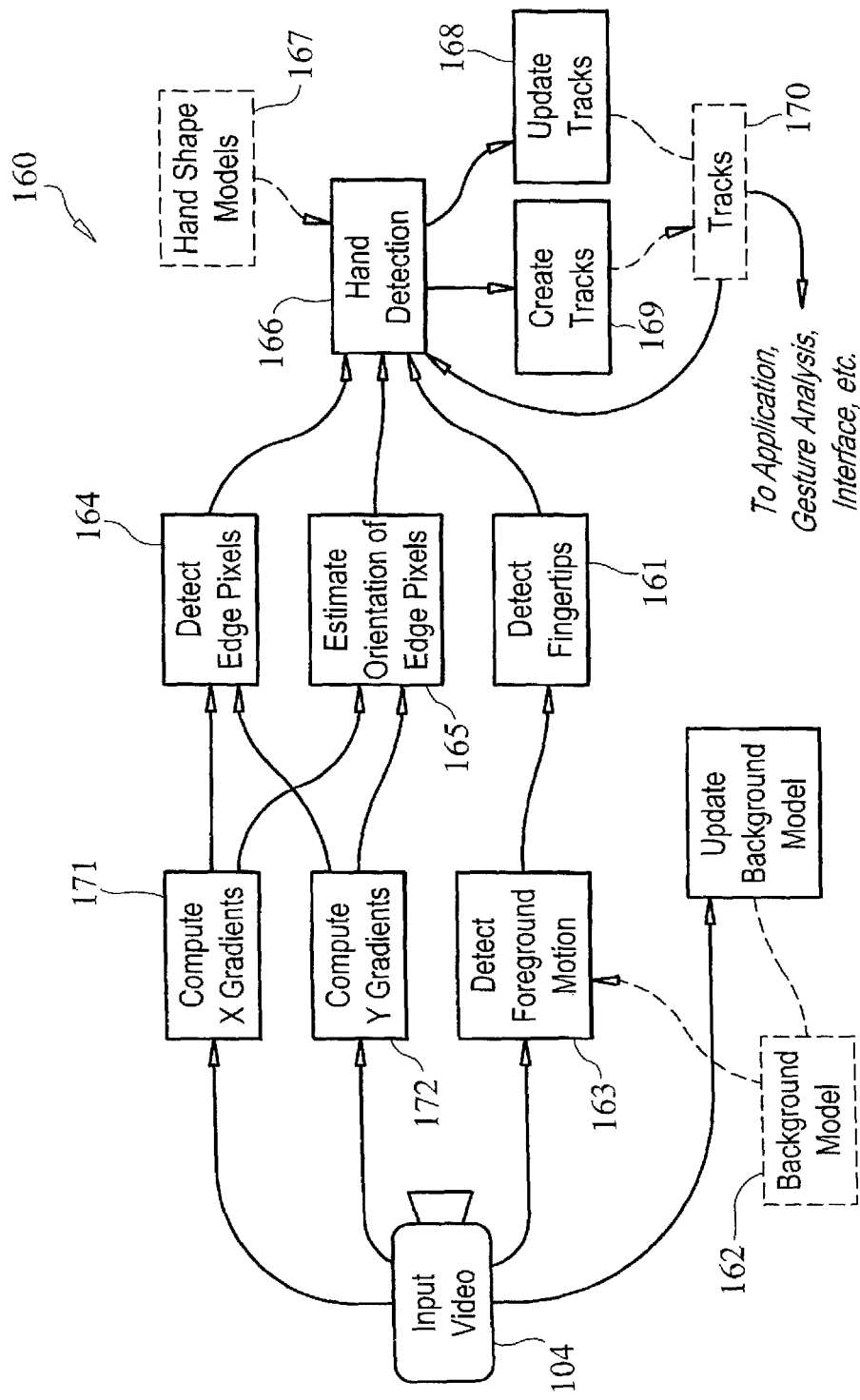
FIG. 1B is a flow diagram for fingertip detection and hand tracking 160, under an embodiment.

FIG. 1A is a block diagram of a fingertip detection and hand tracking 160 in a gestural control system, under an embodiment. FIG. 1B is a flow diagram for fingertip detection and hand tracking 160, under an embodiment. Referring to FIG. 1A, the fingertip detection and hand tracking 160 integrates with the Spatial Operating Environment (SOE) of an embodiment and uses output of the cameras 104 (e.g., 104A-104D of FIG. 1) to generate an input to the application and user interface processor 107 (e.g., one or more of the preprocessor 105, the gesture translator/output 106, and computer processor 107 of FIG. 1) of an embodiment. The application and user interface processor 107 generates a command to control one or more on screen cursors and provides video output to display 103, for example. The SOE is described in detail herein.

In the context of hand tracking, fingertips can provide a reliable indicator that is relatively distinct within the visual field. Even if only coarse foreground/background segmentation is possible, an extended fingertip will show up as a relatively straight group of foreground pixels with a rounded end. One component of the fingertip detection and hand tracking embodiments described herein is the application of an efficient search and classification algorithm for fingertip detection 160.

The fingertip detection algorithm 160 learns how to quickly discriminate between pixel regions that contain a fingertip and those that do not contain a fingertip. The fingertip detection algorithm 160 of an embodiment achieves a high accuracy rate regardless of finger orientation, and, if needed, it can be specialized to only detect fingertips within a particular range of orientations. It is also largely invariant to finger size and view distance over a wide range of typical workstation and desktop scenarios.

The fingertip detection system 160 of an embodiment takes the form of a cascade of conditional classifiers. This cascade model has been used successfully for other computer vision problems such as face and pedestrian detection. The cascade model uses a series of filters and presents a test pixel region to each filter in turn. At every stage, the filter either rejects the region or passes it on to the next level. If the last filter in the cascade accepts the region, then the full model classifies the region as a positive occurrence. If any stage rejects the region, however, then a negative classification is returned. In this way, the cascade can operate very quickly since many pixel regions will be rejected by one of the first few stages, which means that these regions are never processed by the other stages.

For the problem of fingertip detection, custom features are extracted, and the cascade model is trained so that it is specifically tuned to find fingertips in binary (foreground and/or background) images. An embodiment specially orders the different levels of the cascade to help minimize execution time because the model is run across a large number of pixel regions as a pre-processing step for each video frame. The order is determined by balancing the computational cost of computing a particular feature with that feature's ability to correctly identify and reject a wide range of pixel regions. The stages which can be computed quickly and still identify many negative examples are used at the beginning of the cascade.

The features used by the fingertip detection algorithm 160 of an embodiment take two forms, boxes and rings, but the embodiment is not so limited. Each box is specified by its upper-left and lower-right coordinates within the query region and is characterized by the number of foreground pixels within the box. Similarly, a ring is an (unfilled) rectangle within a box. The box feature can be computed very quickly via a summed area table, which is a pre-computed map that gives the sum of all pixels above and to the left of a given pixel. The sum within an arbitrary box can then be computed in constant time by combining four entries from the map as follows, $$\text{sum}(x,y \rightarrow a,b) = \text{sum}(a,b) - \text{sum}(x-1,b) - \text{sum}(a,y-1) + \text{sum}(x-1,y-1)$$

where (x,y) is the upper-left corner and (a,b) is the lower-right corner of the box. Since an embodiment uses a value of zero to represent background pixels and a value of one to represent the foreground, the sum within a box is exactly the number of foreground pixels within that region.

Use of the box feature provides computational benefits as described herein, while providing the ability to quickly reject large regions with too few foreground pixels. For example, in a low-resolution image an embodiment may search for fingertips in pixel regions with size 15×15. However, if the model learns that a fingertip always has at least 10 foreground pixels, then it can reject much larger regions without analyzing each constituent 15×15 square. This follows directly from the fact that, if a large region has less than N foreground pixels, no sub-region can have more than N pixels.

The search for fingertips under an embodiment thus proceeds in a top-down, recursive fashion. Starting with an analysis of the full image, each region is compared against the minimum sum required for a fingertip. If it fails, then no sub-regions are tested. Otherwise, the search continues by dividing the region into quadrants until the subregions match the base size (15×15 in the example). At that point, the rest of the cascade model is used to classify the region.

The cascade model of an embodiment uses the Adaptive Boosting (Adaboost) algorithm to learn a classifier at each level in the cascade, but is not so limited. The weak learners combined by Adaboost are "double stumps", which are similar to standard decision stumps but can have either one or two thresholds, thus dividing the feature space into either two or three regions, respectively. Adaboost uses this weak learner to evaluate the utility of each feature that describes the query pixels.

The features in an embodiment are the many differently sized boxes and rings within the region. For example, in a region of size 15×15, there are 25,425 internal boxes and nearly as many rings. Adaboost incrementally selects features that help discriminate fingertips from non-fingertip regions, and automatically forms a weighted combination of the resulting decision stumps to form a cohesive classifier. The choice of boosted double decision stumps leads to fast, accurate classifiers, though any classifier could be substituted if a different cost/performance trade-off is desired.

Embodiments consider image pre-processing and the complementary nature of initialization and track continuation. While it is possible to detect fingertips directly from a single video frame, such methods are typically quite brittle since they rely on assumptions that will not always be met in realistic environments. The system of an embodiment takes a different approach in order to achieve a higher level of robustness. Each video frame 104 is converted into a binary image with the goal of marking foreground pixels, i.e., those pixels that correspond to the fingers, hand, and arm, with a value of one, while all other pixels are marked with a zero. In general, this process is called "background subtraction" when a background model is estimated, and referred to as "temporal difference" when the background estimate is merely the previous frame. Foreground pixels are then detected by looking for a large difference between the current frame and the corresponding pixel in the background model.

Despite a long history of research into background subtraction methods, no algorithms have emerged that are simultaneously accurate, robust, real-time, and adaptive to environmental changes. Difficulties arise due to the movement of non-foreground objects, illumination changes, shadows, sensor noise, and extended periods when foreground objects are stationary. The system of an embodiment, therefore, functions so that accurate foreground/background segmentation is not necessary. Instead, robustness is achieved by pairing the complementary strengths of fingertip detection and frame-to-frame hand tracking.

Tracking algorithms work well when either the target is easy to detect from a single frame or when the underlying motion is predictable. Since the human hand is a fast, dexterous, visually homogeneous, self-occluding target, its appearance can change dramatically even over short periods of time. In the context of a gestural interface, dynamic, erratic hand motion is common, which makes motion-based prediction difficult. During those times when the hand does follow a smooth trajectory, tracking is very robust. These same motions can complicate background subtraction however, leading to poor fingertip detection results. The opposite scenario also holds true. Fast, irregular movement makes tracking more difficult, but such motions typically lead to clean foreground maps and thus accurate fingertip detection. The insight at the heart of the embodiments herein is that hand tracking and fingertip detection are, individually, only reliable during certain scenarios, but these scenarios are complementary. Therefore, the hand tracking and fingertip detection are paired in an embodiment to take advantage of their strengths while masking any individual weaknesses.

Embodiments integrate fingertip detection and hand tracking as described herein. Referring to FIG. 1B, the fingertip detection algorithm 161 of an embodiment runs as a pre-processing step for each video frame 104 before the tracking algorithm 170 updates its estimates. Each pixel region that is classified as a fingertip provides evidence for a corresponding hand. In addition, the system estimates the orientation 165 of the implied hand by analyzing the foreground pixels along the outer boundary of the fingertip region. The key observation is that the finger itself will extend beyond the fingertip region, so the finger orientation can be estimated by searching for the subsection of the boundary that has the highest concentration of foreground pixels. The hand detection 166 assumes that the hand is located in the direction of the finger opposite from the fingertip. The hand detection 166 can then focus its search in the area predicted by the fingertip and this direction.

Each pixel region with a detected fingertip corresponds to a potential hand. Similarly, the presence of a hand in previous frames provides evidence for that same hand in subsequent frames. The tracking module uses both sources of information to detect hands in new frames.

Several scenarios can arise. A first scenario, referred to as fingertip with existing hand track, occurs when the tracking system has locked on to a moving hand yet the background estimate is still accurate enough to support fingertip detection. The two sources of information support each other, leading the tracking module to allocate additional resources to search the predicted area for the presence of a hand.

A second scenario, referred to as fingertip without hand track, implies track initialization. The only source of information about the hand location comes from the fingertip and from the corresponding estimate of finger orientation. The hand tracking module will search in the predicted area and may determine that no hand is present if insufficient evidence is found. The required evidence depends on the imaging sensor and visual features under consideration. For example, the tracker may look for skin hues, oriented edge pixels that support a hand shape, or pixels with appropriate brightness in a system that uses active illumination. The ability of the tracking module to reject candidates provided by the fingertip detector is an important guard against false detections from an imperfect fingertip classifier (e.g., due to finger-like objects like a pen or pencil or from noise or other inconsistencies in the foreground/background segmentation).

A third scenario is referred to as hand track without fingertip. Under this scenario, such track continuation is a common case when the hand is held still or is moving relatively slowly. In this scenario, the background estimate can become contaminated leading to severe false negatives in the foreground map, which precludes fingertip detection. Regardless, the tracking module generates a hand prediction based on the existing track and can then estimate updated hand pose and appearance parameters.

Fingertip detection can be used for hand acquisition or detection and track recovery when paired with a wide range of tracking algorithms. For example, embodiments have been tested with a tracking algorithm based on an annealed particle filter and with one based on particle swarm optimization. Similarly, the specific visual features used by the tracking algorithm to evaluate the quality of a particular hand estimate (including location, orientation, and other shape or appearance characteristics) are independent of the initialization method of an embodiment. Common cues include color models, constellations of feature points, edge templates, and contours. A detailed description for the particular case of using particle swarm optimization (PSO) for local tracking and a spline-based contour as a hand model is described herein.

Referring to FIG. 1B, when using PSO for local tracking and a spline-based contour as a hand model, a set of hand models 167 are constructed by creating a contour that matches the rough two-dimensional (2D) shape of the hand in each desired pose. For example, it may be desired to track the side view of a pointing hand where the pinky, ring, and middle fingers are curled while the index finger and thumb are extended. The contour itself can be represented by a quadratic b-spline. A background model (BG) 162 is maintained by computing a slowly-adapting running average of the input video frames (I) 104. A foreground image (FG) 163 is computed by marking each pixel with a large difference between the input frame and the background model (i.e., FG=|I−BG|>threshold).

Fingertips are detected 161 by analyzing the foreground image 163 using the cascade model described above. For each fingertip detected, the position and estimated orientation is stored in a list of hand predictions.

An edge image (E) 164 is computed for the input frame 104, by, for example, running the Canny edge detector. The Canny edge detector is an edge detection operator that uses a multi-stage algorithm to detect a wide range of edges in images. An edge orientation image (EO) 165 is computed for each edge pixel in the edge image 164 by calculating the angle implied by the local partial derivatives (i.e., arctan(dy/dx), where (dx,dy) can be computed 171/172 by a wide range of standard low-level vision procedures such as the Sobel or Prewitt operators).

If the hand is already being tracked, its previous estimate is used to form a corresponding prediction 168 for the current frame. If multiple hand hypotheses are being tracked, as is often the case when the visual input is ambiguous, each track generates a separate prediction 169. The list of predictions is analyzed to detect and remove duplicates. Duplicates may arise because the fingertip of a tracked hand was detected or because multiple track hypotheses converged.

For each prediction, PSO is used to efficiently search for the best local hand parameters. PSO works by initializing random particles around the predicted location. Each particle is given a random velocity, which allows it to explore parameter space. The particles remember their personal best discovery (called the "local best") and also know the best parameter values found by any of the particles (called the "global best"). Over the course of several iterations, each particle moves according to its velocity but is also pulled toward its personal best as well as to the global best. The strength of this pull starts small and increases over time to allow for early exploration but to then force the particles into a finer-grained search of the best area of parameter space. After the final iteration, the global best parameter value is reported as the estimate for the target.

As the particles move through parameter space, they score each parameter vector by computing how well the corresponding hand model matches the visual evidence. For example, the parameters are the (x,y) position, scale, and the orientation of the hand contour. So for each parameter setting, the control points of the base hand spline are updated via translation, scaling, and rotation. Samples are then taken along the spline and the local contour orientation is compared to the oriented edges in the edge orientation image 165. Following the approach of Active Shape Models the comparison can be performed by searching along the spline's normal for the closest edge with a matching orientation.

The hand predictions are updated by using the best parameter values found by the corresponding PSO. They are then pruned by removing those with very low score. If the highest scoring prediction exceeds a threshold, it is reported as the current hand location; otherwise the system reports that no hands are present in the current frame. Even when no hand is reported, the system may still keep track of low-scoring hypotheses to aid future detection based on the possibility that there is insufficient visual evidence right now, but additional frames may provide the necessary evidence to either accept or fully reject the hypothesis. Processing of the current frame is complete at this point and the entire process is subsequently repeated with the next video frame.

As an example regarding track initialization, a user approaches a system equipped with a gestural interface. She extends her hand in a pointing gesture to begin controlling a web browser. Up until this point, the system has been sitting idle even though the full tracking system is running. Because there are no existing tracks, there is no need to search for updates in each new frame. Similarly, the lack of motion leads to a relatively empty foreground map (perhaps some sporadic noise causes a few pixels to be classified as part of the foreground). The hierarchical fingertip detection algorithm can thus reject the entire image at the first or second level of recursion instead of individually analyzing each of the hundreds of thousands of possible fingertip-sized regions.

When the user approaches the system and begins the pointing gesture, the system detects the motion and recognizes the fingertip of the extended index finger. The detected fingertip triggers the tracking module to search for a nearby hand and to start tracking it. After a single frame, the system has a rough estimate of the position and shape of the user's hand. After several more frames (still less than 100 ms after the initial motion), the system has locked on to the hand and is prepared to recognize motion patterns (dynamic gestures), special hand shapes (static gestures), and direct manipulations (pointing, selecting, and dragging).

As an example regarding track continuation, in a virtual lightbox application, an editor has imported digital photographs from a recent model shoot and is sorting them to prioritize further processing. The editor is looking at an overview screen with many images and has just found an excellent candidate to lead an upcoming article. She selects the image with a pointing gesture and begins to drag the photo to a region on her second monitor that represents top-rated photos.

At this point, the control system has already locked on to the editor's hand and has recognized the selection gesture. In each new frame, the tracking module makes a prediction for the shape and location of the editor's hand based on the existing track history. It then uses that prediction to perform a focused search for the hand in the new frame, accounting for inevitable prediction noise and minor shape changes. Due to the relatively smooth motion and steady hand posture, the tracking algorithm has no problem maintaining its lock throughout the movement.

As an example involving track recovery, during a presentation at a mining company, a project manager is summarizing the findings from a recent site survey. As the manager describes the survey results, she is controlling a geographic information system (GIS) that contains high-resolution geophysical data aligned to the local terrain. The GIS is operated via a gestural interface that allows the manager to naturally interact with the audience while quickly navigating the virtual terrain and highlighting specific areas of interest.

After finishing a discussion about a potential drill site, the manager initiates a flying gesture to navigate to the next site. At this point, one of the executives in the audience interrupts to ask a question. In response, the manager breaks out of the flying gesture and switches to a selection pose intended to load and display relevant information about the previous drill site.

At the time of interruption, the perceptual system had already locked on to the manager's flying pose and was tracking her hand. The estimated 3D pose was translated into a velocity and 3D trajectory within the virtual world of the GIS. The sudden pose and position change that occurred when the manager switched from flying to a selection gesture caused the tracking module to lose its lock.

Ideally, the system would continue to track through the pose change, but in practice, the sudden motion reversal and complex appearance shift can disrupt even the most sophisticated tracking algorithms. As the manager entered the selection gesture, the vision module was able to estimate a relatively clean foreground/background image and thus detected a fingertip extending from the new hand pose. This detection led to new hand candidates that were then confirmed and extended by the tracker. Thus, although there was a break in the tracking for several frames, the perceptual system recovered quickly, and there was no discernible interruption from the manager's perspective.

As an example involving falser fingertip detection, a security guard uses a gesture-enabled workstation to control and monitor remote video cameras spread across the grounds of a large corporate campus. The workstation includes several LCD monitors that display live video feeds as well as historical video, maps, schedules, and other structural records about the campus. The perception system that enables the gestural interface covers a relatively large portion of the guard's office so that she can interact with the system while sitting or standing in front of any of the monitors.

When the guard moves around the office, the system's background models may be corrupted by the motion and texture of clothes, hair, and movable furniture. Although the models will adapt to changes over time, the intermediate frames will have noisy foreground/background estimates. These temporary errors can lead to arbitrary foreground patterns, which may occasionally look like extended fingers. Since the fingertip detector is based on a local shape and appearance model, it is unable, on its own, to distinguish such patterns from real fingertips. Thus, the detector accepts such regions as fingertips and proposes candidate hand locations for the tracking module.

The hand tracking component, however, is able to incorporate more information from the video feed in order to detect valid hands. Thus, the incorrect proposals based on false fingertip detections will be rejected when the tracker fails to find sufficient visual evidence to corroborate the implied hand. In extreme cases, the tracker may find ambiguous evidence and delay a decision until more information is gathered from subsequent frames. This situation will lead the tracker to create an internal hand hypothesis, but the likelihood that such a hypothesis rises above the activation threshold is quite small. In this way, the hand tracker acts as a safety check for the imperfect fingertip detector while the fingertip detector works to focus the tracker and help it initialize new tracks and recover from tracking errors.

Following are references for fast fingertip detection for initializing a vision-based hand tracker:

Argyros, A. A. and Lourakis, M. Vision-Based Interpretation of Hand Gestures for Remote Control of a Computer Mouse. Computer Vision in Human Computer Interaction, p 40-51, 2006.

Athitsos, V. and Sclaroff, S. Estimating 3D Hand Pose from a Cluttered Image. IEEE Conference on Computer Vision and Pattern Recognition, June 2003.

de Boor, C. A Practical Guide to Splines. Springer-Verlag, 1978.

Canny, J. A Computational Approach To Edge Detection. IEEE Transactions on Pattern Analysis and Machine Intelligence, 8(6):679-98, 1986.

Cootes, T. F., Taylor, C. J., Cooper, D. H., and Graham, J. Active Shape Models—Their Training and Application. Computer Vision and Image Understanding, 61(1), p 38-59, January 1995.

Deutscher, J., Blake, A., and Reid, I. Articulated Body Motion Capture by Annealed Particle Filtering. IEEE Conference on Computer Vision and Pattern Recognition, p 126-133, June 2000.

Fergus, R., Perona, P., and Zisserman, A. Object class recognition by unsupervised scale-invariant learning. IEEE Conference on Computer Vision and Pattern Recognition, 2003.

Freund, Y. and Schapire, R. A short introduction to boosting. Journal of Japanese Society for Artificial Intelligence, 14(5):771-780, September, 1999.

Kennedy, J. and Eberhart, R. C. Swarm Intelligence. Morgan Kaufmann, ISBN 1-55860-595-9, 2001.

Letessier, J. and Berard, F. Visual tracking of bare fingers for interactive surfaces. ACM Symposium on User Interface Software and Technology, Santa Fe, N. Mex., USA p 119-122, 2004.

Viola, P. and Jones, M. Robust Real-time Object Detection. International Journal of Computer Vision, 2001.

Spatial Operating Environment (SOE)

Embodiments of a spatial-continuum input system are described herein in the context of a Spatial Operating Environment (SOE). As an example, FIG. 1 is a block diagram of a Spatial Operating Environment (SOE), under an embodiment. A user locates his hands 101 and 102 in the viewing area 150 of an array of cameras 104A-104D. The cameras detect location, orientation, and movement of the fingers and hands 101 and 102, as spatial tracking data, and generate output signals to pre-processor 105. Pre-processor 105 translates the camera output into a gesture signal that is provided to the computer processing unit 107 of the system. The computer 107 uses the input information to generate a command to control one or more on screen cursors and provides video output to display 103. The systems and methods described in detail above for initializing real-time, vision-based hand tracking systems can be used in the SOE and in analogous systems, for example.

Although the system is shown with a single user's hands as input, the SOE 100 may be implemented using multiple users. In addition, instead of or in addition to hands, the system may track any part or parts of a user's body, including head, feet, legs, arms, elbows, knees, and the like.

In the embodiment shown, four cameras or sensors are used to detect the location, orientation, and movement of the user's hands 101 and 102 in the viewing area 150. It should be understood that the SOE 100 may include more (e.g., six cameras, eight cameras, etc.) or fewer (e.g., two cameras) cameras or sensors without departing from the scope or spirit of the SOE. In addition, although the cameras or sensors are disposed symmetrically in the example embodiment, there is no requirement of such symmetry in the SOE 100. Any number or positioning of cameras or sensors that permits the location, orientation, and movement of the user's hands may be used in the SOE 100.

In one embodiment, the cameras used are motion capture cameras capable of capturing grey-scale images. In one embodiment, the cameras used are those manufactured by Vicon, such as the Vicon MX40 camera. This camera includes on-camera processing and is capable of image capture at 1000 frames per second. A motion capture camera is capable of detecting and locating markers.

In the embodiment described, the cameras are sensors used for optical detection. In other embodiments, the cameras or other detectors may be used for electromagnetic, magnetostatic, RFID, or any other suitable type of detection.

Pre-processor 105 generates three dimensional space point reconstruction and skeletal point labeling. The gesture translator 106 converts the 3D spatial information and marker motion information into a command language that can be interpreted by a computer processor to update the location, shape, and action of a cursor on a display. In an alternate embodiment of the SOE 100, the pre-processor 105 and gesture translator 106 are integrated or combined into a single device.

Computer 107 may be any general purpose computer such as manufactured by Apple, Dell, or any other suitable manufacturer. The computer 107 runs applications and provides display output. Cursor information that would otherwise come from a mouse or other prior art input device now comes from the gesture system.

Marker Tags

The SOE or an embodiment contemplates the use of marker tags on one or more fingers of the user so that the system can locate the hands of the user, identify whether it is viewing a left or right hand, and which fingers are visible. This permits the system to detect the location, orientation, and movement of the user's hands. This information allows a number of gestures to be recognized by the system and used as commands by the user.

The marker tags in one embodiment are physical tags comprising a substrate (appropriate in the present embodiment for affixing to various locations on a human hand) and discrete markers arranged on the substrate's surface in unique identifying patterns.

The markers and the associated external sensing system may operate in any domain (optical, electromagnetic, magnetostatic, etc.) that allows the accurate, precise, and rapid and continuous acquisition of their three-space position. The markers themselves may operate either actively (e.g. by emitting structured electromagnetic pulses) or passively (e.g. by being optically retroreflective, as in the present embodiment).

At each frame of acquisition, the detection system receives the aggregate 'cloud' of recovered three-space locations comprising all markers from tags presently in the instrumented workspace volume (within the visible range of the cameras or other detectors). The markers on each tag are of sufficient multiplicity and are arranged in unique patterns such that the detection system can perform the following tasks: (1) segmentation, in which each recovered marker position is assigned to one and only one subcollection of points that form a single tag; (2) labeling, in which each segmented subcollection of points is identified as a particular tag; (3) location, in which the three-space position of the identified tag is recovered; and (4) orientation, in which the three-space orientation of the identified tag is recovered. Tasks (1) and (2) are made possible through the specific nature of the marker-patterns, as described below and as illustrated in one embodiment in FIG. 2.

The markers on the tags in one embodiment are affixed at a subset of regular grid locations. This underlying grid may, as in the present embodiment, be of the traditional Cartesian sort; or may instead be some other regular plane tessellation (a triangular/hexagonal tiling arrangement, for example). The scale and spacing of the grid is established with respect to the known spatial resolution of the marker-sensing system, so that adjacent grid locations are not likely to be confused. Selection of marker patterns for all tags should satisfy the following constraint: no tag's pattern shall coincide with that of any other tag's pattern through any combination of rotation, translation, or mirroring. The multiplicity and arrangement of markers may further be chosen so that loss (or occlusion) of some specified number of component markers is tolerated: After any arbitrary transformation, it should still be unlikely to confuse the compromised module with any other.

Figure 2:
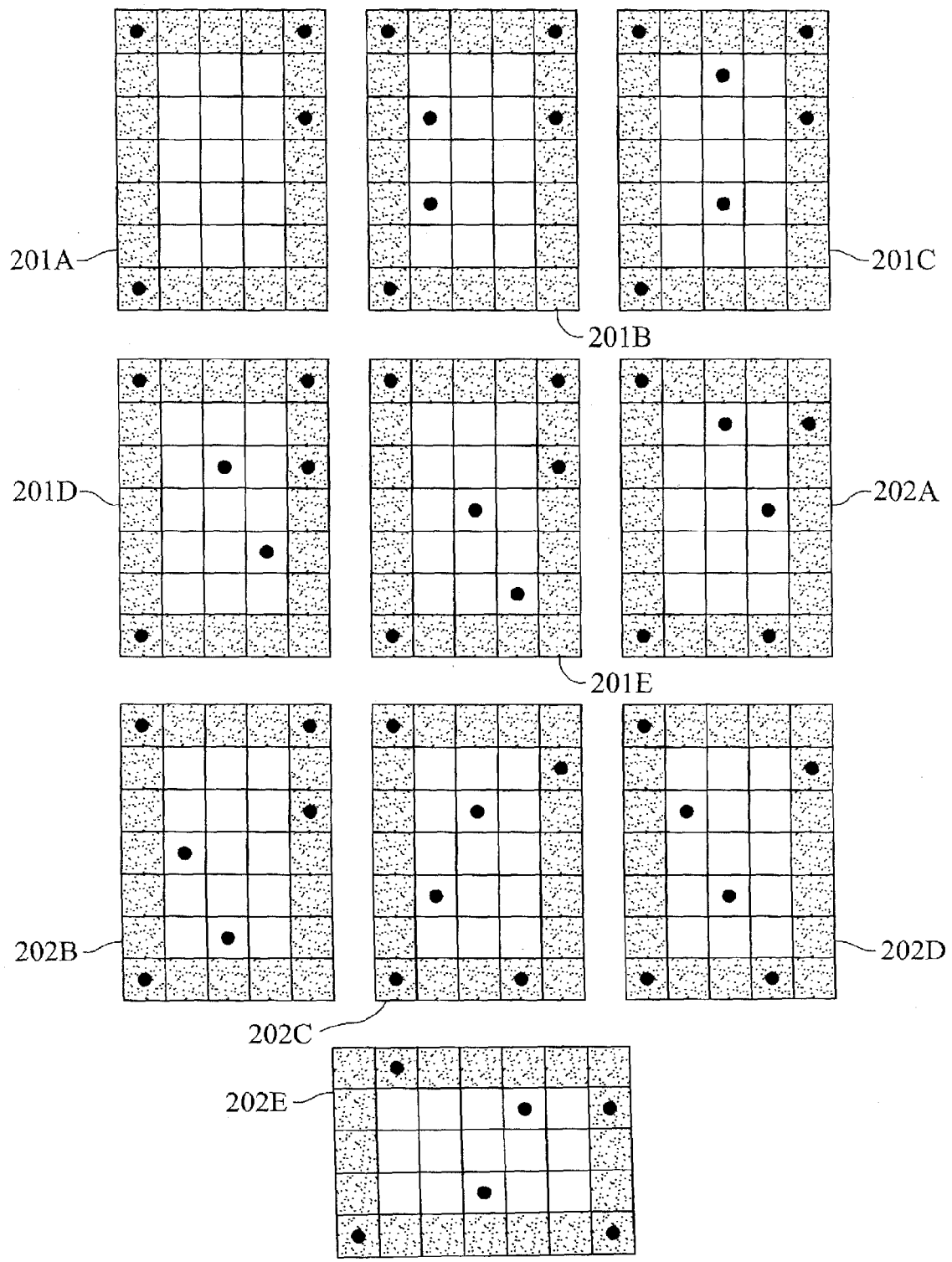
FIG. 2 is a diagram of marking tags, under an embodiment.

Referring now to FIG. 2, a number of tags 201A-201E (left hand) and 202A-202E (right hand) are shown. Each tag is rectangular and consists in this embodiment of a 5×7 grid array. The rectangular shape is chosen as an aid in determining orientation of the tag and to reduce the likelihood of mirror duplicates. In the embodiment shown, there are tags for each finger on each hand. In some embodiments, it may be adequate to use one, two, three, or four tags per hand. Each tag has a border of a different grey-scale or color shade. Within this border is a 3×5 grid array. Markers (represented by the black dots of FIG. 7) are disposed at certain points in the grid array to provide information.

Qualifying information may be encoded in the tags' marker patterns through segmentation of each pattern into 'common' and 'unique' subpatterns. For example, the present embodiment specifies two possible 'border patterns', distributions of markers about a rectangular boundary. A 'family' of tags is thus established—the tags intended for the left hand might thus all use the same border pattern as shown in tags 201A-201E while those attached to the right hand's fingers could be assigned a different pattern as shown in tags 202A-202E. This subpattern is chosen so that in all orientations of the tags, the left pattern can be distinguished from the right pattern. In the example illustrated, the left hand pattern includes a marker in each corner and on marker in a second from corner grid location. The right hand pattern has markers in only two corners and two markers in non corner grid locations. An inspection of the pattern reveals that as long as any three of the four markers are visible, the left hand pattern can be positively distinguished from the left hand pattern. In one embodiment, the color or shade of the border can also be used as an indicator of handedness.

Each tag must of course still employ a unique interior pattern, the markers distributed within its family's common border. In the embodiment shown, it has been found that two markers in the interior grid array are sufficient to uniquely identify each of the ten fingers with no duplication due to rotation or orientation of the fingers. Even if one of the markers is occluded, the combination of the pattern and the handedness of the tag yields a unique identifier.

In the present embodiment, the grid locations are visually present on the rigid substrate as an aid to the (manual) task of affixing each retroreflective marker at its intended location. These grids and the intended marker locations are literally printed via color inkjet printer onto the substrate, which here is a sheet of (initially) flexible 'shrink-film'. Each module is cut from the sheet and then oven-baked, during which thermal treatment each module undergoes a precise and repeatable shrinkage. For a brief interval following this procedure, the cooling tag may be shaped slightly—to follow the longitudinal curve of a finger, for example; thereafter, the substrate is suitably rigid, and markers may be affixed at the indicated grid points.

In one embodiment, the markers themselves are three dimensional, such as small reflective spheres affixed to the substrate via adhesive or some other appropriate means. The three-dimensionality of the markers can be an aid in detection and location over two dimensional markers. However either can be used without departing from the spirit and scope of the SOE described herein.

At present, tags are affixed via Velcro or other appropriate means to a glove worn by the operator or are alternately affixed directly to the operator's fingers using a mild double-stick tape. In a third embodiment, it is possible to dispense altogether with the rigid substrate and affix—or 'paint'— individual markers directly onto the operator's fingers and hands.

Gesture Vocabulary

The SOE of an embodiment contemplates a gesture vocabulary comprising hand poses, orientation, hand combinations, and orientation blends. A notation language is also implemented for designing and communicating poses and gestures in the gesture vocabulary of the SOE. The gesture vocabulary is a system for representing instantaneous 'pose states' of kinematic linkages in compact textual form. The linkages in question may be biological (a human hand, for example; or an entire human body; or a grasshopper leg; or the articulated spine of a lemur) or may instead be nonbiological (e.g. a robotic arm). In any case, the linkage may be simple (the spine) or branching (the hand). The gesture vocabulary system of the SOE establishes for any specific linkage a constant length string; the aggregate of the specific ASCII characters occupying the string's 'character locations' is then a unique description of the instantaneous state, or 'pose', of the linkage.

Hand Poses

FIG. 3 illustrates hand poses in an embodiment of a gesture vocabulary of the SOE, under an embodiment. The SOE supposes that each of the five fingers on a hand is used. These fingers are codes as p-pinkie, r-ring finger, m-middle finger, i-index finger, and t-thumb. A number of poses for the fingers and thumbs are defined and illustrated in FIG. 8. A gesture vocabulary string establishes a single character position for each expressible degree of freedom in the linkage (in this case, a finger). Further, each such degree of freedom is understood to be discretized (or 'quantized'), so that its full range of motion can be expressed through assignment of one of a finite number of standard ASCII characters at that string position. These degrees of freedom are expressed with respect to a body-specific origin and coordinate system (the back of the hand, the center of the grasshopper's body; the base of the robotic arm; etc.). A small number of additional gesture vocabulary character positions are therefore used to express the position and orientation of the linkage 'as a whole' in the more global coordinate system.

Still referring to FIG. 8, a number of poses are defined and identified using ASCII characters. Some of the poses are divided between thumb and non-thumb. The SOE in this embodiment uses a coding such that the ASCII character itself is suggestive of the pose. However, any character may used to represent a pose, whether suggestive or not. In addition, there is no requirement in the embodiments to use ASCII characters for the notation strings. Any suitable symbol, numeral, or other representation maybe used without departing from the scope and spirit of the embodiments. For example, the notation may use two bits per finger if desired or some other number of bits as desired.

A curled finger is represented by the character "^" while a curled thumb by ">". A straight finger or thumb pointing up is indicated by "1" and at an angle by "\" or "/". "-" represents a thumb pointing straight sideways and "x" represents a thumb pointing into the plane.

Using these individual finger and thumb descriptions, a robust number of hand poses can be defined and written using the scheme of the embodiments. Each pose is represented by five characters with the order being p-r-m-i-t as described above. FIG. 8 illustrates a number of poses and a few are described here by way of illustration and example. The hand held flat and parallel to the ground is represented by "11111". A first is represented by "^^^^>". An "OK" sign is represented by "111^>".

The character strings provide the opportunity for straightforward 'human readability' when using suggestive characters. The set of possible characters that describe each degree of freedom may generally be chosen with an eye to quick recognition and evident analogy. For example, a vertical bar ('|') would likely mean that a linkage element is 'straight', an ell ('L') might mean a ninety-degree bend, and a circumflex ('^') could indicate a sharp bend. As noted above, any characters or coding may be used as desired.

Any system employing gesture vocabulary strings such as described herein enjoys the benefit of the high computational efficiency of string comparison—identification of or search for any specified pose literally becomes a 'string compare' (e.g. UNIX's 'strcmp( )' function) between the desired pose string and the instantaneous actual string. Furthermore, the use of 'wildcard characters' provides the programmer or system designer with additional familiar efficiency and efficacy: degrees of freedom whose instantaneous state is irrelevant for a match may be specified as an interrogation point ('?'); additional wildcard meanings may be assigned.

Orientation

In addition to the pose of the fingers and thumb, the orientation of the hand can represent information. Characters describing global-space orientations can also be chosen transparently: the characters '<', '>', '^', and 'v' may be used to indicate, when encountered in an orientation character position, the ideas of left, right, up, and down. FIG. 4 illustrates hand orientation descriptors and examples of coding that combines pose and orientation. In an embodiment, two character positions specify first the direction of the palm and then the direction of the fingers (if they were straight, irrespective of the fingers' actual bends). The possible characters for these two positions express a 'body-centric' notion of orientation: '-', '+', 'x', '*', '^', and 'v' describe medial, lateral, anterior (forward, away from body), posterior (backward, away from body), cranial (upward), and caudal (downward).

In the notation scheme of an embodiment, the five finger pose indicating characters are followed by a colon and then two orientation characters to define a complete command pose. In one embodiment, a start position is referred to as an "xyz" pose where the thumb is pointing straight up, the index finger is pointing forward and the middle finger is perpendicular to the index finger, pointing to the left when the pose is made with the right hand. This is represented by the string "^^x1-:-x".

'XYZ-hand' is a technique for exploiting the geometry of the human hand to allow full six-degree-of-freedom navigation of visually presented three-dimensional structure. Although the technique depends only on the bulk translation and rotation of the operator's hand—so that its fingers may in principal be held in any pose desired—the present embodiment prefers a static configuration in which the index finger points away from the body; the thumb points toward the ceiling; and the middle finger points left-right. The three fingers thus describe (roughly, but with clearly evident intent) the three mutually orthogonal axes of a three-space coordinate system: thus 'XYZ-hand'.

XYZ-hand navigation then proceeds with the hand, fingers in a pose as described above, held before the operator's body at a predetermined 'neutral location'. Access to the three translational and three rotational degrees of freedom of a three-space object (or camera) is effected in the following natural way: left-right movement of the hand (with respect to the body's natural coordinate system) results in movement along the computational context's x-axis; up-down movement of the hand results in movement along the controlled context's y-axis; and forward-back hand movement (toward/away from the operator's body) results in z-axis motion within the context. Similarly, rotation of the operator's hand about the index finger leads to a 'roll' change of the computational context's orientation; 'pitch' and 'yaw' changes are effected analogously, through rotation of the operator's hand about the middle finger and thumb, respectively.

Note that while 'computational context' is used here to refer to the entity being controlled by the XYZ-hand method—and seems to suggest either a synthetic three-space object or camera—it should be understood that the technique is equally useful for controlling the various degrees of freedom of real-world objects: the pan/tilt/roll controls of a video or motion picture camera equipped with appropriate rotational actuators, for example. Further, the physical degrees of freedom afforded by the XYZ-hand posture may be somewhat less literally mapped even in a virtual domain: In the present embodiment, the XYZ-hand is also used to provide navigational access to large panoramic display images, so that left-right and up-down motions of the operator's hand lead to the expected left-right or up-down 'panning' about the image, but forward-back motion of the operator's hand maps to 'zooming' control.

In every case, coupling between the motion of the hand and the induced computational translation/rotation may be either direct (i.e. a positional or rotational offset of the operator's hand maps one-to-one, via some linear or nonlinear function, to a positional or rotational offset of the object or camera in the computational context) or indirect (i.e. positional or rotational offset of the operator's hand maps one-to-one, via some linear or nonlinear function, to a first or higher-degree derivative of position/orientation in the computational context; ongoing integration then effects a non-static change in the computational context's actual zero-order position/orientation). This latter means of control is analogous to use of a an automobile's 'gas pedal', in which a constant offset of the pedal leads, more or less, to a constant vehicle speed.

The 'neutral location' that serves as the real-world XYZ-hand's local six-degree-of-freedom coordinate origin may be established (1) as an absolute position and orientation in space (relative, say, to the enclosing room); (2) as a fixed position and orientation relative to the operator herself (e.g. eight inches in front of the body, ten inches below the chin, and laterally in line with the shoulder plane), irrespective of the overall position and 'heading' of the operator; or (3) interactively, through deliberate secondary action of the operator (using, for example, a gestural command enacted by the operator's 'other' hand, said command indicating that the XYZ-hand's present position and orientation should henceforth be used as the translational and rotational origin).

It is further convenient to provide a 'detent' region (or 'dead zone') about the XYZ-hand's neutral location, such that movements within this volume do not map to movements in the controlled context.

Other poses may included:

[|||||:vx] is a flat hand (thumb parallel to fingers) with palm facing down and fingers forward.

[|||||:x^] is a flat hand with palm facing forward and fingers toward ceiling.

[|||||:-x] is a flat hand with palm facing toward the center of the body (right if left hand, left if right hand) and fingers forward.

[^^^-:-x] is a single-hand thumbs-up (with thumb pointing toward ceiling).

[^^^|-:-x] is a mime gun pointing forward.

Two Hand Combination

The SOE of an embodiment contemplates single hand commands and poses, as well as two-handed commands and poses. FIG. 5 illustrates examples of two hand combinations and associated notation in an embodiment of the SOE. Reviewing the notation of the first example, "full stop" reveals that it comprises two closed fists. The "snapshot" example has the thumb and index finger of each hand extended, thumbs pointing toward each other, defining a goal post shaped frame. The "rudder and throttle start position" is fingers and thumbs pointing up palms facing the screen.

Orientation Blends

Figures 6, 7:
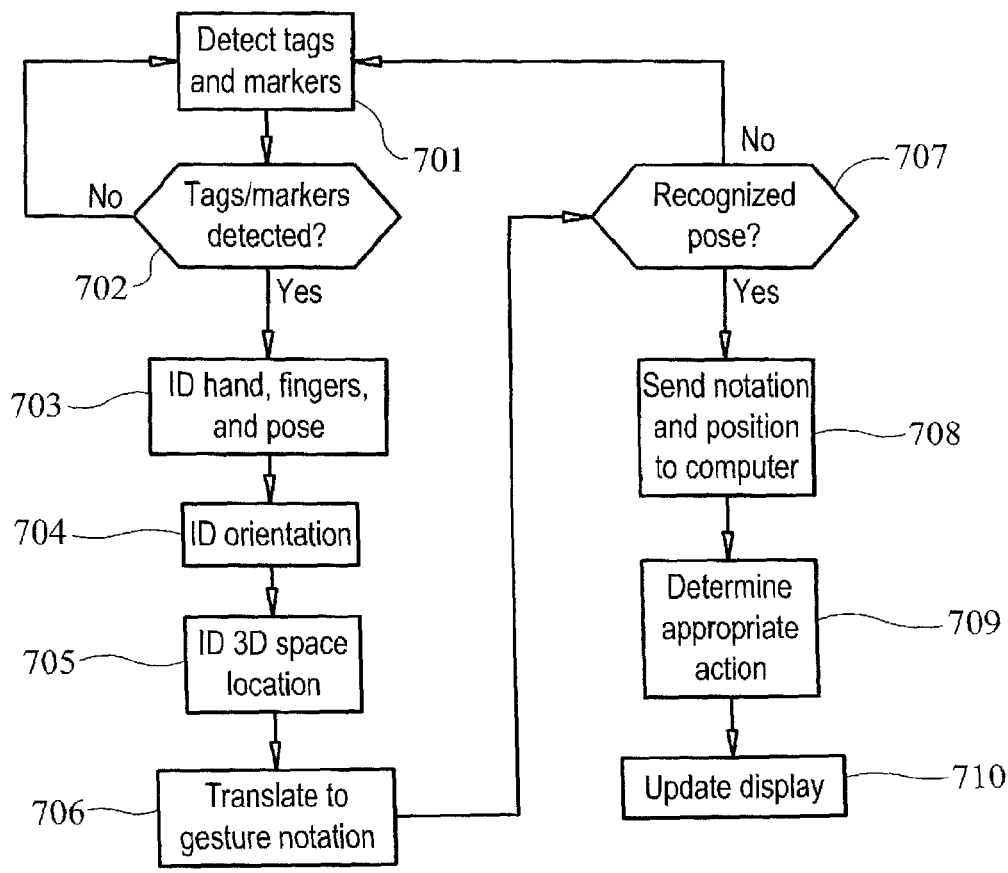
FIG. 6 is a diagram of orientation blends in a gesture vocabulary, under an embodiment.
FIG. 7 is a flow diagram of system operation, under an embodiment.

FIG. 6 illustrates an example of an orientation blend in an embodiment of the SOE. In the example shown the blend is represented by enclosing pairs of orientation notations in parentheses after the finger pose string. For example, the first command shows finger positions of all pointing straight. The first pair of orientation commands would result in the palms being flat toward the display and the second pair has the hands rotating to a 45 degree pitch toward the screen. Although pairs of blends are shown in this example, any number of blends is contemplated in the SOE.

Example Commands

FIGS. 8/1 and 8/2 show a number of possible commands that may be used with the SOE. Although some of the discussion here has been about controlling a cursor on a display, the SOE is not limited to that activity. In fact, the SOE has great application in manipulating any and all data and portions of data on a screen, as well as the state of the display. For example, the commands may be used to take the place of video controls during play back of video media. The commands may be used to pause, fast forward, rewind, and the like. In addition, commands may be implemented to zoom in or zoom out of an image, to change the orientation of an image, to pan in any direction, and the like. The SOE may also be used in lieu of menu commands such as open, close, save, and the like. In other words, any commands or activity that can be imagined can be implemented with hand gestures.

Operation

FIG. 7 is a flow diagram illustrating the operation of the SOE in one embodiment. At 701 the detection system detects the markers and tags. At 702 it is determined if the tags and markers are detected. If not, the system returns to 701. If the tags and markers are detected at 702, the system proceeds to 703. At 703 the system identifies the hand, fingers and pose from the detected tags and markers. At 704 the system identifies the orientation of the pose. At 705 the system identifies the three dimensional spatial location of the hand or hands that are detected. (Please note that any or all of 703, 704, and 705 may be combined).

At 706 the information is translated to the gesture notation described above. At 707 it is determined if the pose is valid. This may be accomplished via a simple string comparison using the generated notation string. If the pose is not valid, the system returns to 701. If the pose is valid, the system sends the notation and position information to the computer at 708. At 709 the computer determines the appropriate action to take in response to the gesture and updates the display accordingly at 710.

In one embodiment of the SOE, 701-705 are accomplished by the on-camera processor. In other embodiments, the processing can be accomplished by the system computer if desired.

Parsing and Translation

The system is able to "parse" and "translate" a stream of low-level gestures recovered by an underlying system, and turn those parsed and translated gestures into a stream of command or event data that can be used to control a broad range of computer applications and systems. These techniques and algorithms may be embodied in a system consisting of computer code that provides both an engine implementing these techniques and a platform for building computer applications that make use of the engine's capabilities.

One embodiment is focused on enabling rich gestural use of human hands in computer interfaces, but is also able to recognize gestures made by other body parts (including, but not limited to arms, torso, legs and the head), as well as non-hand physical tools of various kinds, both static and articulating, including but not limited to calipers, compasses, flexible curve approximators, and pointing devices of various shapes. The markers and tags may be applied to items and tools that may be carried and used by the operator as desired.

The system described here incorporates a number of innovations that make it possible to build gestural systems that are rich in the range of gestures that can be recognized and acted upon, while at the same time providing for easy integration into applications.

The gestural parsing and translation system in one embodiment comprises:

1) a compact and efficient way to specify (encode for use in computer programs) gestures at several different levels of aggregation:

a. a single hand's "pose" (the configuration and orientation of the parts of the hand relative to one another) a single hand's orientation and position in three-dimensional space.

b. two-handed combinations, for either hand taking into account pose, position or both.

c. multi-person combinations; the system can track more than two hands, and so more than one person can cooperatively (or competitively, in the case of game applications) control the target system.

d. sequential gestures in which poses are combined in a series; we call these "animating" gestures.

e. "grapheme" gestures, in which the operator traces shapes in space.

2) a programmatic technique for registering specific gestures from each category above that are relevant to a given application context.

3) algorithms for parsing the gesture stream so that registered gestures can be identified and events encapsulating those gestures can be delivered to relevant application contexts.

The specification system (1), with constituent elements (1a) to (1f), provides the basis for making use of the gestural parsing and translating capabilities of the system described here.

A single-hand "pose" is represented as a string of i) relative orientations between the fingers and the back of the hand, ii) quantized into a small number of discrete states.

Using relative joint orientations allows the system described here to avoid problems associated with differing hand sizes and geometries. No "operator calibration" is required with this system. In addition, specifying poses as a string or collection of relative orientations allows more complex gesture specifications to be easily created by combining pose representations with further filters and specifications.

Using a small number of discrete states for pose specification makes it possible to specify poses compactly as well as to ensure accurate pose recognition using a variety of underlying tracking technologies (for example, passive optical tracking using cameras, active optical tracking using lighted dots and cameras, electromagnetic field tracking, etc).

Gestures in every category (1a) to (1f) may be partially (or minimally) specified, so that non-critical data is ignored. For example, a gesture in which the position of two fingers is definitive, and other finger positions are unimportant, may be represented by a single specification in which the operative positions of the two relevant fingers is given and, within the same string, "wild cards" or generic "ignore these" indicators are listed for the other fingers.

All of the innovations described here for gesture recognition, including but not limited to the multi-layered specification technique, use of relative orientations, quantization of data, and allowance for partial or minimal specification at every level, generalize beyond specification of hand gestures to specification of gestures using other body parts and "manufactured" tools and objects.

The programmatic techniques for "registering gestures" (2), consist of a defined set of Application Programming Interface calls that allow a programmer to define which gestures the engine should make available to other parts of the running system.

These API routines may be used at application set-up time, creating a static interface definition that is used throughout the lifetime of the running application. They may also be used during the course of the run, allowing the interface characteristics to change on the fly. This real-time alteration of the interface makes it possible to, i) build complex contextual and conditional control states, ii) to dynamically add hysterisis to the control environment, and iii) to create applications in which the user is able to alter or extend the interface vocabulary of the running system itself.

Algorithms for parsing the gesture stream (3) compare gestures specified as in (1) and registered as in (2) against incoming low-level gesture data. When a match for a registered gesture is recognized, event data representing the matched gesture is delivered up the stack to running applications.

Efficient real-time matching is desired in the design of this system, and specified gestures are treated as a tree of possibilities that are processed as quickly as possible.

In addition, the primitive comparison operators used internally to recognize specified gestures are also exposed for the applications programmer to use, so that further comparison (flexible state inspection in complex or compound gestures, for example) can happen even from within application contexts.

Recognition "locking" semantics are an innovation of the system described here. These semantics are implied by the registration API (2) (and, to a lesser extent, embedded within the specification vocabulary (1)). Registration API calls include, i) "entry" state notifiers and "continuation" state notifiers, and ii) gesture priority specifiers.

If a gesture has been recognized, its "continuation" conditions take precedence over all "entry" conditions for gestures of the same or lower priorities. This distinction between entry and continuation states adds significantly to perceived system usability.

The system described here includes algorithms for robust operation in the face of real-world data error and uncertainty. Data from low-level tracking systems may be incomplete (for a variety of reasons, including occlusion of markers in optical tracking, network drop-out or processing lag, etc).

Missing data is marked by the parsing system, and interpolated into either "last known" or "most likely" states, depending on the amount and context of the missing data.

If data about a particular gesture component (for example, the orientation of a particular joint) is missing, but the "last known" state of that particular component can be analyzed as physically possible, the system uses this last known state in its real-time matching.

Conversely, if the last known state is analyzed as physically impossible, the system falls back to a "best guess range" for the component, and uses this synthetic data in its real-time matching.

The specification and parsing systems described here have been carefully designed to support "handedness agnosticism," so that for multi-hand gestures either hand is permitted to satisfy pose requirements.

Navigating Data Space

The SOE of an embodiment enables 'pushback', a linear spatial motion of a human operator's hand, or performance of analogously dimensional activity, to control linear verging or trucking motion through a graphical or other data-representational space. The SOE, and the computational and cognitive association established by it, provides a fundamental, structured way to navigate levels of scale, to traverse a principally linear 'depth dimension', or—most generally—to access quantized or 'detented' parameter spaces. The SOE also provides an effective means by which an operator may volitionally acquire additional context: a rapid technique for understanding vicinities and neighborhoods, whether spatial, conceptual, or computational.

In certain embodiments, the pushback technique may employ traditional input devices (e.g. mouse, trackball, integrated sliders or knobs) or may depend on tagged or tracked objects external to the operator's own person (e.g. instrumented kinematic linkages, magnetostatically tracked 'input bricks'). In other alternative embodiments, a pushback implementation may suffice as the whole of a control system.

The SOE of an embodiment is a component of and integrated into a larger spatial interaction system that supplants customary mouse-based graphical user interface ('WIMP' UI) methods for control of a computer, comprising instead (a) physical sensors that can track one or more types of object (e.g., human hands, objects on human hands, inanimate objects, etc.); (b) an analysis component for analyzing the evolving position, orientation, and pose of the sensed hands into a sequence of gestural events; (c) a descriptive scheme for representing such spatial and gestural events; (d) a framework for distributing such events to and within control programs; (e) methods for synchronizing the human intent (the commands) encoded by the stream of gestural events with graphical, aural, and other display-modal depictions of both the event stream itself and of the application-specific consequences of event interpretation, all of which are described in detail below. In such an embodiment, the pushback system is integrated with additional spatial and gestural input-and-interface techniques.

Generally, the navigation of a data space comprises detecting a gesture of a body from gesture data received via a detector. The gesture data is absolute three-space location data of an instantaneous state of the body at a point in time and physical space. The detecting comprises identifying the gesture using the gesture data. The navigating comprises translating the gesture to a gesture signal, and navigating through the data space in response to the gesture signal. The data space is a data-representational space comprising a dataset represented in the physical space.

When an embodiment's overall round-trip latency (hand motion to sensors to pose analysis to pushback interpretation system to computer graphics rendering to display device back to operator's visual system) is kept low (e.g., an embodiment exhibits latency of approximately fifteen milliseconds) and when other parameters of the system are properly tuned, the perceptual consequence of pushback interaction is a distinct sense of physical causality: the SOE literalizes the physically resonant metaphor of pushing against a spring-loaded structure. The perceived causality is a highly effective feedback; along with other more abstract graphical feedback modalities provided by the pushback system, and with a deliberate suppression of certain degrees of freedom in the interpretation of operator movement, such feedback in turn permits stable, reliable, and repeatable use of both gross and fine human motor activity as a control mechanism.

In evaluating the context of the SOE, many datasets are inherently spatial: they represent phenomena, events, measurements, observations, or structure within a literal physical space. For other datasets that are more abstract or that encode literal yet non-spatial information, it is often desirable to prepare a representation (visual, aural, or involving other display modalities) some fundamental aspect of which is controlled by a single, scalar-valued parameter; associating that parameter with a spatial dimension is then frequently also beneficial. It is manipulation of this single scalar parameter, as is detailed below, which benefits from manipulation by means of the pushback mechanism.

Representations may further privilege a small plurality of discrete values of their parameter—indeed, sometimes only one—at which the dataset is optimally regarded. In such cases it is useful to speak of a 'detented parameter' or, if the parameter has been explicitly mapped onto one dimension of a representational space, of 'detented space'. Use of the term 'detented' herein is intended to evoke not only the preferential quantization of the parameter but also the visuo-haptic sensation of ratchets, magnetic alignment mechanisms, jog-shuttle wheels, and the wealth of other worldly devices that are possessed of deliberate mechanical detents.

Self-evident yet crucially important examples of such parameters include but are not limited to (1) the distance of a synthetic camera, in a computer graphics environment, from a renderable representation of a dataset; (2) the density at which data is sampled from the original dataset and converted into renderable form; (3) the temporal index at which samples are retrieved from a time-varying dataset and converted to a renderable representation. These are universal approaches; countless domain-specific parameterizations also exist.

The pushback of the SOE generally aligns the dataset's parameter-control axis with a locally relevant 'depth dimension' in physical space, and allows structured real-world motion along the depth dimension to effect a data-space translation along the control axis. The result is a highly efficient means for navigating a parameter space. Following are detailed descriptions of representative embodiments of the pushback as implemented in the SOE.

In a pushback example, an operator stands at a comfortable distance before a large wall display on which appears a single 'data frame' comprising text and imagery, which graphical data elements may be static or dynamic. The data frame, for example, can include an image, but is not so limited. The data frame, itself a two-dimensional construct, is nonetheless resident in a three-dimensional computer graphics rendering environment whose underlying coordinate system has been arranged to coincide with real-world coordinates convenient for describing the room and its contents, including the display and the operator.

The operator's hands are tracked by sensors that resolve the position and orientation of her fingers, and possibly of the overall hand masses, to high precision and at a high temporal rate; the system analyzes the resulting spatial data in order to characterize the 'pose' of each hand—i.e. the geometric disposition of the fingers relative to each other and to the hand mass. While this example embodiment tracks an object that is a human hand(s), numerous other objects could be tracked as input devices in alternative embodiments. One example is a one-sided pushback scenario in which the body is an operator's hand in the open position, palm facing in a forward direction (along the z-axis) (e.g., toward a display screen in front of the operator). For the purposes of this description, the wall display is taken to occupy the x and y dimensions; z describes the dimension between the operator and the display. The gestural interaction space associated with this pushback embodiment comprises two spaces abutted at a plane of constant z; the detented interval space farther from the display (i.e. closer to the operator) is termed the 'dead zone', while the closer half-space is the 'active zone'. The dead zone extends indefinitely in the backward direction (toward the operator and away from the display) but only a finite distance forward, ending at the dead zone threshold. The active zone extends from the dead zone threshold forward to the display. The data frame(s) rendered on the display are interactively controlled or "pushed back" by movements of the body in the active zone.

The data frame is constructed at a size and aspect ratio precisely matching those of the display, and is positioned and oriented so that its center and normal vector coincide with those physical attributes of the display, although the embodiment is not so limited. The virtual camera used to render the scene is located directly forward from the display and at roughly the distance of the operator. In this context, the rendered frame thus precisely fills the display.

Arranged logically to the left and right of the visible frame are a number of additional coplanar data frames, uniformly spaced and with a modest gap separating each from its immediate neighbors. Because they lie outside the physical/virtual rendering bounds of the computer graphics rendering geometry, these laterally displaced adjacent data frames are not initially visible. As will be seen, the data space—given its geometric structure—is possessed of a single natural detent in the z-direction and a plurality of x-detents.

The operator raises her left hand, held in a loose fist pose, to her shoulder. She then extends the fingers so that they point upward and the thumb so that it points to the right; her palm faces the screen (in the gestural description language described in detail below, this pose transition would be expressed as [^^^>:x^ into ||||-:x^]). The system, detecting the new pose, triggers pushback interaction and immediately records the absolute three-space hand position at which the pose was first entered: this position is used as the 'origin' from which subsequent hand motions will be reported as relative offsets.

Immediately, two concentric, partially transparent glyphs are superimposed on the center of the frame (and thus at the display's center). For example, the glyphs can indicate body pushback gestures in the dead zone up to a point of the dead zone threshold. That the second glyph is smaller than the first glyph is an indication that the operator's hand resides in the dead zone, through which the pushback operation is not 'yet' engaged. As the operator moves her hand forward (toward the dead zone threshold and the display), the second glyph incrementally grows. The second glyph is equivalent in size to the first glyph at the point at which the operator's hand is at the dead zone threshold. The glyphs of this example describe the evolution of the glyph's concentric elements as the operator's hand travels forward from its starting position toward the dead zone threshold separating the dead zone from the active zone. The inner "toothy" part of the glyph, for example, grows as the hand nears the threshold, and is arranged so that the radius of the inner glyph and (static) outer glyph precisely match as the hand reaches the threshold position.

The second glyph shrinks in size inside the first glyph as the operator moves her hand away from the dead zone threshold and away from the display, remaining however always concentric with the first glyph and centered on the display. Crucially, only the z-component of the operator's hand motion is mapped into the glyph's scaling; incidental x- and y-components of the hand motion make no contribution.

When the operator's hand traverses the forward threshold of the dead zone, crossing into the active zone, the pushback mechanism is engaged. The relative z-position of the hand (measured from the threshold) is subjected to a scaling function and the resulting value is used to effect a z-axis displacement of the data frame and its lateral neighbors, so that the rendered image of the frame is seen to recede from the display; the neighboring data frames also then become visible, 'filling in' from the edges of the display space—the constant angular subtent of the synthetic camera geometrically 'captures' more of the plane in which the frames lie as that plane moves away from the camera. The z-displacement is continuously updated, so that the operator, pushing her hand toward the display and pulling it back toward herself, perceives the lateral collection of frames receding and verging in direct response to her movements As an example of a first relative z-axis displacement of the data frame resulting from corresponding pushback, the rendered image of the data frame is seen to recede from the display and the neighboring data frames become visible, 'filling in' from the edges of the display space. The neighboring data frames, which include a number of additional coplanar data frames, are arranged logically to the left and right of the visible frame, uniformly spaced and with a modest gap separating each from its immediate neighbors. As an example of a second relative z-axis displacement of the data frame resulting from corresponding pushback, and considering the first relative z-axis displacement, and assuming further pushing of the operator's hand (pushing further along the z-axis toward the display and away from the operator) from that pushing resulting in the first relative z-axis displacement, the rendered image of the frame is seen to further recede from the display so that additional neighboring data frames become visible, further 'filling in' from the edges of the display space.

The paired concentric glyphs, meanwhile, now exhibit a modified feedback: with the operator's hand in the active zone, the second glyph switches from scaling-based reaction to a rotational reaction in which the hand's physical z-axis offset from the threshold is mapped into a positive (in-plane) angular offset. In an example of the glyphs indicating body pushback gestures in the dead zone beyond the point of the dead zone threshold (along the z-axis toward the display and away from the operator), the glyphs depict the evolution of the glyph once the operator's hand has crossed the dead zone threshold—i.e. when the pushback mechanism has been actively engaged. The operator's hand movements toward and away from the display are thus visually indicated by clockwise and anticlockwise rotation of the second glyph (with the first glyph, as before, providing a static reference state), such that the "toothy" element of the glyph rotates as a linear function of the hand's offset from the threshold, turning linear motion into a rotational representation.

Therefore, in this example, an additional first increment of hand movement along the z-axis toward the display is visually indicated by an incremental clockwise rotation of the second glyph (with the first glyph, as before, providing a static reference state), such that the "toothy" element of the glyph rotates a first amount corresponding to a linear function of the hand's offset from the threshold. An additional second increment of hand movement along the z-axis toward the display is visually indicated by an incremental clockwise rotation of the second glyph (with the first glyph, as before, providing a static reference state), such that the "toothy" element of the glyph rotates a second amount corresponding to a linear function of the hand's offset from the threshold. Further, a third increment of hand movement along the z-axis toward the display is visually indicated by an incremental clockwise rotation of the second glyph (with the first glyph, as before, providing a static reference state), such that the "toothy" element of the glyph rotates a third amount corresponding to a linear function of the hand's offset from the threshold.

In this sample application, a secondary dimensional sensitivity is engaged when the operator's hand is in the active zone: lateral (x-axis) motion of the hand is mapped, again through a possible scaling function, to x-displacement of the horizontal frame sequence. If the scaling function is positive, the effect is one of positional 'following' of the operator's hand, and she perceives that she is sliding the frames left and right. As an example of a lateral x-axis displacement of the data frame resulting from lateral motion of the body, the data frames slide from left to right such that particular data frames disappear or partially disappear from view via the left edge of the display space while additional data frames fill in from the right edge of the display space.

Finally, when the operator causes her hand to exit the palm-forward pose (by, e.g., closing the hand into a fist), the pushback interaction is terminated and the collection of frames is rapidly returned to its original z-detent (i.e. coplanar with the display). Simultaneously, the frame collection is laterally adjusted to achieve x-coincidence of a single frame with the display; which frame ends thus 'display-centered' is whichever was closest to the concentric glyphs' center at the instant of pushback termination: the nearest x-detent. The glyph structure is here seen serving a second function, as a selection reticle, but the embodiment is not so limited. The z- and x-positions of the frame collection are typically allowed to progress to their final display-coincident values over a short time interval in order to provide a visual sense of 'spring-loaded return'.

The pushback system as deployed in this example provides efficient control modalities for (1) acquiring cognitively valuable 'neighborhood context' by variably displacing an aggregate dataset along the direct visual sightline—the depth dimension—thereby bringing more of the dataset into view (in exchange for diminishing the angular subtent of any given part of the dataset); (2) acquiring neighborhood context by variably displacing the laterally-arrayed dataset along its natural horizontal dimension, maintaining the angular subtent of any given section of data but trading the visibility of old data for that of new data, in the familiar sense of 'scrolling'; (3) selecting discretized elements of the dataset through rapid and dimensionally-constrained navigation.

In another example of the pushback of an embodiment, an operator stands immediately next to a waist-level display device whose active surface lies in a horizontal plane parallel to the floor. The coordinate system is here established in a way consistent with that of the previous example: the display surface lies in the x-z plane, so that the y-axis, representing the normal to the surface, is aligned in opposition to the physical gravity vector.

In an example physical scenario in which the body is held horizontally above a table-like display surface, the body is an operator's hand, but the embodiment is not so limited. The pushback interaction is double-sided, so that there is an upper dead zone threshold and a lower dead zone threshold. Additionally, the linear space accessed by the pushback maneuver is provided with discrete spatial detents (e.g., "$1^{st}$ detent", "$2^{nd}$ detent", "$3^{rd}$ detent", "$4^{th}$ detent") in the upper active zone, and discrete spatial detents (e.g., "$1^{st}$ detent", "$2^{nd}$ detent", "$3^{rd}$ detent", "$4^{th}$ detent") in the lower active zone. The interaction space of an embodiment is configured so that a relatively small dead zone comprising an upper dead zone and a lower dead zone is centered at the vertical (y-axis) position at which pushback is engaged, with an active zone above the dead zone and an active zone below the dead zone.

The operator is working with an example dataset that has been analyzed into a stack of discrete parallel planes that are the data frames. The dataset may be arranged that way as a natural consequence of the physical reality it represents (e.g. discrete slices from a tomographic scan, the multiple layers of a three-dimensional integrated circuit, etc.) or because it is logical or informative to separate and discretize the data (e.g., satellite imagery acquired in a number of spectral bands, geographically organized census data with each decade's data in a separate layer, etc.). The visual representation of the data may further be static or include dynamic elements.

During intervals when pushback functionality is not engaged, a single layer is considered 'current' and is represented with visual prominence by the display, and is perceived to be physically coincident with the display. Layers above and below the current layer are in this example not visually manifest (although a compact iconography is used to indicate their presence).

The operator extends his closed right hand over the display; when he opens the hand—fingers extended forward, thumb to the left, and palm pointed downward (transition: [^^^>:vx into ||||−:vx])—the pushback system is engaged. During a brief interval (e.g., 200 milliseconds), some number of layers adjacent to the current layer fade up with differential visibility; each is composited below or above with a blur filter and a transparency whose 'severities' are dependent on the layer's ordinal distance from the current layer.

For example, a layer (e.g., data frame) adjacent to the current layer (e.g., data frame) fades up with differential visibility as the pushback system is engaged. In this example, the stack comprises numerous data frames (any number as appropriate to datasets of the data frames) that can be traversed using the pushback system.

Simultaneously, the concentric feedback glyphs familiar from the previous example appear; in this case, the interaction is configured so that a small dead zone is centered at the vertical (y-axis) position at which pushback is engaged, with an active zone both above and below the dead zone. This arrangement provides assistance in 'regaining' the original layer. The glyphs are in this case accompanied by an additional, simple graphic that indicates directed proximity to successive layers.

While the operator's hand remains in the dead zone, no displacement of the layer stack occurs. The glyphs exhibit a 'preparatory' behavior identical to that in the preceding example, with the inner glyph growing as the hand nears either boundary of the zone (of course, here the behavior is double-sided and symmetric: the inner glyph is at a minimum scale at the hand's starting y-position and grows toward coincidence with the outer glyph whether the hand moves up or down).

As the operator's hand moves upward past the dead zone's upper plane, the inner glyph engages the outer glyph and, as before, further movement of the hand in that direction causes anticlockwise rotational motion of the inner glyph. At the same time, the layer stack begins to 'translate upward': those layers above the originally-current layer take on greater transparency and blur; the originally-current layer itself becomes more transparent and more blurred; and the layers below it move toward more visibility and less blur.

In another example of upward translation of the stack, the previously-current layer takes on greater transparency (becomes invisible in this example), while the layer adjacent to the previously-current layer becomes visible as the presently-current layer. Additionally, layer adjacent to the presently-current layer fades up with differential visibility as the stack translates upward. As described above, the stack comprises numerous data frames (any number as appropriate to datasets of the data frames) that can be traversed using the pushback system.

The layer stack is configured with a mapping between real-world distances (i.e. the displacement of the operator's hand from its initial position, as measured in room coordinates) and the 'logical' distance between successive layers. The translation of the layer stack is, of course, the result of this mapping, as is the instantaneous appearance of the proximity graphic, which meanwhile indicates (at first) a growing distance between the display plane and the current layer; it also indicates that the display plane is at present below the current layer.

The hand's motion continues and the layer stack eventually passes the position at which the current layer and the next one below exactly straddle (i.e. are equidistant from) the display plane; just past this point the proximity graphic changes to indicate that the display plane is now higher than the current layer: 'current layer status' has now been assigned to the next lower layer. In general, the current layer is always the one closest to the physical display plane, and is the one that will be 'selected' when the operator disengages the pushback system.

As the operator continues to raise his hand, each consecutive layer is brought toward the display plane, becoming progressively more resolved, gaining momentary coincidence with the display plane, and then returning toward transparency and blur in favor of the next lower layer. When the operator reverses the direction of his hand's motion, lowering it, the process is reversed, and the inner glyph rotates clockwise. As the hand eventually passes through the dead zone the stack halts with the originally-current layer in precise y-alignment with the display plane; and then y-travel of the stack resumes, bringing into successive focus those planes above the originally-current layer. The operator's overall perception is strongly and simply that he is using his hand to push down and pull up a stack of layers.

When at last the operator releases pushback by closing his hand (or otherwise changing its pose) the system 'springs' the stack into detented y-axis alignment with the display plane, leaving as the current layer whichever was closest to the display plane as pushback was exited. During the brief interval of this positional realignment, all other layers fade back to complete transparency and the feedback glyphs smoothly vanish.

The discretized elements of the dataset (here, layers) of this example are distributed along the principal pushback (depth) axis; previously, the elements (data frames) were coplanar and arrayed laterally, along a dimension orthogonal to the depth axis. This present arrangement, along with the deployment of transparency techniques, means that data is often superimposed—some layers are viewed through others. The operator in this example nevertheless also enjoys (1) a facility for rapidly gaining neighborhood context (what are the contents of the layers above and below the current layer?); and (2) a facility for efficiently selecting and switching among parallel, stacked elements in the dataset. When the operator intends (1) alone, the provision of a dead zone allows him to return confidently to the originally selected layer. Throughout the manipulation, the suppression of two translational dimensions enables speed and accuracy (it is comparatively difficult for most humans to translate a hand vertically with no lateral drift, but the modality as described simply ignores any such lateral displacement).

It is noted that for certain purposes it may be convenient to configure the pushback input space so that the dead zone is of infinitesimal extent; then, as soon as pushback is engaged, its active mechanisms are also engaged. In the second example presented herein this would mean that the originally-current layer is treated no differently—once the pushback maneuver has begun—from any other. Empirically, the linear extent of the dead zone is a matter of operator preference.

The modalities described in this second example are pertinent across a wide variety of displays, including both two-dimensional (whether projected or emissive) and three-dimensional (whether autostereoscopic or not, aerial-image-producing or not, etc.) devices. In high-quality implementations of the latter—i.e. 3D—case, certain characteristics of the medium can vastly aid the perceptual mechanisms that underlie pushback. For example, a combination of parallax, optical depth of field, and ocular accommodation phenomena can allow multiple layers to be apprehended simultaneously, thus eliminating the need to severely fade and blur (or indeed to exclude altogether) layers distant from the display plane. The modalities apply, further, irrespective of the orientation of the display: it may be principally horizontal, as in the example, or may just as usefully be mounted at eye-height on a wall.

An extension to the scenario of this second example depicts the usefulness of two-handed manipulation. In certain applications, translating either the entire layer stack or an individual layer laterally (i.e. in the x and z directions) is necessary. In an embodiment, the operator's other—that is, non-pushback—hand can effect this transformation, for example through a modality in which bringing the hand into close proximity to the display surface allows one of the dataset's layers to be 'slid around', so that its offset x-z position follows that of the hand.

Operators may generally find it convenient and easily tractable to undertake lateral translation and pushback manipulations simultaneously. It is perhaps not wholly fatuous to propose that the assignment of continuous-domain manipulations to one hand and discrete-style work to the other may act to optimize cognitive load.

It is informative to consider yet another example of pushback under the SOE in which there is no natural visual aspect to the dataset. Representative is the problem of monitoring a plurality of audio channels and of intermittently selecting one from among the collection. An application of the pushback system enables such a task in an environment outfitted for aural but not visual output; the modality is remarkably similar to that of the preceding example.

An operator, standing or seated, is listening to a single channel of audio. Conceptually, this audio exists in the vertical plane—called the 'aural plane'—that geometrically includes her ears; additional channels of audio are resident in additional planes parallel to the aural plane but displaced forward and back, along the z-axis.

Opening her hand, held nine inches in front of her, with palm facing forward, she engages the pushback system. The audio in several proximal planes fades up differentially; the volume of each depends inversely on its ordinal distance from the current channel's plane. In practice, it is perceptually unrealistic to allow more than two or four additional channels to become audible. At the same time, an 'audio glyph' fades up to provide proximity feedback. Initially, while the operator's hand is held in the dead zone, the glyph is a barely audible two-note chord (initially in unison).

As the operator moves her hand forward or backward through the dead zone, the volumes of the audio channels remain fixed while that of the glyph increases. When the hand crosses the front or rear threshold of the dead zone, the glyph reaches its 'active' volume (which is still subordinate to the current channel's volume).

Once the operator's hand begins moving through the active zone—in the forward direction, say—the expected effect on the audio channels obtains: the current channel plane is pushed farther from the aural plane, and its volume (and the volumes of those channels still farther forward) is progressively reduced. The volume of each 'dorsal' channel plane, on the other hand, increases as it nears the aural plane.

The audio glyph, meanwhile, has switched modes. The hand's forward progress is accompanied by the rise in frequency of one of the tones; at the 'midway point', when the aural plane bisects one audio channel plane and the next, the tones form an exact fifth (mathematically, it should be a tritone interval, but there is an abundance of reasons that this is to be eschewed). The variable tone's frequency continues rising as the hand continues farther forward, until eventually the operator 'reaches' the next audio plane, at which point the tones span precisely an octave.

Audition of the various channels proceeds, the operator translating her hand forward and back to access each in turn. Finally, to select one she merely closes her hand, concluding the pushback session and causing the collection of audio planes to 'spring' into alignment. The other (non-selected) channels fade to inaudibility, as does the glyph.

This example has illustrated a variant on pushback application in which the same facilities are again afforded: access to neighborhood context and rapid selection of discretized data element (here, an individual audio stream). The scenario substitutes an aural feedback mechanism, and in particular one that exploits the reliable human capacity for discerning certain frequency intervals, to provide the operator with information about whether she is 'close enough' to a target channel to make a selection. This is particularly important in the case of voice channels, in which 'audible' signals are only intermittently present; the continuous nature of the audio feedback glyph leaves it present and legible even when the channel itself has gone silent.

It is noted that if the SOE in this present example includes the capacity for spatialized audio, the perception of successive audio layers receding into the forward distance and approaching from the back (or vice versa) may be greatly enhanced. Further, the opportunity to more literally 'locate' the selected audio plane at the position of the operator, with succeeding layers in front of the operator and preceding layers behind, is usefully exploitable.

Other instantiations of the audio glyph are possible, and indeed the nature of the various channels' contents, including their spectral distributions, tends to dictate which kind of glyph will be most clearly discernible. By way of example, another audio glyph format maintains constant volume but employs periodic clicking, with the interval between clicks proportional to the proximity between the aural plane and the closest audio channel plane. Finally, under certain circumstances, and depending on the acuity of the operator, it is possible to use audio pushback with no feedback glyph at all.

With reference to the pushback mechanism, as the number and density of spatial detents in the dataset's representation increases toward the very large, the space and its parameterization becomes effectively continuous—that is to say, non-detented. Pushback remains nonetheless effective at such extremes, in part because the dataset's 'initial state' prior to each invocation of pushback may be treated as a temporary detent, realized simply as a dead zone.

An application of such non-detented pushback may be found in connection with the idea of an infinitely (or at least substantially) zoomable diagram. Pushback control of zoom functionality associates offset hand position with affine scale value, so that as the operator pushes his hand forward or back the degree of zoom decreases or increases (respectively). The original, pre-pushback zoom state is always readily accessible, however, because the direct mapping of position to zoom parameter insures that returning the control hand to the dead zone also effects return of the zoom value to its initial state.

Each scenario described in the examples above provides a description of the salient aspects of the pushback system and its use under the SOE. It should further be understood that each of the maneuvers described herein can be accurately and comprehensibly undertaken in a second or less, because of the efficiency and precision enabled by allowing a particular kind of perceptual feedback to guide human movement. At other times, operators also find it useful to remain in a single continuous pushback 'session' for tens of seconds: exploratory and context-acquisition goals are well served by pushback over longer intervals.

The examples described above employed a linear mapping of physical input (gesture) space to representational space: translating the control hand by A units in real space always results in a translation by B units [prime] in the representational space, irrespective of the real-space position at which the A-translation is undertaken. However, other mappings are possible. In particular, the degree of fine motor control enjoyed by most human operators allows the use of nonlinear mappings, in which for example differential gestural translations far from the active threshold can translate into larger displacements along the parameterized dimension than do gestural translations near the threshold.

Coincident Virtual/Display and Physical Spaces

The system can provide an environment in which virtual space depicted on one or more display devices ("screens") is treated as coincident with the physical space inhabited by the operator or operators of the system. An embodiment of such an environment is described here. This current embodiment includes three projector-driven screens at fixed locations, is driven by a single desktop computer, and is controlled using the gestural vocabulary and interface system described herein. Note, however, that any number of screens are supported by the techniques being described; that those screens may be mobile (rather than fixed); that the screens may be driven by many independent computers simultaneously; and that the overall system can be controlled by any input device or technique.

The interface system described in this disclosure should have a means of determining the dimensions, orientations and positions of screens in physical space. Given this information, the system is able to dynamically map the physical space in which these screens are located (and which the operators of the system inhabit) as a projection into the virtual space of computer applications running on the system. As part of this automatic mapping, the system also translates the scale, angles, depth, dimensions and other spatial characteristics of the two spaces in a variety of ways, according to the needs of the applications that are hosted by the system.

This continuous translation between physical and virtual space makes possible the consistent and pervasive use of a number of interface techniques that are difficult to achieve on existing application platforms or that must be implemented piece-meal for each application running on existing platforms. These techniques include (but are not limited to):

1) Use of "literal pointing"—using the hands in a gestural interface environment, or using physical pointing tools or devices—as a pervasive and natural interface technique.

2) Automatic compensation for movement or repositioning of screens.

3) Graphics rendering that changes depending on operator position, for example simulating parallax shifts to enhance depth perception.

4) Inclusion of physical objects in on-screen display—taking into account real-world position, orientation, state, etc. For example, an operator standing in front of a large, opaque screen, could see both applications graphics and a representation of the true position of a scale model that is behind the screen (and is, perhaps, moving or changing orientation).

It is important to note that literal pointing is different from the abstract pointing used in mouse-based windowing interfaces and most other contemporary systems. In those systems, the operator must learn to manage a translation between a virtual pointer and a physical pointing device, and must map between the two cognitively.

By contrast, in the systems described in this disclosure, there is no difference between virtual and physical space (except that virtual space is more amenable to mathematical manipulation), either from an application or user perspective, so there is no cognitive translation required of the operator.

The closest analogy for the literal pointing provided by the embodiment described here is the touch-sensitive screen (as found, for example, on many ATM machines). A touch-sensitive screen provides a one to one mapping between the two-dimensional display space on the screen and the two-dimensional input space of the screen surface. In an analogous fashion, the systems described here provide a flexible mapping (possibly, but not necessarily, one to one) between a virtual space displayed on one or more screens and the physical space inhabited by the operator. Despite the usefulness of the analogy, it is worth understanding that the extension of this "mapping approach" to three dimensions, an arbritrarialy large architectural environment, and multiple screens is non-trivial.

In addition to the components described herein, the system may also implement algorithms implementing a continuous, systems-level mapping (perhaps modified by rotation, translation, scaling or other geometrical transformations) between the physical space of the environment and the display space on each screen.

A rendering stack which takes the computational objects and the mapping and outputs a graphical representation of the virtual space.

An input events processing stack which takes event data from a control system (in the current embodiment both gestural and pointing data from the system and mouse input) and maps spatial data from input events to coordinates in virtual space. Translated events are then delivered to running applications.

A "glue layer" allowing the system to host applications running across several computers on a local area network.

Embodiments of a spatial-continuum input system are described herein as comprising network-based data representation, transit, and interchange that includes a system called "plasma" that comprises subsystems "slawx", "proteins", and "pools", as described in detail below. The pools and proteins are components of methods and systems described herein for encapsulating data that is to be shared between or across processes. These mechanisms also include slawx (plural of "slaw") in addition to the proteins and pools. Generally, slawx provide the lowest-level of data definition for inter-process exchange, proteins provide mid-level structure and hooks for querying and filtering, and pools provide for high-level organization and access semantics. Slawx include a mechanism for efficient, platform-independent data representation and access. Proteins provide a data encapsulation and transport scheme using slawx as the payload. Pools provide structured and flexible aggregation, ordering, filtering, and distribution of proteins within a process, among local processes, across a network between remote or distributed processes, and via longer term (e.g. on-disk, etc.) storage.

The configuration and implementation of the embodiments described herein include several constructs that together enable numerous capabilities. For example, the embodiments described herein provide efficient exchange of data between large numbers of processes as described above. The embodiments described herein also provide flexible data "typing" and structure, so that widely varying kinds and uses of data are supported. Furthermore, embodiments described herein include flexible mechanisms for data exchange (e.g., local memory, disk, network, etc.), all driven by substantially similar application programming interfaces (APIs). Moreover, embodiments described enable data exchange between processes written in different programming languages. Additionally, embodiments described herein enable automatic maintenance of data caching and aggregate state.

Figure 9:
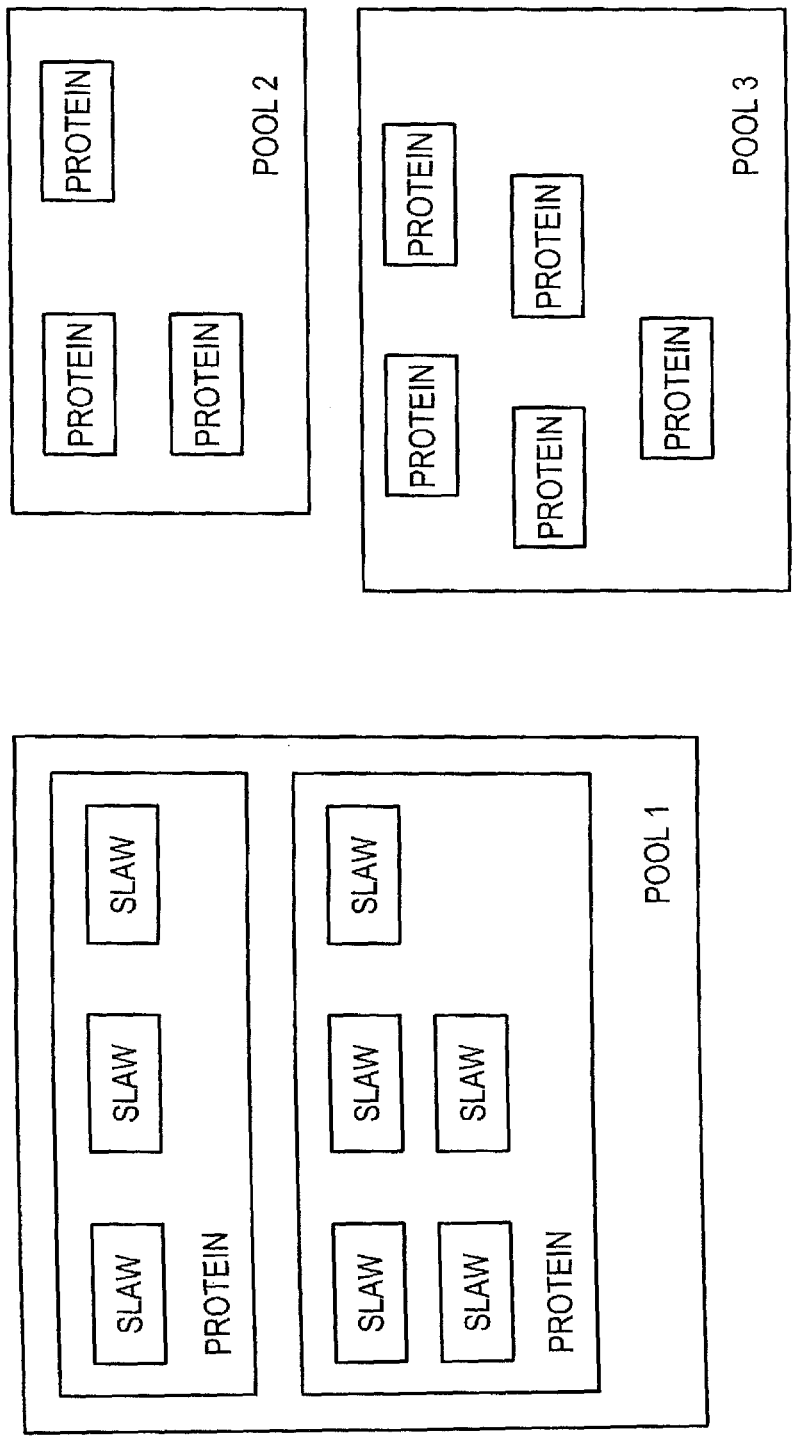
FIG. 9 is a block diagram of a processing environment including data representations using slawx, proteins, and pools, under an embodiment.

FIG. 9 is a block diagram of a processing environment including data representations using slawx, proteins, and pools, under an embodiment. The principal constructs of the embodiments presented herein include slawx (plural of "slaw"), proteins, and pools. Slawx as described herein includes a mechanism for efficient, platform-independent data representation and access. Proteins, as described in detail herein, provide a data encapsulation and transport scheme, and the payload of a protein of an embodiment includes slawx. Pools, as described herein, provide structured yet flexible aggregation, ordering, filtering, and distribution of proteins. The pools provide access to data, by virtue of proteins, within a process, among local processes, across a network between remote or distributed processes, and via 'longer term' (e.g. on-disk) storage.

Figure 10:
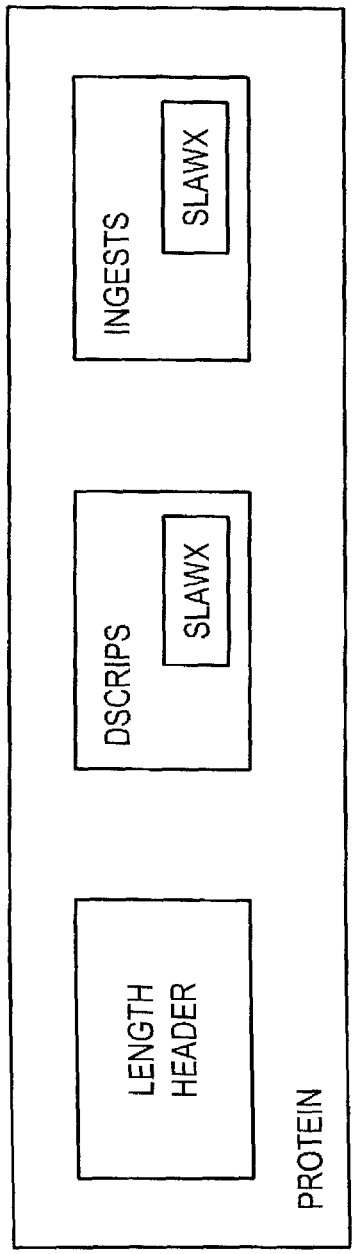
FIG. 10 is a block diagram of a protein, under an embodiment.

FIG. 10 is a block diagram of a protein, under an embodiment. The protein includes a length header, a descrip, and an ingest. Each of the descrip and ingest includes slaw or slawx, as described in detail below.

Figure 11:
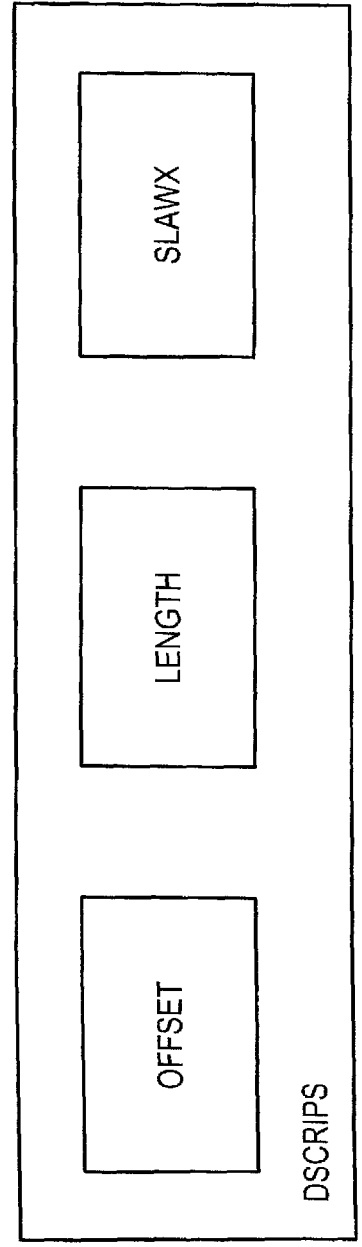
FIG. 11 is a block diagram of a descrip, under an embodiment.

FIG. 11 is a block diagram of a descrip, under an embodiment. The descrip includes an offset, a length, and slawx, as described in detail below.

Figure 12:
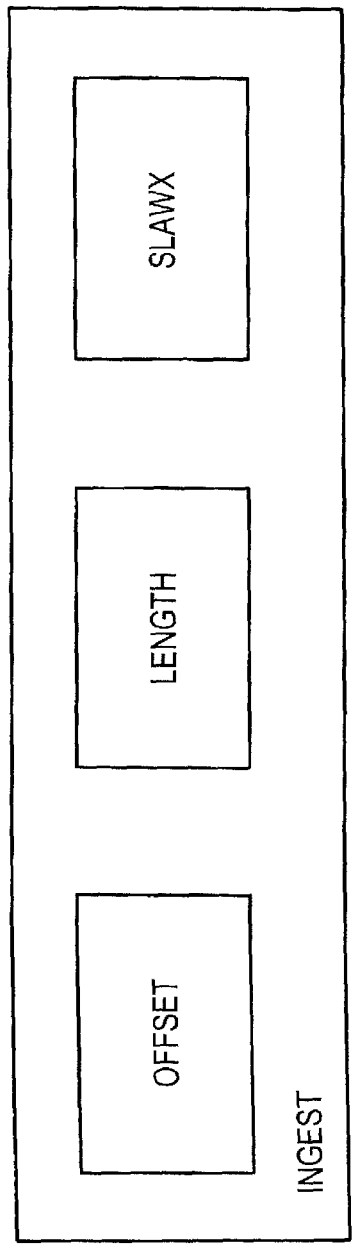
FIG. 12 is a block diagram of an ingest, under an embodiment.

FIG. 12 is a block diagram of an ingest, under an embodiment. The ingest includes an offset, a length, and slawx, as described in detail below.

Figure 13:
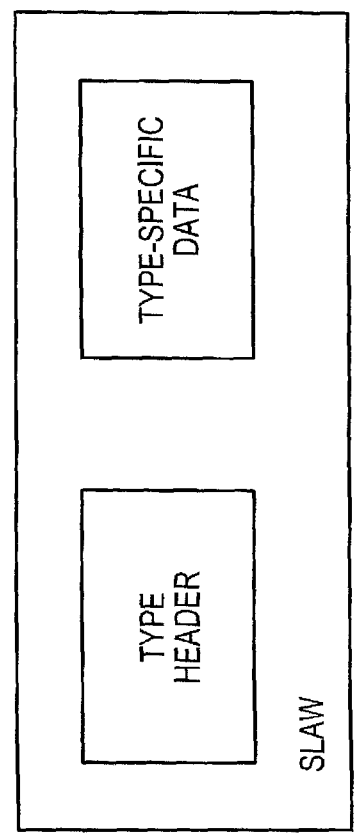
FIG. 13 is a block diagram of a slaw, under an embodiment.

FIG. 13 is a block diagram of a slaw, under an embodiment. The slaw includes a type header and type-specific data, as described in detail below.

Figure 14A:
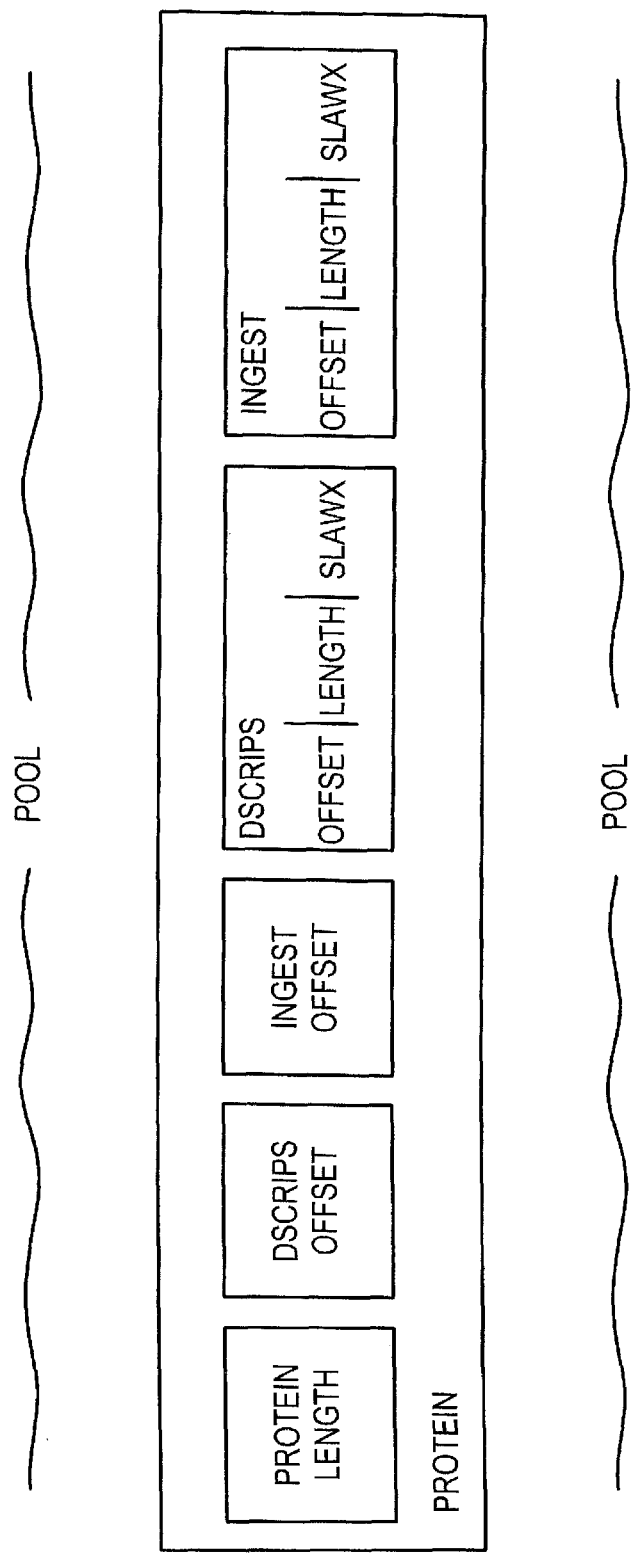
FIG. 14A is a block diagram of a protein in a pool, under an embodiment.

FIG. 14A is a block diagram of a protein in a pool, under an embodiment. The protein includes a length header ("protein length"), a descrips offset, an ingests offset, a descrip, and an ingest. The descrips includes an offset, a length, and a slaw. The ingest includes an offset, a length, and a slaw.

The protein as described herein is a mechanism for encapsulating data that needs to be shared between processes, or moved across a bus or network or other processing structure. As an example, proteins provide an improved mechanism for transport and manipulation of data including data corresponding to or associated with user interface events; in particular, the user interface events of an embodiment include those of the gestural interface described above. As a further example, proteins provide an improved mechanism for transport and manipulation of data including, but not limited to, graphics data or events, and state information, to name a few. A protein is a structured record format and an associated set of methods for manipulating records. Manipulation of records as used herein includes putting data into a structure, taking data out of a structure, and querying the format and existence of data. Proteins are configured to be used via code written in a variety of computer languages. Proteins are also configured to be the basic building block for pools, as described herein. Furthermore, proteins are configured to be natively able to move between processors and across networks while maintaining intact the data they include.

In contrast to conventional data transport mechanisms, proteins are untyped. While being untyped, the proteins provide a powerful and flexible pattern-matching facility, on top of which "type-like" functionality is implemented. Proteins configured as described herein are also inherently multi-point (although point-to-point forms are easily implemented as a subset of multi-point transmission). Additionally, proteins define a "universal" record format that does not differ (or differs only in the types of optional optimizations that are performed) between in-memory, on-disk, and on-the-wire (network) formats, for example.

Figure 15:
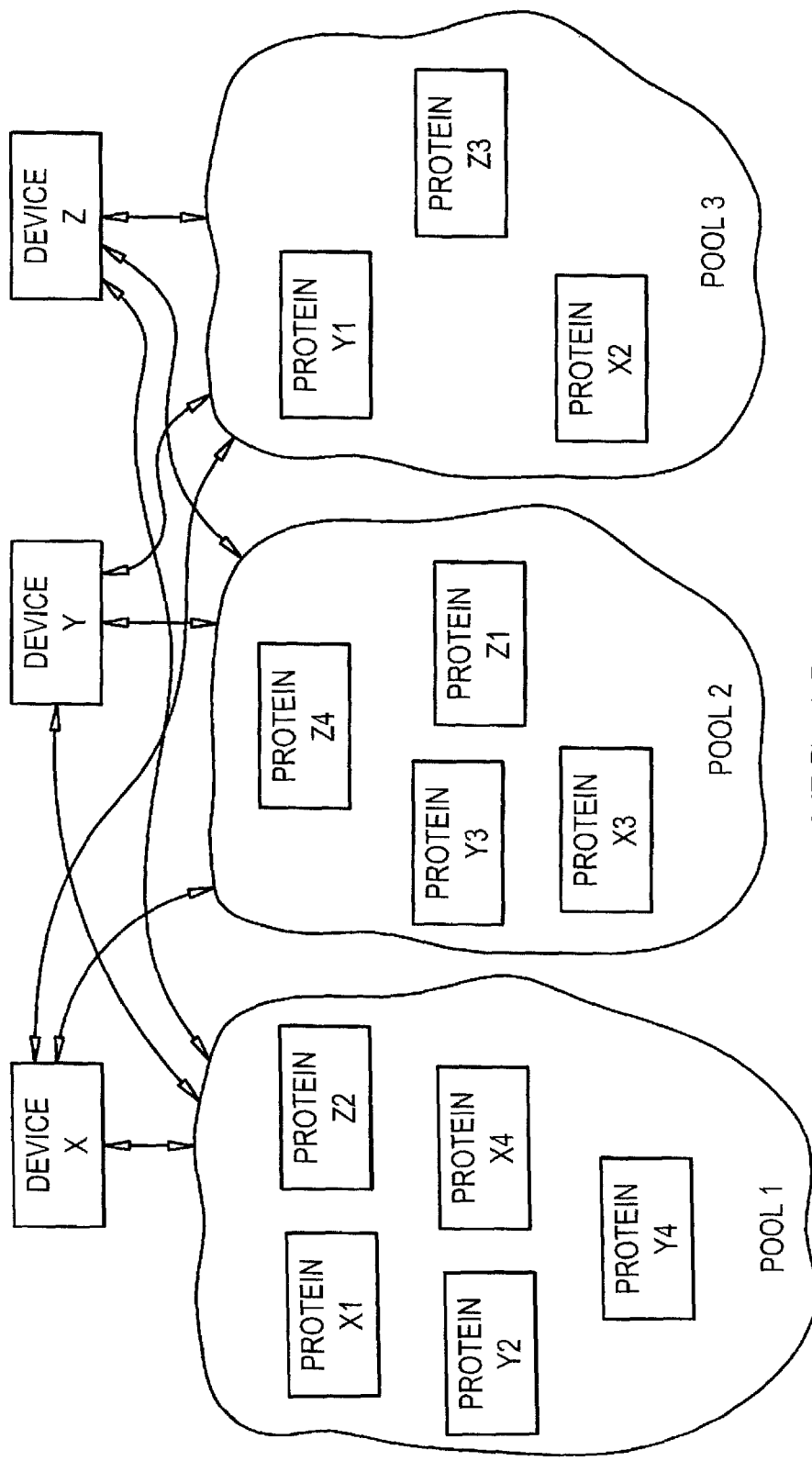
FIG. 15 is a block diagram of a processing environment including data exchange using slawx, proteins, and pools, under an embodiment.

Referring to FIGS. 15 and 19A, a protein of an embodiment is a linear sequence of bytes. Within these bytes are encapsulated a descrips list and a set of key-value pairs called ingests. The descrips list includes an arbitrarily elaborate but efficiently filterable per-protein event description. The ingests include a set of key-value pairs that comprise the actual contents of the protein.

Proteins' concern with key-value pairs, as well as some core ideas about network-friendly and multi-point data interchange, is shared with earlier systems that privilege the concept of "tuples" (e.g., Linda, Jini). Proteins differ from tuple-oriented systems in several major ways, including the use of the descrips list to provide a standard, optimizable pattern matching substrate. Proteins also differ from tuple-oriented systems in the rigorous specification of a record format appropriate for a variety of storage and language constructs, along with several particular implementations of "interfaces" to that record format.

Turning to a description of proteins, the first four or eight bytes of a protein specify the protein's length, which must be a multiple of 16 bytes in an embodiment. This 16-byte granularity ensures that byte-alignment and bus-alignment efficiencies are achievable on contemporary hardware. A protein that is not naturally "quad-word aligned" is padded with arbitrary bytes so that its length is a multiple of 16 bytes.

The length portion of a protein has the following format: 32 bits specifying length, in big-endian format, with the four lowest-order bits serving as flags to indicate macro-level protein structure characteristics; followed by 32 further bits if the protein's length is greater than 2^32 bytes.

The 16-byte-alignment proviso of an embodiment means that the lowest order bits of the first four bytes are available as flags. And so the first three low-order bit flags indicate whether the protein's length can be expressed in the first four bytes or requires eight, whether the protein uses big-endian or little-endian byte ordering, and whether the protein employs standard or non-standard structure, respectively, but the protein is not so limited. The fourth flag bit is reserved for future use.

If the eight-byte length flag bit is set, the length of the protein is calculated by reading the next four bytes and using them as the high-order bytes of a big-endian, eight-byte integer (with the four bytes already read supplying the low-order portion). If the little-endian flag is set, all binary numerical data in the protein is to be interpreted as little-endian (otherwise, big-endian). If the non-standard flag bit is set, the remainder of the protein does not conform to the standard structure to be described below.

Non-standard protein structures will not be discussed further herein, except to say that there are various methods for describing and synchronizing on non-standard protein formats available to a systems programmer using proteins and pools, and that these methods can be useful when space or compute cycles are constrained. For example, the shortest protein of an embodiment is sixteen bytes. A standard-format protein cannot fit any actual payload data into those sixteen bytes (the lion's share of which is already relegated to describing the location of the protein's component parts). But a non-standard format protein could conceivably use 12 of its 16 bytes for data. Two applications exchanging proteins could mutually decide that any 16-byte-long proteins that they emit always include 12 bytes representing, for example, 12 8-bit sensor values from a real-time analog-to-digital converter.

Immediately following the length header, in the standard structure of a protein, two more variable-length integer numbers appear. These numbers specify offsets to, respectively, the first element in the descrips list and the first key-value pair (ingest). These offsets are also referred to herein as the descrips offset and the ingests offset, respectively. The byte order of each quad of these numbers is specified by the protein endianness flag bit. For each, the most significant bit of the first four bytes determines whether the number is four or eight bytes wide. If the most significant bit (msb) is set, the first four bytes are the most significant bytes of a double-word (eight byte) number. This is referred to herein as "offset form". Use of separate offsets pointing to descrips and pairs allows descrips and pairs to be handled by different code paths, making possible particular optimizations relating to, for example, descrips pattern-matching and protein assembly.

The presence of these two offsets at the beginning of a protein also allows for several useful optimizations.

Most proteins will not be so large as to require eight-byte lengths or pointers, so in general the length (with flags) and two offset numbers will occupy only the first three bytes of a protein. On many hardware or system architectures, a fetch or read of a certain number of bytes beyond the first is "free" (e.g., 16 bytes take exactly the same number of clock cycles to pull across the Cell processor's main bus as a single byte).

In many instances it is useful to allow implementation-specific or context-specific caching or metadata inside a protein. The use of offsets allows for a "hole" of arbitrary size to be created near the beginning of the protein, into which such metadata may be slotted. An implementation that can make use of eight bytes of metadata gets those bytes for free on many system architectures with every fetch of the length header for a protein.

The descrips offset specifies the number of bytes between the beginning of the protein and the first descrip entry. Each descrip entry comprises an offset (in offset form, of course) to the next descrip entry, followed by a variable-width length field (again in offset format), followed by a slaw. If there are no further descrips, the offset is, by rule, four bytes of zeros. Otherwise, the offset specifies the number of bytes between the beginning of this descrip entry and a subsequent descrip entry. The length field specifies the length of the slaw, in bytes.

In most proteins, each descrip is a string, formatted in the slaw string fashion: a four-byte length/type header with the most significant bit set and only the lower 30 bits used to specify length, followed by the header's indicated number of data bytes. As usual, the length header takes its endianness from the protein. Bytes are assumed to encode UTF-8 characters (and thus—nota bene—the number of characters is not necessarily the same as the number of bytes).

The ingests offset specifies the number of bytes between the beginning of the protein and the first ingest entry. Each ingest entry comprises an offset (in offset form) to the next ingest entry, followed again by a length field and a slaw. The ingests offset is functionally identical to the descrips offset, except that it points to the next ingest entry rather than to the next descrip entry.

In most proteins, every ingest is of the slaw cons type comprising a two-value list, generally used as a key/value pair. The slaw cons record comprises a four-byte length/type header with the second most significant bit set and only the lower 30 bits used to specify length; a four-byte offset to the start of the value (second) element; the four-byte length of the key element; the slaw record for the key element; the four-byte length of the value element; and finally the slaw record for the value element.

Generally, the cons key is a slaw string. The duplication of data across the several protein and slaw cons length and offsets field provides yet more opportunity for refinement and optimization.

The construct used under an embodiment to embed typed data inside proteins, as described above, is a tagged byte-sequence specification and abstraction called a "slaw" (the plural is "slawx"). A slaw is a linear sequence of bytes representing a piece of (possibly aggregate) typed data, and is associated with programming-language-specific APIs that allow slawx to be created, modified and moved around between memory spaces, storage media, and machines. The slaw type scheme is intended to be extensible and as lightweight as possible, and to be a common substrate that can be used from any programming language.

The desire to build an efficient, large-scale inter-process communication mechanism is the driver of the slaw configuration. Conventional programming languages provide sophisticated data structures and type facilities that work well in process-specific memory layouts, but these data representations invariably break down when data needs to be moved between processes or stored on disk. The slaw architecture is, first, a substantially efficient, multi-platform friendly, low-level data model for inter-process communication.

But even more importantly, slawx are configured to influence, together with proteins, and enable the development of future computing hardware (microprocessors, memory controllers, disk controllers). A few specific additions to, say, the instruction sets of commonly available microprocessors make it possible for slawx to become as efficient even for single-process, in-memory data layout as the schema used in most programming languages.

Each slaw comprises a variable-length type header followed by a type-specific data layout. In an example embodiment, which supports full slaw functionality in C, C++ and Ruby for example, types are indicated by a universal integer defined in system header files accessible from each language. More sophisticated and flexible type resolution functionality is also enabled: for example, indirect typing via universal object IDs and network lookup.

The slaw configuration of an embodiment allows slaw records to be used as objects in language-friendly fashion from both Ruby and C++, for example. A suite of utilities external to the C++ compiler sanity-check slaw byte layout, create header files and macros specific to individual slaw types, and auto-generate bindings for Ruby. As a result, well-configured slaw types are quite efficient even when used from within a single process. Any slaw anywhere in a process's accessible memory can be addressed without a copy or "deserialization" step.

Slaw functionality of an embodiment includes API facilities to perform one or more of the following: create a new slaw of a specific type; create or build a language-specific reference to a slaw from bytes on disk or in memory; embed data within a slaw in type-specific fashion; query the size of a slaw; retrieve data from within a slaw; clone a slaw; and translate the endianness and other format attributes of all data within a slaw. Every species of slaw implements the above behaviors.

FIGS. 14B/1 and 14B2 show a slaw header format, under an embodiment. A detailed description of the slaw follows.

The internal structure of each slaw optimizes each of type resolution, access to encapsulated data, and size information for that slaw instance. In an embodiment, the full set of slaw types is by design minimally complete, and includes: the slaw string; the slaw cons (i.e. dyad); the slaw list; and the slaw numerical object, which itself represents a broad set of individual numerical types understood as permutations of a half-dozen or so basic attributes. The other basic property of any slaw is its size. In an embodiment, slawx have byte-lengths quantized to multiples of four; these four-byte words are referred to herein as 'quads'. In general, such quad-based sizing aligns slawx well with the configurations of modern computer hardware architectures.

The first four bytes of every slaw in an embodiment comprise a header structure that encodes type-description and other metainformation, and that ascribes specific type meanings to particular bit patterns. For example, the first (most significant) bit of a slaw header is used to specify whether the size (length in quad-words) of that slaw follows the initial four-byte type header. When this bit is set, it is understood that the size of the slaw is explicitly recorded in the next four bytes of the slaw (e.g., bytes five through eight); if the size of the slaw is such that it cannot be represented in four bytes (i.e. if the size is or is larger than two to the thirty-second power) then the next-most-significant bit of the slaw's initial four bytes is also set, which means that the slaw has an eight-byte (rather than four byte) length. In that case, an inspecting process will find the slaw's length stored in ordinal bytes five through twelve. On the other hand, the small number of slaw types means that in many cases a fully specified typal bit-pattern "leaves unused" many bits in the four byte slaw header; and in such cases these bits may be employed to encode the slaw's length, saving the bytes (five through eight) that would otherwise be required.

For example, an embodiment leaves the most significant bit of the slaw header (the "length follows" flag) unset and sets the next bit to indicate that the slaw is a "wee cons", and in this case the length of the slaw (in quads) is encoded in the remaining thirty bits. Similarly, a "wee string" is marked by the pattern 001 in the header, which leaves twenty-nine bits for representation of the slaw-string's length; and a leading 0001 in the header describes a "wee list", which by virtue of the twenty-eight available length-representing bits can be a slaw list of up to two-to-the-twenty-eight quads in size. A "full string" (or cons or list) has a different bit signature in the header, with the most significant header bit necessarily set because the slaw length is encoded separately in bytes five through eight (or twelve, in extreme cases). Note that the Plasma implementation "decides" at the instant of slaw construction whether to employ the "wee" or the "full" version of these constructs (the decision is based on whether the resulting size will "fit" in the available wee bits or not), but the full-vs.-wee detail is hidden from the user of the Plasma implementation, who knows and cares only that she is using a slaw string, or a slaw cons, or a slaw list.

Numeric slawx are, in an embodiment, indicated by the leading header pattern 00001. Subsequent header bits are used to represent a set of orthogonal properties that may be combined in arbitrary permutation. An embodiment employs, but is not limited to, five such character bits to indicate whether or not the number is: (1) floating point; (2) complex; (3) unsigned; (4) "wide"; (5) "stumpy" ((4) "wide" and (5) "stumpy" are permuted to indicate eight, sixteen, thirty-two, and sixty-four bit number representations). Two additional bits (e.g., (7) and (8)) indicate that the encapsulated numeric data is a two-, three-, or four-element vector (with both bits being zero suggesting that the numeric is a "one-element vector" (i.e. a scalar)). In this embodiment the eight bits of the fourth header byte are used to encode the size (in bytes, not quads) of the encapsulated numeric data. This size encoding is offset by one, so that it can represent any size between and including one and two hundred fifty-six bytes. Finally, two character bits (e.g., (9) and (10)) are used to indicate that the numeric data encodes an array of individual numeric entities, each of which is of the type described by character bits (1) through (8). In the case of an array, the individual numeric entities are not each tagged with additional headers, but are packed as continuous data following the single header and, possibly, explicit slaw size information.

This embodiment affords simple and efficient slaw duplication (which can be implemented as a byte-for-byte copy) and extremely straightforward and efficient slaw comparison (two slawx are the same in this embodiment if and only if there is a one-to-one match of each of their component bytes considered in sequence). This latter property is important, for example, to an efficient implementation of the protein architecture, one of whose critical and pervasive features is the ability to search through or 'match on' a protein's descrips list.

Further, the embodiments herein allow aggregate slaw forms (e.g., the slaw cons and the slaw list) to be constructed simply and efficiently. For example, an embodiment builds a slaw cons from two component slawx, which may be of any type, including themselves aggregates, by: (a) querying each component slaw's size; (b) allocating memory of size equal to the sum of the sizes of the two component slawx and the one, two, or three quads needed for the header-plus-size structure; (c) recording the slaw header (plus size information) in the first four, eight, or twelve bytes; and then (d) copying the component slawx's bytes in turn into the immediately succeeding memory. Significantly, such a construction routine need know nothing about the types of the two component slawx; only their sizes (and accessibility as a sequence of bytes) matters. The same process pertains to the construction of slaw lists, which are ordered encapsulations of arbitrarily many sub-slawx of (possibly) heterogeneous type.

A further consequence of the slaw system's fundamental format as sequential bytes in memory obtains in connection with "traversal" activities—a recurring use pattern uses, for example, sequential access to the individual slawx stored in a slaw list. The individual slawx that represent the descrips and ingests within a protein structure must similarly be traversed. Such maneuvers are accomplished in a stunningly straightforward and efficient manner: to "get to" the next slaw in a slaw list, one adds the length of the current slaw to its location in memory, and the resulting memory location is identically the header of the next slaw. Such simplicity is possible because the slaw and protein design eschews "indirection"; there are no pointers; rather, the data simply exists, in its totality, in situ.

To the point of slaw comparison, a complete implementation of the Plasma system must acknowledge the existence of differing and incompatible data representation schemes across and among different operating systems, CPUs, and hardware architectures. Major such differences include byte-ordering policies (e.g., little- vs. big-endianness) and floating-point representations; other differences exist. The Plasma specification requires that the data encapsulated by slawx be guaranteed interprable (i.e., must appear in the native format of the architecture or platform from which the slaw is being inspected. This requirement means in turn that the Plasma system is itself responsible for data format conversion. However, the specification stipulates only that the conversion take place before a slaw becomes "at all visible" to an executing process that might inspect it. It is therefore up to the individual implementation at which point it chooses to perform such format c conversion; two appropriate approaches are that slaw data payloads are conformed to the local architecture's data format (1) as an individual slaw is "pulled out" of a protein in which it had been packed, or (2) for all slaw in a protein simultaneously, as that protein is extracted from the pool in which it was resident. Note that the conversion stipulation considers the possibility of hardware-assisted implementations. For example, networking chipsets built with explicit Plasma capability may choose to perform format conversion intelligently and at the "instant of transmission", based on the known characteristics of the receiving system. Alternately, the process of transmission may convert data payloads into a canonical format, with the receiving process symmetrically converting from canonical to "local" format. Another embodiment performs format conversion "at the metal", meaning that data is always stored in canonical format, even in local memory, and that the memory controller hardware itself performs the conversion as data is retrieved from memory and placed in the registers of the proximal CPU.

Figure 14C:
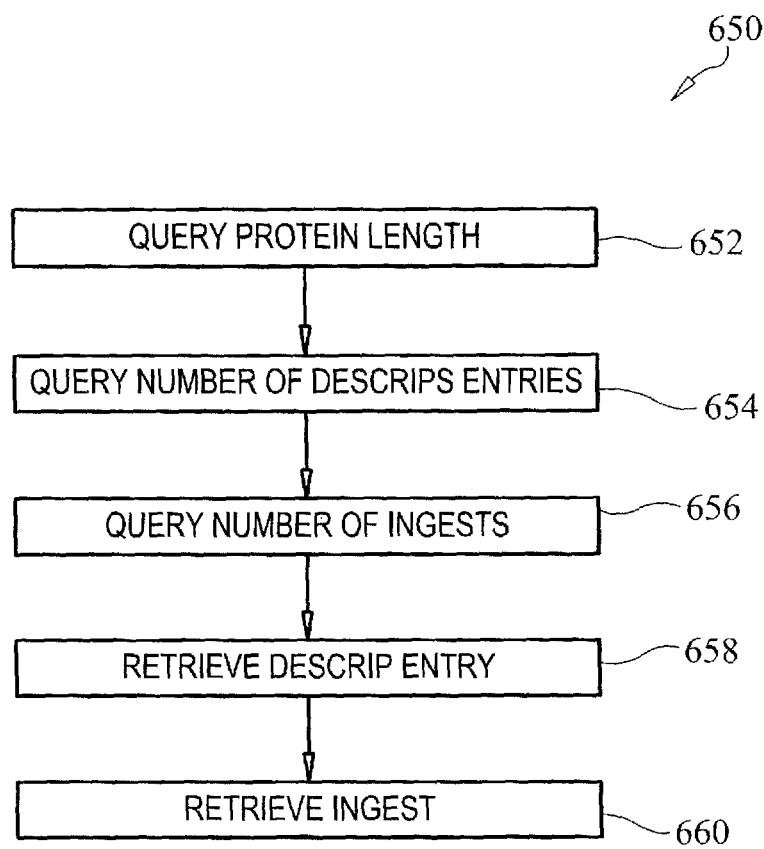
FIG. 14C is a flow diagram for using proteins, under an embodiment.

A minimal (and read-only) protein implementation of an embodiment includes operation or behavior in one or more applications or programming languages making use of proteins. FIG. 14C is a flow diagram 650 for using proteins, under an embodiment. Operation begins by querying 652 the length in bytes of a protein. The number of descrips entries is queried 654. The number of ingests is queried 656. A descrip entry is retrieved 658 by index number. An ingest is retrieved 660 by index number.

Figure 14D:
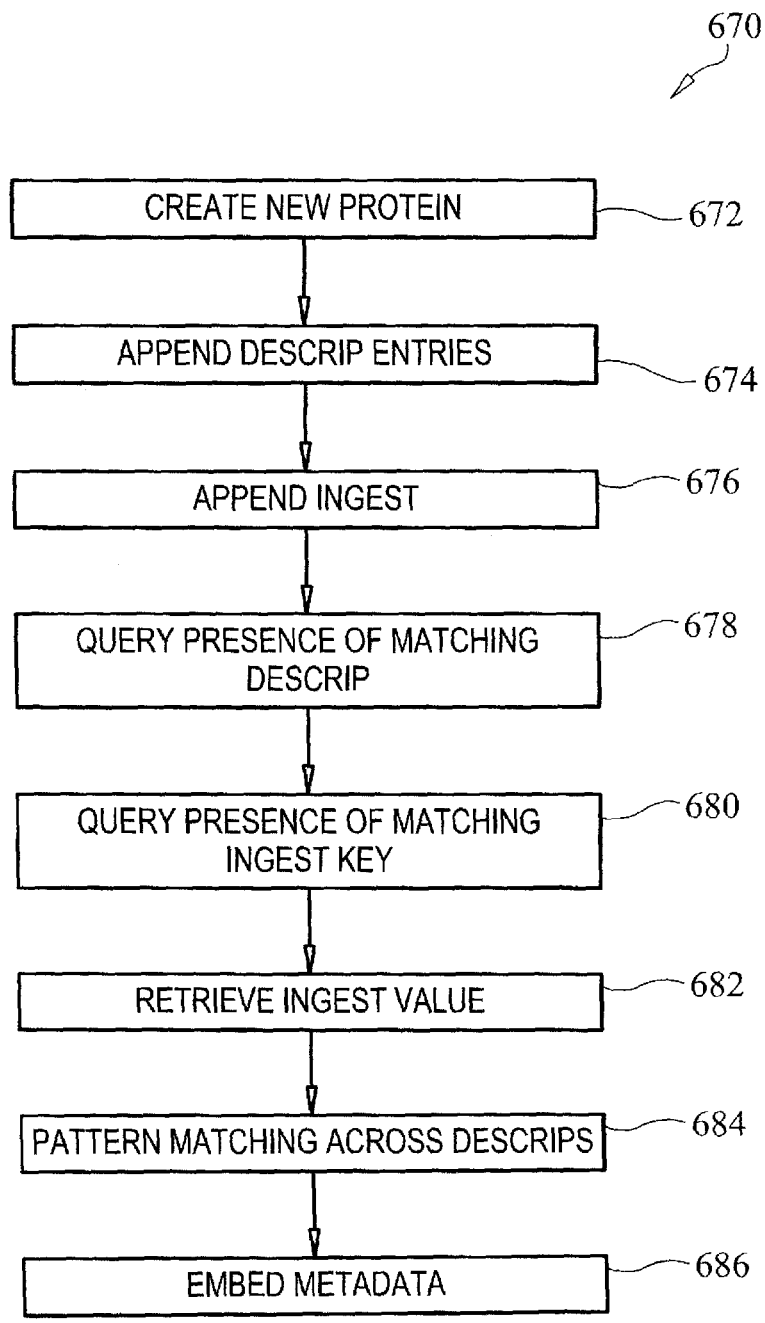
FIG. 14D is a flow diagram for constructing or generating proteins, under an embodiment.

The embodiments described herein also define basic methods allowing proteins to be constructed and filled with data, helper-methods that make common tasks easier for programmers, and hooks for creating optimizations. FIG. 14D is a flow diagram 670 for constructing or generating proteins, under an embodiment. Operation begins with creation 672 of a new protein. A series of descrips entries are appended 674. An ingest is also appended 676. The presence of a matching descrip is queried 678, and the presence of a matching ingest key is queried 680. Given an ingest key, an ingest value is retrieved 682. Pattern matching is performed 684 across descrips. Non-structured metadata is embedded 686 near the beginning of the protein.

As described above, slawx provide the lowest-level of data definition for inter-process exchange, proteins provide mid-level structure and hooks for querying and filtering, and pools provide for high-level organization and access semantics. The pool is a repository for proteins, providing linear sequencing and state caching. The pool also provides multi-process access by multiple programs or applications of numerous different types. Moreover, the pool provides a set of common, optimizable filtering and pattern-matching behaviors.

The pools of an embodiment, which can accommodate tens of thousands of proteins, function to maintain state, so that individual processes can offload much of the tedious bookkeeping common to multi-process program code. A pool maintains or keeps a large buffer of past proteins available—the Platonic pool is explicitly infinite—so that participating processes can scan both backwards and forwards in a pool at will. The size of the buffer is implementation dependent, of course, but in common usage it is often possible to keep proteins in a pool for hours or days.

The most common style of pool usage as described herein hews to a biological metaphor, in contrast to the mechanistic, point-to-point approach taken by existing inter-process communication frameworks. The name protein alludes to biological inspiration: data proteins in pools are available for flexible querying and pattern matching by a large number of computational processes, as chemical proteins in a living organism are available for pattern matching and filtering by large numbers of cellular agents.

Two additional abstractions lean on the biological metaphor, including use of "handlers", and the Golgi framework. A process that participates in a pool generally creates a number of handlers. Handlers are relatively small bundles of code that associate match conditions with handle behaviors. By tying one or more handlers to a pool, a process sets up flexible call-back triggers that encapsulate state and react to new proteins.

A process that participates in several pools generally inherits from an abstract Golgi class. The Golgi framework provides a number of useful routines for managing multiple pools and handlers. The Golgi class also encapsulates parent-child relationships, providing a mechanism for local protein exchange that does not use a pool.

A pools API provided under an embodiment is configured to allow pools to be implemented in a variety of ways, in order to account both for system-specific goals and for the available capabilities of given hardware and network architectures. The two fundamental system provisions upon which pools depend are a storage facility and a means of inter-process communication. The extant systems described herein use a flexible combination of shared memory, virtual memory, and disk for the storage facility, and IPC queues and TCP/IP sockets for inter-process communication.

Pool functionality of an embodiment includes, but is not limited to, the following: participating in a pool; placing a protein in a pool; retrieving the next unseen protein from a pool; rewinding or fast-forwarding through the contents (e.g., proteins) within a pool. Additionally, pool functionality can include, but is not limited to, the following: setting up a streaming pool call-back for a process; selectively retrieving proteins that match particular patterns of descrips or ingests keys; scanning backward and forwards for proteins that match particular patterns of descrips or ingests keys.

The proteins described above are provided to pools as a way of sharing the protein data contents with other applications. FIG. 15 is a block diagram of a processing environment including data exchange using slawx, proteins, and pools, under an embodiment. This example environment includes three devices (e.g., Device X, Device Y, and Device Z, collectively referred to herein as the "devices") sharing data through the use of slawx, proteins and pools as described above. Each of the devices is coupled to the three pools (e.g., Pool 1, Pool 2, Pool 3). Pool 1 includes numerous proteins (e.g., Protein X1, Protein Z2, Protein Y2, Protein X4, Protein Y4) contributed or transferred to the pool from the respective devices (e.g., protein Z2 is transferred or contributed to pool 1 by device Z, etc.). Pool 2 includes numerous proteins (e.g., Protein Z4, Protein Y3, Protein Z1, Protein X3) contributed or transferred to the pool from the respective devices (e.g., protein Y3 is transferred or contributed to pool 2 by device Y, etc.). Pool 3 includes numerous proteins (e.g., Protein. Y1, Protein Z3, Protein X2) contributed or transferred to the pool from the respective devices (e.g., protein X2 is transferred or contributed to pool 3 by device X, etc.). While the example described above includes three devices coupled or connected among three pools, any number of devices can be coupled or connected in any manner or combination among any number of pools, and any pool can include any number of proteins contributed from any number or combination of devices. The proteins and pools of this example are as described above with reference to FIGS. 18-23.

Figure 16:
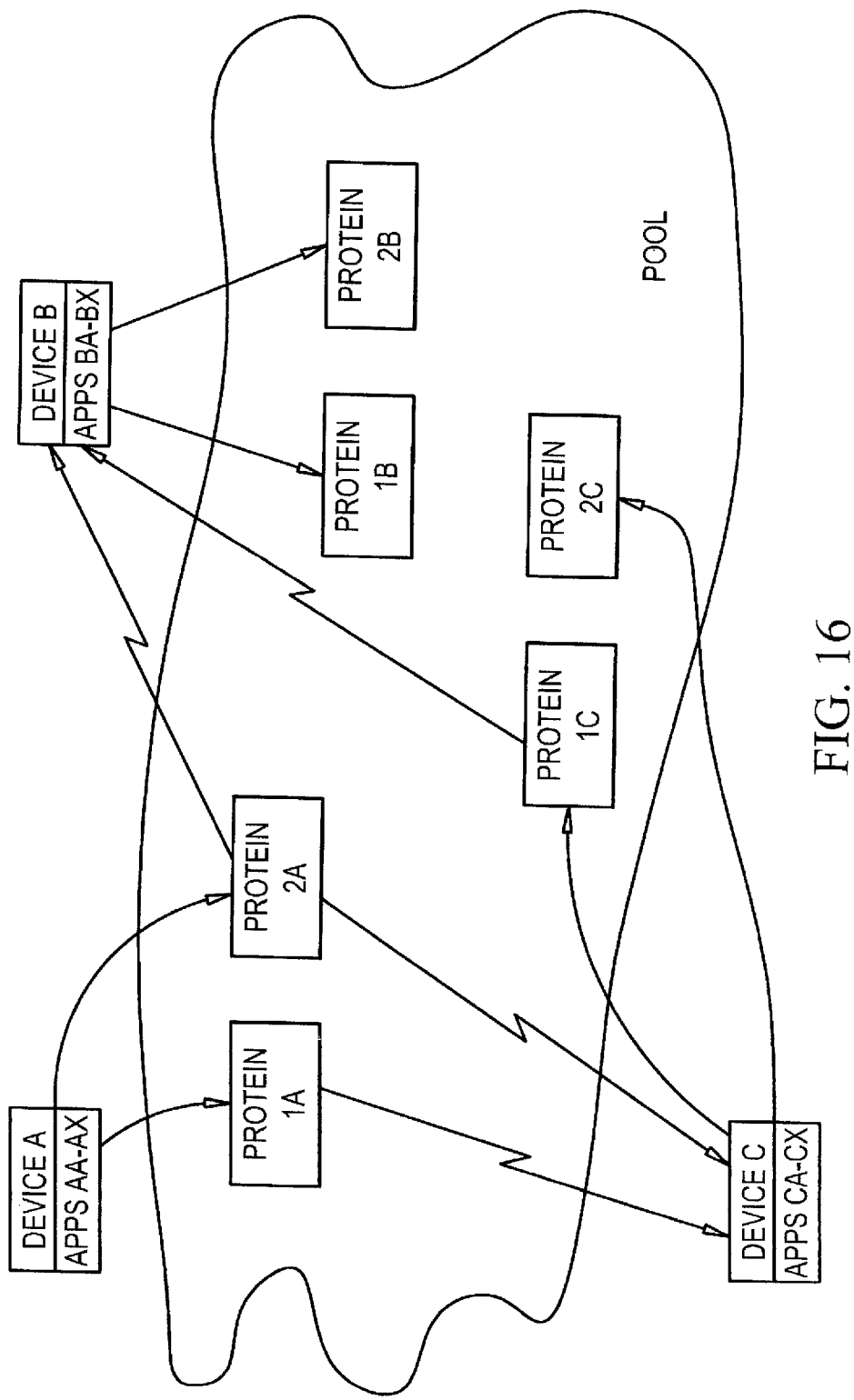
FIG. 16 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an embodiment.

FIG. 16 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an embodiment. This system is but one example of a multi-user, multi-device, multi-computer interactive control scenario or configuration. More particularly, in this example, an interactive system, comprising multiple devices (e.g., device A, B, etc.) and a number of programs (e.g., apps AA-AX, apps BA-BX, etc.) running on the devices uses the Plasma constructs (e.g., pools, proteins, and slaw) to allow the running programs to share and collectively respond to the events generated by these input devices.

In this example, each device (e.g., device A, B, etc.) translates discrete raw data generated by or output from the programs (e.g., apps AA-AX, apps BA-BX, etc.) running on that respective device into Plasma proteins and deposits those proteins into a Plasma pool. For example, program AX generates data or output and provides the output to device A which, in turn, translates the raw data into proteins (e.g., protein 1A, protein 2A, etc.) and deposits those proteins into the pool. As another example, program BC generates data and provides the data to device B which, in turn, translates the data into proteins (e.g., protein 1B, protein 2B, etc.) and deposits those proteins into the pool.

Each protein contains a descrip list that specifies the data or output registered by the application as well as identifying information for the program itself. Where possible, the protein descrips may also ascribe a general semantic meaning for the output event or action. The protein's data payload (e.g., ingests) carries the full set of useful state information for the program event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that devices may be controlled by one person or may be used simultaneously by several people (e.g., a Plasma-based input framework supports many concurrent users), while the resulting event streams are in turn visible to multiple event consumers.

As an example, device C can extract one or more proteins (e.g., protein 1A, protein 2A, etc.) from the pool. Following protein extraction, device C can use the data of the protein, retrieved or read from the slaw of the descrips and ingests of the protein, in processing events to which the protein data corresponds. As another example, device B can extract one or more proteins (e.g., protein 1C, protein 2A, etc.) from the pool. Following protein extraction, device B can use the data of the protein in processing events to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 17:
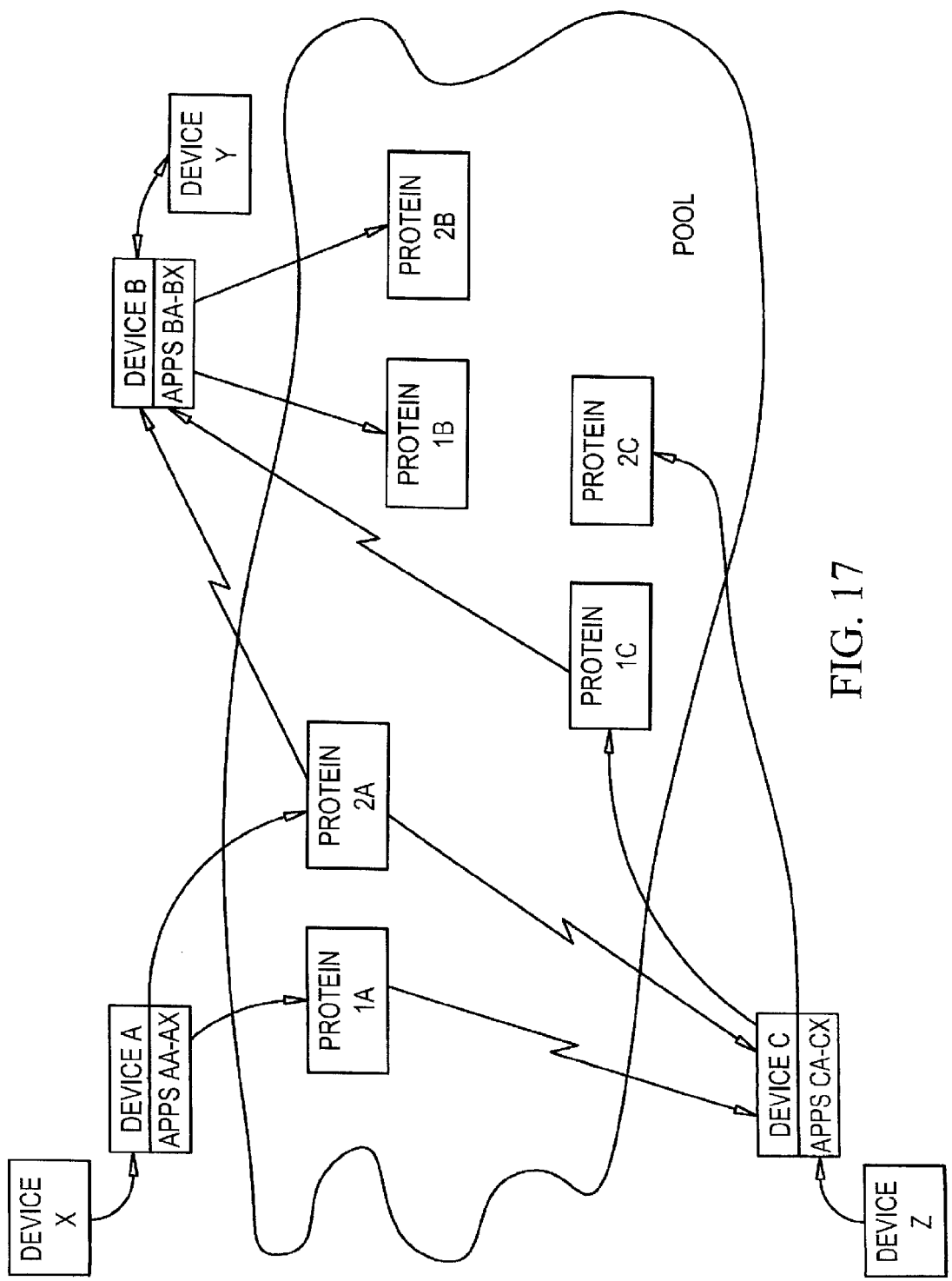
FIG. 17 is a block diagram of a processing environment including multiple devices and numerous programs running on one or more of the devices in which the Plasma constructs (i.e., pools, proteins, and slaw) are used to allow the numerous running programs to share and collectively respond to the events generated by the devices, under an alternative embodiment.

FIG. 17 is a block diagram of a processing environment including multiple devices and numerous programs running on one or more of the devices in which the Plasma constructs (e.g., pools, proteins, and slaw) are used to allow the numerous running programs to share and collectively respond to the events generated by the devices, under an alternative embodiment. This system is but one example of a multi-user, multi-device, multi-computer interactive control scenario or configuration. More particularly, in this example, an interactive system, comprising multiple devices (e.g., devices X and Y coupled to devices A and B, respectively) and a number of programs (e.g., apps AA-AX, apps BA-BX, etc.) running on one or more computers (e.g., device A, device B, etc.) uses the Plasma constructs (e.g., pools, proteins, and slaw) to allow the running programs to share and collectively respond to the events generated by these input devices.

In this example, each device (e.g., devices X and Y coupled to devices A and B, respectively) is managed and/or coupled to run under or in association with one or more programs hosted on the respective device (e.g., device A, device B, etc.) which translates the discrete raw data generated by the device (e.g., device X, device A, device Y, device B, etc.) hardware into Plasma proteins and deposits those proteins into a Plasma pool. For example, device X running in association with application AB hosted on device A generates raw data, translates the discrete raw data into proteins (e.g., protein 1A, protein 2A, etc.) and deposits those proteins into the pool. As another example, device X running in association with application AT hosted on device A generates raw data, translates the discrete raw data into proteins (e.g., protein 1A, protein 2A, etc.) and deposits those proteins into the pool. As yet another example, device Z running in association with application CD hosted on device C generates raw data, translates the discrete raw data into proteins (e.g., protein 1C, protein 2C, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating processing events from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Figure 18:
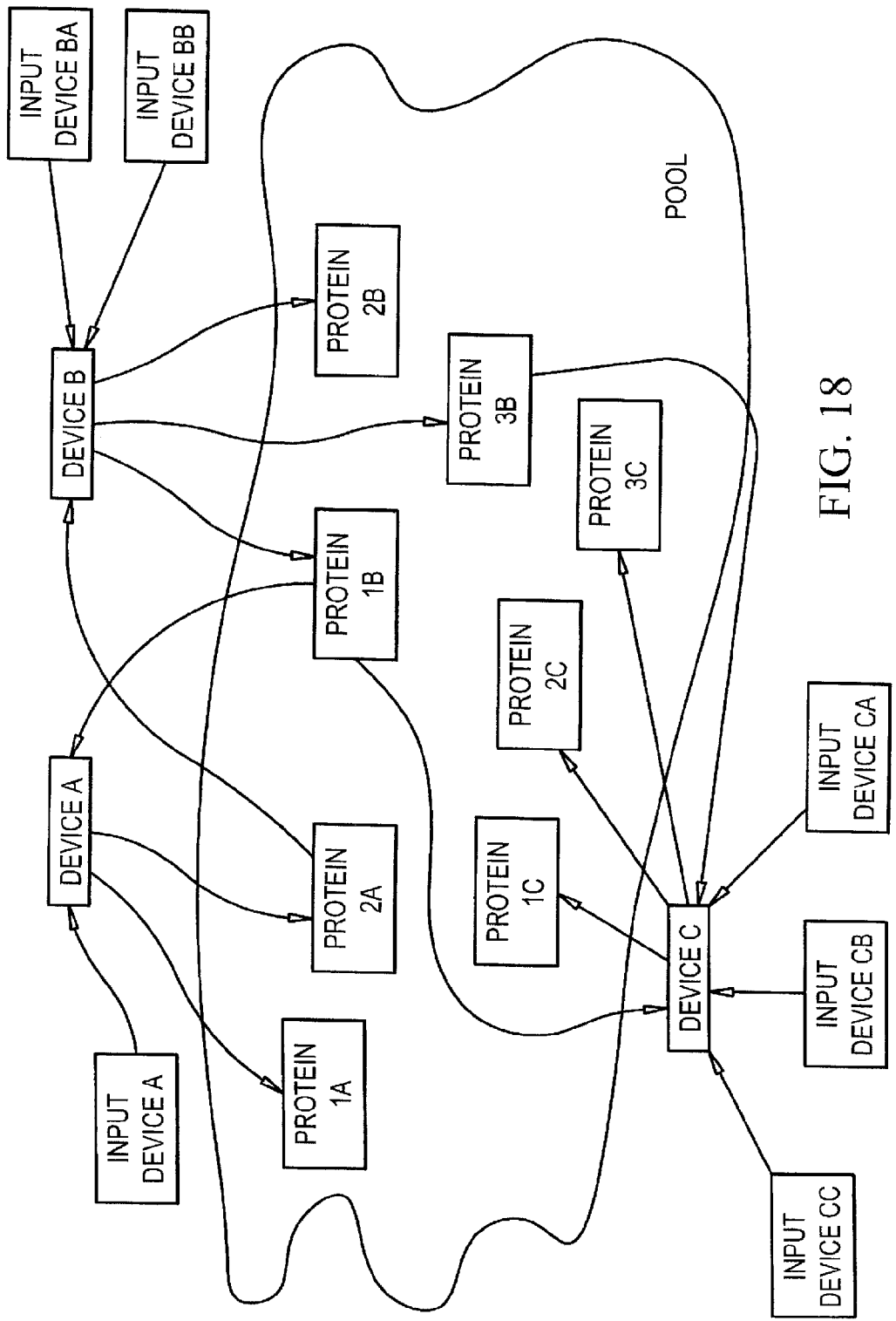
FIG. 18 is a block diagram of a processing environment including multiple input devices coupled among numerous programs running on one or more of the devices in which the Plasma constructs (i.e., pools, proteins, and slaw) are used to allow the numerous running programs to share and collectively respond to the events generated by the input devices, under another alternative embodiment.

FIG. 18 is a block diagram of a processing environment including multiple input devices coupled among numerous programs running on one or more of the devices in which the Plasma constructs (e.g., pools, proteins, and slaw) are used to allow the numerous running programs to share and collectively respond to the events generated by the input devices, under another alternative embodiment. This system is but one example of a multi-user, multi-device, multi-computer interactive control scenario or configuration. More particularly, in this example, an interactive system, comprising multiple input devices (e.g., input devices A, B, BA, and BB, etc.) and a number of programs (not shown) running on one or more computers (e.g., device A, device B, etc.) uses the Plasma constructs (e.g., pools, proteins, and slaw) to allow the running programs to share and collectively respond to the events generated by these input devices.

In this example, each input device (e.g., input devices A, B, BA, and BB, etc.) is managed by a software driver program hosted on the respective device (e.g., device A, device B, etc.) which translates the discrete raw data generated by the input device hardware into Plasma proteins and deposits those proteins into a Plasma pool. For example, input device A generates raw data and provides the raw data to device A which, in turn, translates the discrete raw data into proteins (e.g., protein 1A, protein 2A, etc.) and deposits those proteins into the pool. As another example, input device BB generates raw data and provides the raw data to device B which, in turn, translates the discrete raw data into proteins (e.g., protein 1B, protein 3B, etc.) and deposits those proteins into the pool.

Each protein contains a descrip list that specifies the action registered by the input device as well as identifying information for the device itself. Where possible, the protein descrips may also ascribe a general semantic meaning for the device action. The protein's data payload (e.g., ingests) carries the full set of useful state information for the device event.

To illustrate, here are example proteins for two typical events in such a system. Proteins are represented here as text however, in an actual implementation, the constituent parts of these proteins are typed data bundles (e.g., slaw). The protein describing a g-speak "one finger click" pose (described in the Related Applications) is as follows:

```
[ Descrips: { point, engage, one, one-finger-engage, hand,
      pilot-id-02, hand-id-23 }
  Ingests: { pilot-id  => 02,
      hand-id    => 23,
      pos        => [ 0.0, 0.0, 0.0 ]
      angle-axis => [ 0.0, 0.0, 0.0, 0.707 ]
      gripe      => .. ||:vx
      time       => 184437103.29}]
```

As a further example, the protein describing a mouse click is as follows:

```
[ Descrips: { point, click, one, mouse-click, button-one,
      mouse-id-02 }
  Ingests: { mouse-id => 23,
      pos        => [ 0.0, 0.0, 0.0 ]
      time       => 184437124.80}]
```

Either or both of the sample proteins foregoing might cause a participating program of a host device to run a particular portion of its code. These programs may be interested in the general semantic labels: the most general of all, "point", or the more specific pair, "engage, one". Or they may be looking for events that would plausibly be generated only by a precise device: "one-finger-engage", or even a single aggregate object, "hand-id-23".

The proteins, as described above, are available in the pool for use by any program or device coupled or connected to the pool, regardless of type of the program or device. Consequently, any number of programs running on any number of computers may extract event proteins from the input pool. These devices need only be able to participate in the pool via either the local memory bus or a network connection in order to extract proteins from the pool. An immediate consequence of this is the beneficial possibility of decoupling processes that are responsible for generating 'input events' from those that use or interpret the events. Another consequence is the multiplexing of sources and consumers of events so that input devices may be controlled by one person or may be used simultaneously by several people (e.g., a Plasma-based input framework supports many concurrent users), while the resulting event streams are in turn visible to multiple event consumers.

As an example or protein use, device C can extract one or more proteins (e.g., protein 1B, etc.) from the pool. Following protein extraction, device C can use the data of the protein, retrieved or read from the slaw of the descrips and ingests of the protein, in processing input events of input devices CA and CC to which the protein data corresponds. As another example, device A can extract one or more proteins (e.g., protein 1B, etc.) from the pool. Following protein extraction, device A can use the data of the protein in processing input events of input device A to which the protein data corresponds.

Devices and/or programs coupled or connected to a pool may skim backwards and forwards in the pool looking for particular sequences of proteins. It is often useful, for example, to set up a program to wait for the appearance of a protein matching a certain pattern, then skim backwards to determine whether this protein has appeared in conjunction with certain others. This facility for making use of the stored event history in the input pool often makes writing state management code unnecessary, or at least significantly reduces reliance on such undesirable coding patterns.

Examples of input devices that are used in the embodiments of the system described herein include gestural input sensors, keyboards, mice, infrared remote controls such as those used in consumer electronics, and task-oriented tangible media objects, to name a few.

Figure 19:
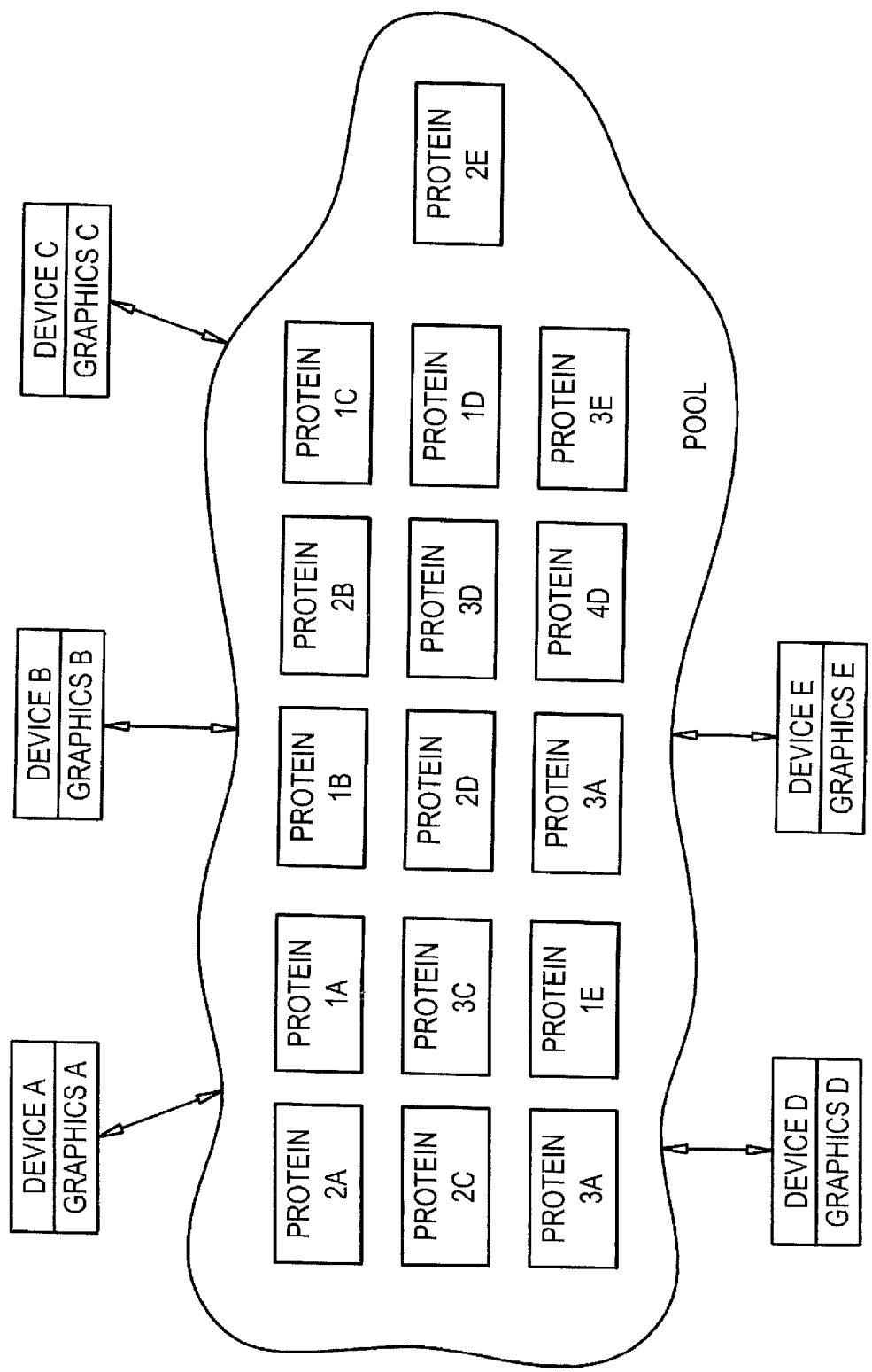
FIG. 19 is a block diagram of a processing environment including multiple devices coupled among numerous programs running on one or more of the devices in which the Plasma constructs (i.e., pools, proteins, and slaw) are used to allow the numerous running programs to share and collectively respond to the graphics events generated by the devices, under yet another alternative embodiment.

FIG. 19 is a block diagram of a processing environment including multiple devices coupled among numerous programs running on one or more of the devices in which the Plasma constructs (e.g., pools, proteins, and slaw) are used to allow the numerous running programs to share and collectively respond to the graphics events generated by the devices, under yet another alternative embodiment. This system is but one example of a system comprising multiple running programs (e.g. graphics A-E) and one or more display devices (not shown), in which the graphical output of some or all of the programs is made available to other programs in a coordinated manner using the Plasma constructs (e.g., pools, proteins, and slaw) to allow the running programs to share and collectively respond to the graphics events generated by the devices.

It is often useful for a computer program to display graphics generated by another program. Several common examples include video conferencing applications, network-based slideshow and demo programs, and window managers. Under this configuration, the pool is used as a Plasma library to implement a generalized framework which encapsulates video, network application sharing, and window management, and allows programmers to add in a number of features not commonly available in current versions of such programs.

Programs (e.g., graphics A-E) running in the Plasma compositing environment participate in a coordination pool through couplings and/or connections to the pool. Each program may deposit proteins in that pool to indicate the availability of graphical sources of various kinds. Programs that are available to display graphics also deposit proteins to indicate their displays' capabilities, security and user profiles, and physical and network locations.

Graphics data also may be transmitted through pools, or display programs may be pointed to network resources of other kinds (RTSP streams, for example). The phrase "graphics data" as used herein refers to a variety of different representations that lie along a broad continuum; examples of graphics data include but are not limited to literal examples (e.g., an 'image', or block of pixels), procedural examples (e.g., a sequence of 'drawing' directives, such as those that flow down a typical openGL pipeline), and descriptive examples (e.g., instructions that combine other graphical constructs by way of geometric transformation, clipping, and compositing operations).

On a local machine graphics data may be delivered through platform-specific display driver optimizations. Even when graphics are not transmitted via pools, often a periodic screen-capture will be stored in the coordination pool so that clients without direct access to the more esoteric sources may still display fall-back graphics.

One advantage of the system described here is that unlike most message passing frameworks and network protocols, pools maintain a significant buffer of data. So programs can rewind backwards into a pool looking at access and usage patterns (in the case of the coordination pool) or extracting previous graphics frames (in the case of graphics pools).

Figure 20:
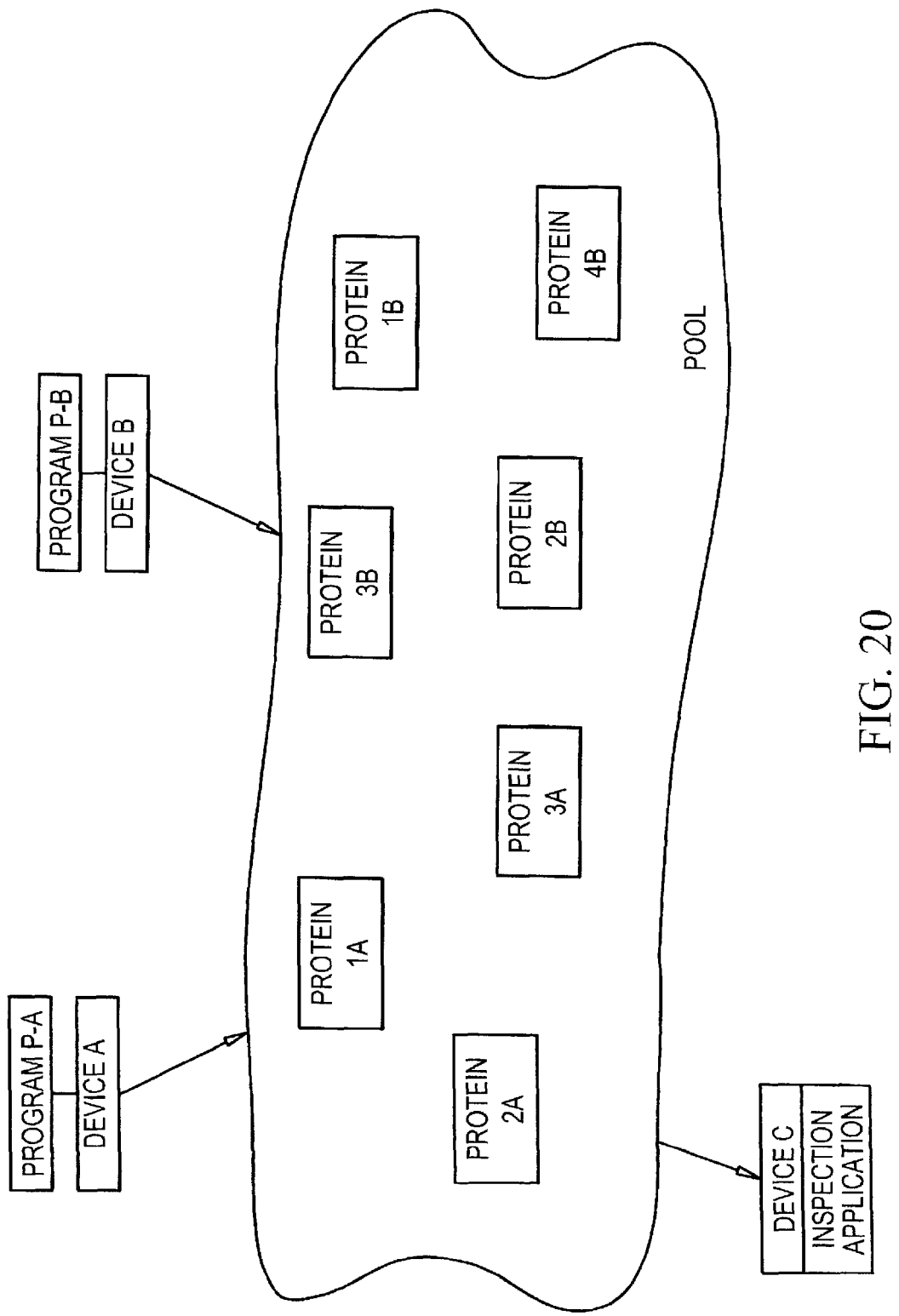
FIG. 20 is a block diagram of a processing environment including multiple devices coupled among numerous programs running on one or more of the devices in which the Plasma constructs (i.e., pools, proteins, and slaw) are used to allow stateful inspection, visualization, and debugging of the running programs, under still another alternative embodiment.

FIG. 20 is a block diagram of a processing environment including multiple devices coupled among numerous programs running on one or more of the devices in which the Plasma constructs (e.g., pools, proteins, and slaw) are used to allow stateful inspection, visualization, and debugging of the running programs, under still another alternative embodiment. This system is but one example of a system comprising multiple running programs (e.g. program P-A, program P-B, etc.) on multiple devices (e.g., device A, device B, etc.) in which some programs access the internal state of other programs using or via pools.

Most interactive computer systems comprise many programs running alongside one another, either on a single machine or on multiple machines and interacting across a network. Multi-program systems can be difficult to configure, analyze and debug because run-time data is hidden inside each process and difficult to access. The generalized framework and Plasma constructs of an embodiment described herein allow running programs to make much of their data available via pools so that other programs may inspect their state. This framework enables debugging tools that are more flexible than conventional debuggers, sophisticated system maintenance tools, and visualization harnesses configured to allow human operators to analyze in detail the sequence of states that a program or programs has passed through.

Referring to FIG. 25, a program (e.g., program P-A, program P-B, etc.) running in this framework generates or creates a process pool upon program start up. This pool is registered in the system almanac, and security and access controls are applied. More particularly, each device (e.g., device A, B, etc.) translates discrete raw data generated by or output from the programs (e.g., program P-A, program P-B, etc.) running on that respective device into Plasma proteins and deposits those proteins into a Plasma pool. For example, program P-A generates data or output and provides the output to device A which, in turn, translates the raw data into proteins (e.g., protein 1A, protein 2A, protein 3A, etc.) and deposits those proteins into the pool. As another example, program P-B generates data and provides the data to device B which, in turn, translates the data into proteins (e.g., proteins 1B-4B, etc.) and deposits those proteins into the pool.

For the duration of the program's lifetime, other programs with sufficient access permissions may attach to the pool and read the proteins that the program deposits; this represents the basic inspection modality, and is a conceptually "one-way" or "read-only" proposition: entities interested in a program P-A inspect the flow of status information deposited by P-A in its process pool. For example, an inspection program or application running under device C can extract one or more proteins (e.g., protein 1A, protein 2A, etc.) from the pool. Following protein extraction, device C can use the data of the protein, retrieved or read from the slaw of the descrips and ingests of the protein, to access, interpret and inspect the internal state of program P-A.

But, recalling that the Plasma system is not only an efficient stateful transmission scheme but also an omnidirectional messaging environment, several additional modes support program-to-program state inspection. An authorized inspection program may itself deposit proteins into program P's process pool to influence or control the characteristics of state information produced and placed in that process pool (which, after all, program P not only writes into but reads from).

Figure 21:
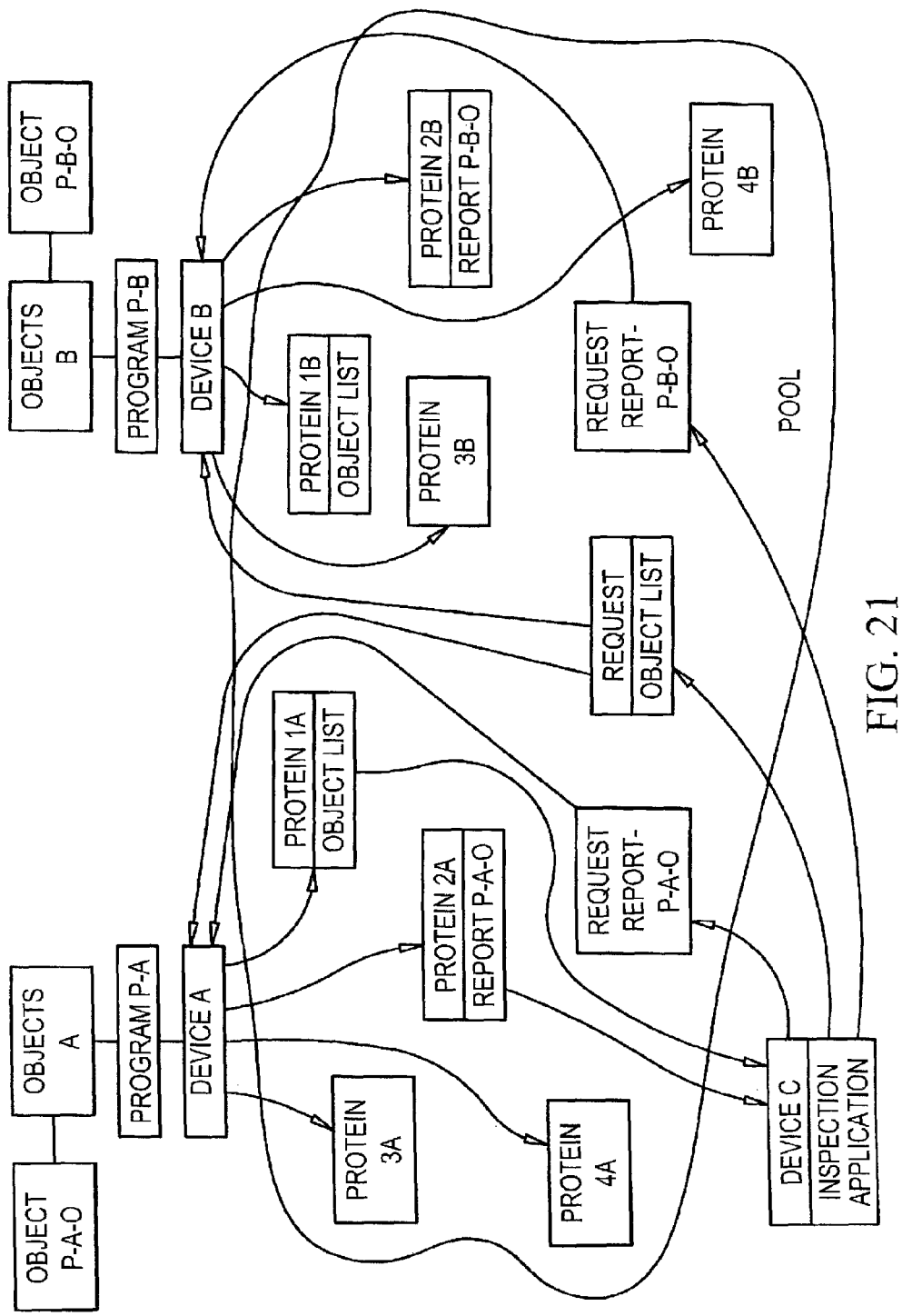
FIG. 21 is a block diagram of a processing environment including multiple devices coupled among numerous programs running on one or more of the devices in which the Plasma constructs (i.e., pools, proteins, and slaw) are used to allow influence or control the characteristics of state information produced and placed in that process pool, under an additional alternative embodiment.

FIG. 21 is a block diagram of a processing environment including multiple devices coupled among numerous programs running on one or more of the devices in which the Plasma constructs (e.g., pools, proteins, and slaw) are used to allow influence or control the characteristics of state information produced and placed in that process pool, under an additional alternative embodiment. In this system example, the inspection program of device C can for example request that programs (e.g., program P-A, program P-B, etc.) dump more state than normal into the pool, either for a single instant or for a particular duration. Or, prefiguring the next 'level' of debug communication, an interested program can request that programs (e.g., program P-A, program P-B, etc.) emit a protein listing the objects extant in its runtime environment that are individually capable of and available for interaction via the debug pool. Thus informed, the interested program can 'address' individuals among the objects in the programs runtime, placing proteins in the process pool that a particular object alone will take up and respond to. The interested program might, for example, request that an object emit a report protein describing the instantaneous values of all its component variables. Even more significantly, the interested program can, via other proteins, direct an object to change its behavior or its variables' values.

More specifically, in this example, inspection application of device C places into the pool a request (in the form of a protein) for an object list (e.g., "Request-Object List") that is then extracted by each device (e.g., device A, device B, etc.) coupled to the pool. In response to the request, each device (e.g., device A, device B, etc.) places into the pool a protein (e.g., protein 1A, protein 1B, etc.) listing the objects extant in its runtime environment that are individually capable of and available for interaction via the debug pool.

Thus informed via the listing from the devices, and in response to the listing of the objects, the inspection application of device C addresses individuals among the objects in the programs runtime, placing proteins in the process pool that a particular object alone will take up and respond to. The inspection application of device C can, for example, place a request protein (e.g., protein "Request Report P-A-O", "Request Report P-B-O") in the pool that an object (e.g., object P-A-O, object P-B-O, respectively) emit a report protein (e.g., protein 2A, protein 2B, etc.) describing the instantaneous values of all its component variables. Each object (e.g., object P-A-O, object P-B-O) extracts its request (e.g., protein "Request Report P-A-O", "Request Report P-B-O", respectively) and, in response, places a protein into the pool that includes the requested report (e.g., protein 2A, protein 2B, respectively). Device C then extracts the various report proteins (e.g., protein 2A, protein 2B, etc.) and takes subsequent processing action as appropriate to the contents of the reports.

In this way, use of Plasma as an interchange medium tends ultimately to erode the distinction between debugging, process control, and program-to-program communication and coordination.

To that last, the generalized Plasma framework allows visualization and analysis programs to be designed in a loosely-coupled fashion. A visualization tool that displays memory access patterns, for example, might be used in conjunction with any program that outputs its basic memory reads and writes to a pool. The programs undergoing analysis need not know of the existence or design of the visualization tool, and vice versa.

The use of pools in the manners described above does not unduly affect system performance. For example, embodiments have allowed for depositing of several hundred thousand proteins per second in a pool, so that enabling even relatively verbose data output does not noticeably inhibit the responsiveness or interactive character of most programs.

Embodiments described herein include a method comprising receiving via an optical detector gesture data that is absolute three-space data of an instantaneous state of a body at a point in time and space. The method comprises at least one of generating an estimated orientation of the body using an appendage of the body and tracking the body using at least one of the estimated orientation and the gesture data.

Embodiments described herein include a method comprising: receiving via an optical detector gesture data that is absolute three-space data of an instantaneous state of a body at a point in time and space; and at least one of generating an estimated orientation of the body using an appendage of the body and tracking the body using at least one of the estimated orientation and the gesture data.

The method of an embodiment comprises detecting the appendage of the body and identifying a segment of the appendage using the gesture data.

The method of an embodiment comprises detecting the appendage of the body by discriminating between at least one first pixel region that includes the appendage and at least one second pixel region from which the appendage is absent.

The optical detector of an embodiment comprises a video detector outputting a plurality of video frames comprising the gesture data.

The method of an embodiment comprises converting each video frame into a binary image.

The method of an embodiment comprises pre-processing each video frame of the plurality of video frames, the pre-processing comprising the detecting of the appendage and the identifying of the segment of the appendage.

The method of an embodiment comprises generating an estimated orientation of the body using data of the segment.

The method of an embodiment comprises comparing each video frame of the plurality of video frames to a background model.

The method of an embodiment comprises generating the background model by computing an adapting running average of the plurality of video frames.

The method of an embodiment comprises converting the background model into a background binary image.

The method of an embodiment comprises calculating for each pixel of the video frame a pixel value difference between a first pixel value of the respective pixel of the video frame and a second pixel value of each respective corresponding pixel of the background model.

The method of an embodiment comprises generating marked pixels by marking each pixel of the video frame for which the pixel value difference exceeds a threshold value.

The method of an embodiment comprises generating a foreground image comprising the marked pixels.

The method of an embodiment comprises extracting at least one feature from the gesture data, wherein the at least one feature comprises at least one pixel of the foreground image.

The detecting of an embodiment comprises applying the at least one feature to a plurality of filters in turn, and identifying the at least one feature as including the appendage when the at least one feature is accepted by all filters of the plurality of filters.

The at least one feature of an embodiment comprises at least one box, wherein the at least one box is specified using a plurality of coordinates within at least one query region of the gesture data.

The method of an embodiment comprises specifying the at least one box using an upper-left coordinate and a lower-right coordinate of the at least one box.

The at least one box of an embodiment is characterized by a number of pixels of the at least one foreground image.

The at least one feature of an embodiment comprises at least one ring, wherein the at least one ring is an unfilled rectangle region within a box.

The detecting of an embodiment comprises applying the at least one feature to a plurality of filters in turn, and identifying the at least one feature as including the appendage when the at least one feature is accepted by all filters of the plurality of filters.

The appendage of an embodiment comprises a fingertip.

The body of an embodiment comprises a finger.

The body of an embodiment comprises a hand.

The body of an embodiment comprises an arm.

The method of an embodiment comprises, for each detected instance of the appendage, generating a body prediction corresponding to the appendage.

The body prediction of an embodiment comprises a predicted position corresponding to the appendage.

The body prediction of an embodiment comprises the estimated orientation corresponding to the detected region.

The method of an embodiment comprises generating a body prediction list and storing the body prediction in the body prediction list, wherein the body prediction list comprises a plurality of body predictions.

The method of an embodiment comprises generating an edge image for the video frame.

The generating of the edge image of an embodiment is provided by an edge detector.

The method of an embodiment comprises generating an edge orientation image for each edge pixel of the edge image.

The generating of the edge orientation image of an embodiment comprises calculating an angle implied by local partial derivatives.

The method of an embodiment comprises, when tracking of the body is in progress, generating a predicted estimate for the body prediction using a previous estimate of the body prediction from at least one previous video frame.

The method of an embodiment comprises, when tracking of a plurality of body hypotheses is in progress, generating for each body hypothesis a predicted estimate for the body prediction using a previous estimate of the body prediction from at least one previous video frame.

The method of an embodiment comprises removing from the body prediction list duplicates of the body predictions corresponding to the video frame.

The method of an embodiment comprises, for each predicted estimate, identifying a best parameter value.

The method of an embodiment comprises identifying the best parameter value using particle swarm optimization.

The method of an embodiment comprises identifying the best parameter value using a set of body models.

The set of body models of an embodiment comprises a set of hand models.

The method of an embodiment comprises generating the set of hand models by creating a contour that matches a shape of a hand in each pose of a plurality of poses.

The method of an embodiment comprises representing the contour using a quadratic b-spline.

The best parameter value of an embodiment comprises at least one parameter value of a body prediction that best matches a body model of the set of body models, wherein the body prediction corresponds to the gesture data.

The best parameter value of an embodiment comprises at least one of position, scale, and orientation.

The best parameter value of an embodiment comprises position.

The best parameter value of an embodiment comprises scale.

The best parameter value of an embodiment comprises orientation.

The method of an embodiment comprises, for each parameter value, updating control points of a hand spline of the body model.

The updating of an embodiment comprises updating via at least one of translation, scaling, and rotation.

The updating of an embodiment comprises updating via translation.

The updating of an embodiment comprises updating via scaling.

The updating of an embodiment comprises updating via rotation.

The method of an embodiment comprises sampling along the hand spline.

The method of an embodiment comprises comparing local contour orientation of the hand spline to oriented edges of the edge orientation image of the video frame.

The method of an embodiment comprises comparing by searching along a normal of the hand spline for a closest edge with a matching orientation to the body prediction.

The method of an embodiment comprises updating the plurality of predicted estimates using the best parameter values.

The method of an embodiment comprises reporting as a current body location a highest scoring predicted estimate when the highest scoring predicted estimate exceeds a threshold.

The method of an embodiment comprises reporting absence of a body in a corresponding frame when the highest scoring predicted estimate when the highest scoring predicted estimates is less than the threshold.

The method of an embodiment comprises detecting a gesture of the body using the gesture data.

The gesture of an embodiment comprises at least one of poses and motion of the body.

The method of an embodiment comprises translating the gesture into a gesture signal using a gesture notation.

The method of an embodiment comprises controlling a component coupled to a computer using the gesture signal.

The method of an embodiment comprises identifying the gesture, wherein the identifying includes identifying a pose and an orientation of a portion of the body.

The detecting of an embodiment comprises generating three-dimensional space point data representing the gesture and labeling the space point data.

The translating of an embodiment includes translating the space point data into commands appropriate to a configuration of the computer.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The method of an embodiment comprises assigning each position in the string to the appendage.

The method of an embodiment comprises assigning characters of a plurality of characters to each of a plurality of positions of the appendage.

The plurality of positions of an embodiment is established relative to a coordinate origin.

The method of an embodiment comprises establishing the coordinate origin using a position selected from a group consisting of an absolute position and orientation in space, a fixed position and orientation relative to the body irrespective of an overall position and heading of the body, and interactively in response to an action of the body.

The method of an embodiment comprises assigning characters of the plurality of characters to each of a plurality of orientations of the appendage.

Controlling the component of an embodiment comprises controlling a three-space object in six degrees of freedom simultaneously by mapping the gesture of the appendage to the three-space object.

Controlling the component of an embodiment comprises controlling a three-space object through three translational degrees of freedom and three rotational degrees of freedom.

The three-space object of an embodiment is presented on a display device coupled to the computer.

The three-space object of an embodiment is coupled to the computer.

The detecting of an embodiment comprises detecting when an extrapolated position of the object intersects virtual space, wherein the virtual space comprises space depicted on a display device coupled to the computer.

Controlling the component of an embodiment comprises controlling a virtual object in the virtual space when the extrapolated position intersects the virtual object.

The method of an embodiment comprises controlling scaling of the detecting and controlling to generate coincidence between virtual space and physical space, wherein the virtual space comprises space depicted on a display device coupled to the computer, wherein the physical space comprises space inhabited by the body.

The method of an embodiment comprises determining dimensions, orientations, and positions in the physical space of a display device coupled to the computer.

The method of an embodiment comprises dynamically mapping the physical space in which the display device is located as a projection into the virtual space of at least one application coupled to the computer.

The method of an embodiment comprises translating scale, angle, depth, and dimension between the virtual space and the physical space as appropriate to at least one application coupled to the computer.

The method of an embodiment comprises controlling at least one virtual object in the virtual space in response to movement of at least one physical object in the physical space.

The method of an embodiment comprises controlling rendering of graphics on the display device in response to position of the body in physical space relative to position of the display device.

Embodiments described herein include a method comprising receiving via an optical detector gesture data that is absolute three-space data of an instantaneous state of a body at a point in time and space. The method comprises detecting an appendage of the body and identifying a region of the appendage using the gesture data. The method comprises at least one of generating an estimated orientation of the body using the appendage and tracking the body using at least one of the estimated orientation and the gesture data.

Embodiments described herein include a method comprising: receiving via an optical detector gesture data that is absolute three-space data of an instantaneous state of a body at a point in time and space; detecting an appendage of the body and identifying a region of the appendage using the gesture data; and at least one of generating an estimated orientation of the body using the appendage and tracking the body using at least one of the estimated orientation and the gesture data.

The optical detector of an embodiment comprises a video detector outputting a plurality of video frames comprising the gesture data.

The method of an embodiment comprises detecting motion in the plurality of video frames.

The method of an embodiment comprises detecting the appendage by discriminating between at least one first pixel region of a video frame that includes the appendage and at least one second pixel region of the video frame from which the appendage is absent.

The method of an embodiment comprises detecting edge pixels of the video frame.

The method of an embodiment comprises generating an edge image for the video frame.

The method of an embodiment comprises generating an edge orientation image for each edge pixel of the edge image.

The generating of the edge orientation image of an embodiment comprises calculating an angle implied by local partial derivatives of the video frame.

The method of an embodiment comprises generating a body prediction using tracking data when the tracking data is available.

The method of an embodiment comprises generating a body prediction using at least one of the edge pixels, the edge orientation image, and the appendage.

The method of an embodiment comprises detecting the body by comparing the body prediction to a set of body models.

The method of an embodiment comprises tracking the body.

The method of an embodiment comprises detecting a gesture of the body using the gesture data.

The gesture of an embodiment comprises at least one of poses and motion of the body.

The method of an embodiment comprises translating the gesture into a gesture signal using a gesture notation.

The method of an embodiment comprises controlling a computer application using the gesture signal.

Embodiments described herein include a method comprising receiving via an optical detector gesture data that is absolute three-space data of an instantaneous state of the body at a point in time and space. The method comprises detecting a segment of an appendage of the body and generating an estimated orientation of the body using the segment. The method comprises tracking the body using at least one of estimated orientation and the gesture data.

Embodiments described herein include a method comprising: receiving via an optical detector gesture data that is absolute three-space data of an instantaneous state of the body at a point in time and space; detecting a segment of an appendage of the body and generating an estimated orientation of the body using the segment; and tracking the body using at least one of estimated orientation and the gesture data.

Embodiments described herein include a method comprising receiving via an optical detector gesture data that is absolute three-space data of an instantaneous state of the body at a point in time and space. The method comprises detecting an appendage of the body and identifying a segment of the appendage using the gesture data. The method comprises generating an estimated orientation of the body using data of the segment. The method comprises tracking the body using at least one of the estimated orientation and the gesture data.

Embodiments described herein include a method comprising: receiving via an optical detector gesture data that is absolute three-space data of an instantaneous state of the body at a point in time and space; detecting an appendage of the body and identifying a segment of the appendage using the gesture data; generating an estimated orientation of the body using data of the segment; and tracking the body using at least one of the estimated orientation and the gesture data.

Embodiments described herein include a method comprising detecting a gesture of a body from gesture data received via an optical detector. The gesture data is absolute three-space location data of an instantaneous state of the body at a point in time and space. The detecting comprises detecting a segment of an appendage of the body and generating an estimated orientation of the body using the segment. The method comprises tracking the body using at least one of the estimated orientation and the gesture data and, while tracking, identifying the gesture using the gesture data. The method comprises generating a gesture signal that represents the gesture and providing the gesture signal as a control signal.

Embodiments described herein include a method comprising: detecting a gesture of a body from gesture data received via an optical detector, wherein the gesture data is absolute three-space location data of an instantaneous state of the body at a point in time and space, the detecting comprising detecting a segment of an appendage of the body and generating an estimated orientation of the body using the segment; tracking the body using at least one of the estimated orientation and the gesture data and, while tracking, identifying the gesture using the gesture data; and generating a gesture signal that represents the gesture and providing the gesture signal as a control signal.

Embodiments described herein include a method comprising receiving via an optical detector gesture data that is absolute three-space data of an instantaneous state of a body at a point in time and space. The method comprises at least one of generating an estimated orientation of the body using an appendage of the body and tracking the body using at least one of the estimated orientation and the gesture data. The method comprises detecting and identifying a gesture of the body using the gesture data, and translating the gesture to a gesture signal. The method comprises controlling a component coupled to a computer in response to the gesture signal.

Embodiments described herein include a method comprising: receiving via an optical detector gesture data that is absolute three-space data of an instantaneous state of a body at a point in time and space; at least one of generating an estimated orientation of the body using an appendage of the body and tracking the body using at least one of the estimated orientation and the gesture data; detecting and identifying a gesture of the body using the gesture data, and translating the gesture to a gesture signal; and controlling a component coupled to a computer in response to the gesture signal.

Embodiments described herein include a method comprising receiving via an optical detector gesture data that is absolute three-space data of an instantaneous state of the body at a point in time and space. The method comprises detecting an appendage of the body and identifying a segment of the appendage using the gesture data, and determining an orientation of the body using the segment. The method comprises tracking the body using at least one of the orientation and the gesture data. The method comprises detecting and identifying a gesture of the body using only the gesture data. The method comprises translating the gesture to a gesture signal. The method comprises controlling a computer component using the gesture signal.

Embodiments described herein include a method comprising: receiving via an optical detector gesture data that is absolute three-space data of an instantaneous state of the body at a point in time and space; detecting an appendage of the body and identifying a segment of the appendage using the gesture data, and determining an orientation of the body using the segment; tracking the body using at least one of the orientation and the gesture data; detecting and identifying a gesture of the body using only the gesture data; translating the gesture to a gesture signal; and controlling a computer component using the gesture signal.

Embodiments described herein include a system comprising at least one optical detector coupled to a processor executing a gesture component. The at least one optical detector images a body and receives gesture data that is absolute three-space data of an instantaneous state of the body at a point in time and space. The gesture component at least one of determines an orientation of the body using an appendage of the body and tracks the body using at least one of the orientation and the gesture data.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component at least one of determines an orientation of the body using an appendage of the body and tracks the body using at least one of the orientation and the gesture data.

The gesture component of an embodiment detects the appendage of the body and identifies a segment of the appendage using the gesture data.

The gesture component of an embodiment detects the appendage of the body by discriminating between at least one first pixel region that includes the appendage and at least one second pixel region from which the appendage is absent.

The optical detector of an embodiment comprises a video detector outputting a plurality of video frames comprising the gesture data.

The system of an embodiment comprises converting each video frame into a binary image.

The system of an embodiment comprises pre-processing each video frame of the plurality of video frames, the pre-processing comprising the detecting of the appendage and the identifying of the segment of the appendage.

The gesture component of an embodiment generates an estimated orientation of the body using data of the segment.

The gesture component of an embodiment compares each video frame of the plurality of video frames to a background model.

The gesture component of an embodiment generates the background model by computing an adapting running average of the plurality of video frames.

The gesture component of an embodiment converts the background model into a background binary image.

The gesture component of an embodiment calculates for each pixel of the video frame a pixel value difference between a first pixel value of the respective pixel of the video frame and a second pixel value of each respective corresponding pixel of the background model.

The gesture component of an embodiment generates marked pixels by marking each pixel of the video frame for which the pixel value difference exceeds a threshold value.

The gesture component of an embodiment generates a foreground image comprising the marked pixels.

The gesture component of an embodiment extracts at least one feature from the gesture data, wherein the at least one feature comprises at least one pixel of the foreground image.

The detecting of an embodiment comprises applying the at least one feature to a plurality of filters in turn, and identifying the at least one feature as including the appendage when the at least one feature is accepted by all filters of the plurality of filters.

The at least one feature of an embodiment comprises at least one box, wherein the at least one box is specified using a plurality of coordinates within at least one query region of the gesture data.

The gesture component of an embodiment specifies the at least one box using an upper-left coordinate and a lower-right coordinate of the at least one box.

The at least one box of an embodiment is characterized by a number of pixels of the at least one foreground image.

The at least one feature of an embodiment comprises at least one ring, wherein the at least one ring is an unfilled rectangle region within a box.

The gesture component of an embodiment applies the at least one feature to a plurality of filters in turn, and identifies the at least one feature as including the appendage when the at least one feature is accepted by all filters of the plurality of filters.

The appendage of an embodiment comprises a fingertip.

The body of an embodiment comprises a finger.

The body of an embodiment comprises a hand.

The body of an embodiment comprises an arm.

The gesture component of an embodiment, for each detected instance of the appendage, generates a body prediction corresponding to the appendage.

The body prediction of an embodiment comprises a predicted position corresponding to the appendage.

The body prediction of an embodiment comprises the estimated orientation corresponding to the detected region.

The gesture component of an embodiment generates a body prediction list and includes the body prediction in the body prediction list, wherein the body prediction list comprises a plurality of body predictions.

The gesture component of an embodiment generates an edge image for the video frame.

The generating of the edge image of an embodiment is provided by an edge detector.

The gesture component of an embodiment generates an edge orientation image for each edge pixel of the edge image.

The generating of the edge orientation image of an embodiment comprises calculating an angle implied by local partial derivatives.

The gesture component of an embodiment, when tracking of the body is in progress, generates a predicted estimate for the body prediction using a previous estimate of the body prediction from at least one previous video frame.

The gesture component of an embodiment, when tracking of a plurality of body hypotheses is in progress, generates for each body hypothesis a predicted estimate for the body prediction using a previous estimate of the body prediction from at least one previous video frame.

The gesture component of an embodiment removes from the body prediction list duplicates of the body predictions corresponding to the video frame.

The gesture component of an embodiment, for each predicted estimate, identifies a best parameter value.

The gesture component of an embodiment identifies the best parameter value using particle swarm optimization.

The gesture component of an embodiment identifies the best parameter value using a set of body models.

The set of body models of an embodiment comprises a set of hand models.

The system of an embodiment comprises generating the set of hand models by creating a contour that matches a shape of a hand in each pose of a plurality of poses.

The system of an embodiment comprises representing the contour using a quadratic b-spline.

The best parameter value of an embodiment comprises at least one parameter value of a body prediction that best matches a body model of the set of body models, wherein the body prediction corresponds to the gesture data.

The best parameter value of an embodiment comprises at least one of position, scale, and orientation.

The best parameter value of an embodiment comprises position.

The best parameter value of an embodiment comprises scale.

The best parameter value of an embodiment comprises orientation.

The gesture component of an embodiment, for each parameter value, updates control points of a hand spline of the body model.

The updating of an embodiment comprises updating via at least one of translation, scaling, and rotation.

The updating of an embodiment comprises updating via translation.

The updating of an embodiment comprises updating via scaling.

The updating of an embodiment comprises updating via rotation.

The system of an embodiment comprises sampling along the hand spline.

The gesture component of an embodiment compares local contour orientation of the hand spline to oriented edges of the edge orientation image of the video frame.

The gesture component of an embodiment compares by searching along a normal of the hand spline for a closest edge with a matching orientation to the body prediction.

The gesture component of an embodiment updates the plurality of predicted estimates using the best parameter values.

The gesture component of an embodiment reports as a current body location a highest scoring predicted estimate when the highest scoring predicted estimate exceeds a threshold.

The gesture component of an embodiment reports absence of a body in a corresponding frame when the highest scoring predicted estimate when the highest scoring predicted estimates is less than the threshold.

The gesture component of an embodiment detects a gesture of the body using the gesture data.

The gesture of an embodiment comprises at least one of poses and motion of the body.

The gesture component of an embodiment translates the gesture into a gesture signal using a gesture notation.

The gesture component of an embodiment controls a component coupled to a computer using the gesture signal.

The gesture component of an embodiment identifies the gesture, wherein the identifying includes identifying a pose and an orientation of a portion of the body.

The detecting of an embodiment comprises generating three-dimensional space point data representing the gesture and labeling the space point data.

The translating of an embodiment includes translating the space point data into commands appropriate to a configuration of the computer.

The translating of an embodiment comprises translating information of the gesture to a gesture notation.

The gesture notation of an embodiment represents a gesture vocabulary, and the gesture signal comprises communications of the gesture vocabulary.

The gesture vocabulary of an embodiment represents in textual form instantaneous pose states of kinematic linkages of the body.

The gesture vocabulary of an embodiment represents in textual form an orientation of kinematic linkages of the body.

The gesture vocabulary of an embodiment represents in textual form a combination of orientations of kinematic linkages of the body.

The gesture vocabulary of an embodiment includes a string of characters that represent a state of kinematic linkages of the body.

The gesture component of an embodiment assigns each position in the string to the appendage.

The gesture component of an embodiment assigns characters of a plurality of characters to each of a plurality of positions of the appendage.

The plurality of positions of an embodiment are established relative to a coordinate origin.

The gesture component of an embodiment establishes the coordinate origin using a position selected from a group consisting of an absolute position and orientation in space, a fixed position and orientation relative to the body irrespective of an overall position and heading of the body, and interactively in response to an action of the body.

The gesture component of an embodiment assigns characters of the plurality of characters to each of a plurality of orientations of the appendage.

Controlling the component of an embodiment comprises controlling a three-space object in six degrees of freedom simultaneously by mapping the gesture of the appendage to the three-space object.

Controlling the component of an embodiment comprises controlling a three-space object through three translational degrees of freedom and three rotational degrees of freedom.

The three-space object of an embodiment is presented on a display device coupled to the computer.

The three-space object of an embodiment is coupled to the computer.

The detecting of an embodiment comprises detecting when an extrapolated position of the object intersects virtual space, wherein the virtual space comprises space depicted on a display device coupled to the computer.

Controlling the component of an embodiment comprises controlling a virtual object in the virtual space when the extrapolated position intersects the virtual object.

The system of an embodiment comprises controlling scaling of the detecting and controlling to generate coincidence between virtual space and physical space, wherein the virtual space comprises space depicted on a display device coupled to the computer, wherein the physical space comprises space inhabited by the body.

The system of an embodiment comprises determining dimensions, orientations, and positions in the physical space of a display device coupled to the computer.

The system of an embodiment comprises dynamically mapping the physical space in which the display device is located as a projection into the virtual space of at least one application coupled to the computer.

The system of an embodiment comprises translating scale, angle, depth, and dimension between the virtual space and the physical space as appropriate to at least one application coupled to the computer.

The system of an embodiment comprises controlling at least one virtual object in the virtual space in response to movement of at least one physical object in the physical space.

The system of an embodiment comprises controlling rendering of graphics on the display device in response to position of the body in physical space relative to position of the display device.

Embodiments described herein include a system comprising at least one optical detector coupled to a processor executing a gesture component. The at least one optical detector images a body and receives gesture data that is absolute three-space data of an instantaneous state of the body at a point in time and space. The at least one gesture component detects an appendage of the body and identifies a region of the appendage using the gesture data. The at least one gesture component at least one of generates an estimated orientation of the body using the appendage and tracks the body using at least one of the estimated orientation and the gesture data.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the at least one gesture component detects an appendage of the body and identifies a region of the appendage using the gesture data; and wherein the at least one gesture component at least one of generates an estimated orientation of the body using the appendage and tracks the body using at least one of the estimated orientation and the gesture data.

The optical detector of an embodiment comprises a video detector outputting a plurality of video frames comprising the gesture data.

The at least one gesture component of an embodiment detects motion in the plurality of video frames.

The at least one gesture component of an embodiment detects the appendage by discriminating between at least one first pixel region of a video frame that includes the appendage and at least one second pixel region of the video frame from which the appendage is absent.

The at least one gesture component of an embodiment detects edge pixels of the video frame.

The at least one gesture component of an embodiment generates an edge image for the video frame.

The at least one gesture component of an embodiment generates an edge orientation image for each edge pixel of the edge image.

The generating of the edge orientation image of an embodiment comprises calculating an angle implied by local partial derivatives of the video frame.

The at least one gesture component of an embodiment generates a body prediction using tracking data when the tracking data is available.

The at least one gesture component of an embodiment generates a body prediction using at least one of the edge pixels, the edge orientation image, and the appendage.

The at least one gesture component of an embodiment detects the body by comparing the body prediction to a set of body models.

The at least one gesture component of an embodiment tracks the body.

The at least one gesture component of an embodiment detects a gesture of the body using the gesture data.

The gesture of an embodiment comprises at least one of poses and motion of the body.

The at least one gesture component of an embodiment translates the gesture into a gesture signal using a gesture notation.

The at least one gesture component of an embodiment controls a computer application using the gesture signal.

Embodiments described herein include a system comprising at least one optical detector coupled to a processor executing a gesture component. The at least one optical detector images a body and receives gesture data that is absolute three-space data of an instantaneous state of the body at a point in time and space. The gesture component detects a segment of an appendage of the body and determines an orientation of the body using the segment. The gesture component tracks the body using at least one of the orientation and the gesture data.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component detects a segment of an appendage of the body and determines an orientation of the body using the segment; wherein the gesture component tracks the body using at least one of the orientation and the gesture data.

Embodiments described herein include a system comprising at least one optical detector coupled to a processor executing a gesture component. The at least one optical detector images a body and receives gesture data that is absolute three-space data of an instantaneous state of the body at a point in time and space. The gesture component detects an appendage of the body and identifies a segment of the appendage using the gesture data. The gesture component determines an orientation of the body using data of the segment. The gesture component tracks the body using at least one of the orientation and the gesture data.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component detects an appendage of the body and identifies a segment of the appendage using the gesture data; wherein the gesture component determines an orientation of the body using data of the segment; wherein the gesture component tracks the body using at least one of the orientation and the gesture data.

Embodiments described herein include a system comprising at least one optical detector coupled to a processor executing a gesture component. The at least one optical detector images a body and receives gesture data that is absolute three-space data of an instantaneous state of the body at a point in time and space. The gesture component detects a gesture of a body from the gesture data by detecting a segment of an appendage of the body and determining an orientation of the body using the segment. The gesture component tracks the body using at least one of the orientation and the gesture data and, while tracking, identifies the gesture using the gesture data. The gesture component generates a gesture signal that represents the gesture and provides the gesture signal as a control signal.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component detects a gesture of a body from the gesture data by detecting a segment of an appendage of the body and determining an orientation of the body using the segment; wherein the gesture component tracks the body using at least one of the orientation and the gesture data and, while tracking, identifies the gesture using the gesture data; and wherein the gesture component generates a gesture signal that represents the gesture and provides the gesture signal as a control signal.

Embodiments described herein include a system comprising at least one optical detector coupled to a processor executing a gesture component. The at least one optical detector images a body and receives gesture data that is absolute three-space data of an instantaneous state of the body at a point in time and space. The gesture component at least one of generates an estimated orientation of the body using an appendage of the body and tracks the body using at least one of the estimated orientation and the gesture data. The gesture component detects and identifies a gesture of the body using the gesture data, and translates the gesture to a gesture signal. The gesture component controls a component coupled to a computer in response to the gesture signal.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component at least one of generates an estimated orientation of the body using an appendage of the body and tracks the body using at least one of the estimated orientation and the gesture data; wherein the gesture component detects and identifies a gesture of the body using the gesture data, and translates the gesture to a gesture signal; and wherein the gesture component controls a component coupled to a computer in response to the gesture signal.

Embodiments described herein include a system comprising at least one optical detector coupled to a processor executing a gesture component. The at least one optical detector images a body and receives gesture data that is absolute three-space data of an instantaneous state of the body at a point in time and space. The gesture component detects an appendage of the body and identifies a segment of the appendage using the gesture data, and determines an orientation of the body using the segment. The gesture component tracks the body using at least one of the orientation and the gesture data. The gesture component detects and identifies a gesture of the body using only the gesture data. The gesture component translates the gesture to a gesture signal. The gesture component controls a computer component using the gesture signal.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component detects an appendage of the body and identifies a segment of the appendage using the gesture data, and determines an orientation of the body using the segment; wherein the gesture component tracks the body using at least one of the orientation and the gesture data; wherein the gesture component detects and identifies a gesture of the body using only the gesture data; wherein the gesture component translates the gesture to a gesture signal; and wherein the gesture component controls a computer component using the gesture signal.

Embodiments described herein include a system comprising at least one optical detector coupled to a processor executing a gesture component. The at least one optical detector images a body and receives gesture data that is absolute three-space data of an instantaneous state of the body at a point in time and space. The gesture component detects a segment of an appendage of the body and determines an orientation of the body using the segment. The gesture component tracks the body using at least one of the orientation and the gesture data.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component detects a segment of an appendage of the body and determines an orientation of the body using the segment; wherein the gesture component tracks the body using at least one of the orientation and the gesture data.

Embodiments described herein include a system comprising at least one optical detector coupled to a processor executing a gesture component. The at least one optical detector images a body and receives gesture data that is absolute three-space data of an instantaneous state of the body at a point in time and space. The gesture component at least one of determines an orientation of the body using an appendage of the body and tracks the body using at least one of the orientation and the gesture data. The gesture component detects and identifies a gesture of the body using the gesture data. The gesture component translates the gesture to a gesture signal and controls a computer component using the gesture signal.

Embodiments described herein include a system comprising: at least one optical detector coupled to a processor executing a gesture component; wherein the at least one optical detector images a body and receives gesture data that is absolute three-space data of an instantaneous state of the body at a point in time and space; wherein the gesture component at least one of determines an orientation of the body using an appendage of the body and tracks the body using at least one of the orientation and the gesture data; wherein the gesture component detects and identifies a gesture of the body using the gesture data; and wherein the gesture component translates the gesture to a gesture signal and controls a computer component using the gesture signal.

The systems and methods described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, cellular telephones, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components of a host system, and/or provided by some combination of algorithms. The methods described herein can be implemented in one or more of software algorithm(s), programs, firmware, hardware, components, circuitry, in any combination.

System components embodying the systems and methods described herein can be located together or in separate locations. Consequently, system components embodying the systems and methods described herein can be components of a single system, multiple systems, and/or geographically separate systems. These components can also be subcomponents or subsystems of a single system, multiple systems, and/or geographically separate systems. These components can be coupled to one or more other components of a host system or a system coupled to the host system.

Communication paths couple the system components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the processing environment is not intended to be exhaustive or to limit the systems and methods described to the precise form disclosed. While specific embodiments of, and examples for, the processing environment are described herein for illustrative purposes, various equivalent modifications are possible within the scope of other systems and methods, as those skilled in the relevant art will recognize. The teachings of the processing environment provided herein can be applied to other processing systems and methods, not only for the systems and methods described above.

The elements and acts of the various embodiments described above can be combined to provide further embodiments. These and other changes can be made to the processing environment in light of the above detailed description.

What is claimed is:

1. A system comprising:
   at least one optical detector coupled to a processor executing a gesture component;
   wherein the at least one optical detector images a body and receives gesture data that is absolute three-space data of an instantaneous state of the body at a point in time and space;
   wherein the gesture component detects an appendage of the body and identifies a segment of the appendage using the gesture data, and determines an orientation of the body using the segment;
   wherein the gesture component tracks the body using at least one of the orientation and the gesture data;
   wherein the gesture component detects and identifies a gesture of the body using only the gesture data;
   wherein the gesture component translates the gesture to a gesture signal; and
   wherein the gesture component controls a computer component using the gesture signal.

2. A system comprising:
   at least one optical detector coupled to a processor executing a gesture component;
   wherein the at least one optical detector images a body and receives gesture data that is absolute three-space data of an instantaneous state of the body at a point in time and space;
   wherein the gesture component detects a gesture of a body from the gesture data by detecting a segment of an appendage of the body and determining an orientation of the body using the segment;
   wherein the gesture component tracks the body using at least one of the orientation and the gesture data and, while tracking, identifies the gesture using the gesture data; and
   wherein the gesture component generates a gesture signal that represents the gesture and provides the gesture signal as a control signal.

3. A system comprising:
   at least one optical detector coupled to a processor executing a gesture component;
   wherein the at least one optical detector images a body and receives gesture data that is absolute three-space data of an instantaneous state of the body at a point in time and space;
   wherein the gesture component at least one of generates an estimated orientation of the body using an appendage of the body and tracks the body using at least one of the estimated orientation and the gesture data;

wherein the gesture component detects and identifies a gesture of the body using the gesture data, and translates the gesture to a gesture signal; and wherein the gesture component controls a component coupled to a computer in response to the gesture signal.

4. A system comprising:

at least one optical detector coupled to a processor executing a gesture component;

wherein the at least one optical detector images a body and receives gesture data that is absolute three-space data of an instantaneous state of the body at a point in time and space;

wherein the gesture component at least one of determines an orientation of the body using an appendage of the body and tracks the body using at least one of the orientation and the gesture data;

wherein the gesture component detects and identifies a gesture of the body using the gesture data; and wherein the gesture component translates the gesture to a gesture signal and controls a computer component using the gesture signal.

5. A system comprising:

at least one optical detector coupled to a processor executing a gesture component;

wherein the at least one optical detector images a body and receives gesture data that is absolute three-space data of an instantaneous state of the body at a point in time and space;

wherein the gesture component detects a segment of an appendage of the body and determines an orientation of the body using the segment;

wherein the gesture component tracks the body using at least one of the orientation and the gesture data.

6. A system comprising:

at least one optical detector coupled to a processor executing a gesture component;

wherein the at least one optical detector images a body and receives gesture data that is absolute three-space data of an instantaneous state of the body at a point in time and space;

wherein the gesture component detects a segment of an appendage of the body and determines an orientation of the body using the segment;

wherein the gesture component tracks the body using at least one of the orientation and the gesture data.

7. A system comprising:

at least one optical detector coupled to a processor executing a gesture component;

wherein the at least one optical detector images a body and receives gesture data that is absolute three-space data of an instantaneous state of the body at a point in time and space;

wherein the gesture component detects an appendage of the body and identifies a segment of the appendage using the gesture data;

wherein the gesture component determines an orientation of the body using data of the segment;

wherein the gesture component tracks the body using at least one of the orientation and the gesture data.

8. A system comprising:

at least one optical detector coupled to a processor executing a gesture component;

wherein the at least one optical detector images a body and receives gesture data that is absolute three-space data of an instantaneous state of the body at a point in time and space;

wherein the at least one gesture component detects an appendage of the body and identifies a region of the appendage using the gesture data; and wherein the at least one gesture component at least one of generates an estimated orientation of the body using the appendage and tracks the body using at least one of the estimated orientation and the gesture data.

9. The system of claim 8, wherein the optical detector comprises a video detector outputting a plurality of video frames comprising the gesture data.

10. The system of claim 9, wherein the at least one gesture component detects motion in the plurality of video frames.

11. The system of claim 10, wherein the at least one gesture component detects the appendage by discriminating between at least one first pixel region of a video frame that includes the appendage and at least one second pixel region of the video frame from which the appendage is absent.

12. The system of claim 11, wherein the at least one gesture component detects edge pixels of the video frame.

13. The system of claim 12, wherein the at least one gesture component generates an edge image for the video frame.

14. The system of claim 13, wherein the at least one gesture component generates an edge orientation image for each edge pixel of the edge image.

15. The system of claim 14, wherein the generating of the edge orientation image comprises calculating an angle implied by local partial derivatives of the video frame.

16. The system of claim 14, wherein the at least one gesture component generates a body prediction using tracking data when the tracking data is available.

17. The system of claim 16, wherein the at least one gesture component generates a body prediction using at least one of the edge pixels, the edge orientation image, and the appendage.

18. The system of claim 17, wherein the at least one gesture component detects the body by comparing the body prediction to a set of body models.

19. The system of claim 18, wherein the at least one gesture component tracks the body.

20. The system of claim 19, wherein the at least one gesture component detects a gesture of the body using the gesture data.

21. The system of claim 20, wherein the gesture comprises at least one of poses and motion of the body.

22. The system of claim 20, wherein the at least one gesture component translates the gesture into a gesture signal using a gesture notation.

23. The system of claim 22, wherein the at least one gesture component controls a computer application using the gesture signal.

24. A system comprising:

at least one optical detector coupled to a processor executing a gesture component;

wherein the at least one optical detector images a body and receives gesture data that is absolute three-space data of an instantaneous state of the body at a point in time and space;

wherein the gesture component at least one of determines an orientation of the body using an appendage of the body and tracks the body using at least one of the orientation and the gesture data.

25. The system of claim 24, wherein the gesture component detects the appendage of the body and identifies a segment of the appendage using the gesture data.

26. The system of claim 25, wherein the gesture component detects the appendage of the body by discriminating between at least one first pixel region that includes the appendage and at least one second pixel region from which the appendage is absent.

27. The system of claim 25, wherein the optical detector comprises a video detector outputting a plurality of video frames comprising the gesture data.

28. The system of claim 27, comprising converting each video frame into a binary image.

29. The system of claim 27, comprising pre-processing each video frame of the plurality of video frames, the pre-processing comprising the detecting of the appendage and the identifying of the segment of the appendage.

30. The system of claim 29, wherein the gesture component generates an estimated orientation of the body using data of the segment.

31. The system of claim 27, wherein the gesture component compares each video frame of the plurality of video frames to a background model.

32. The system of claim 31, wherein the gesture component generates the background model by computing an adapting running average of the plurality of video frames.

33. The system of claim 32, wherein the gesture component converts the background model into a background binary image.

34. The system of claim 31, wherein the gesture component calculates for each pixel of the video frame a pixel value difference between a first pixel value of the respective pixel of the video frame and a second pixel value of each respective corresponding pixel of the background model.

35. The system of claim 34, wherein the gesture component generates marked pixels by marking each pixel of the video frame for which the pixel value difference exceeds a threshold value.

36. The system of claim 35, wherein the gesture component generates a foreground image comprising the marked pixels.

37. The system of claim 36, wherein the gesture component extracts at least one feature from the gesture data, wherein the at least one feature comprises at least one pixel of the foreground image.

38. The system of claim 37, wherein the detecting comprises applying the at least one feature to a plurality of filters in turn, and identifying the at least one feature as including the appendage when the at least one feature is accepted by all filters of the plurality of filters.

39. The system of claim 37, wherein the at least one feature comprises at least one box, wherein the at least one box is specified using a plurality of coordinates within at least one query region of the gesture data.

40. The system of claim 39, wherein the gesture component specifies the at least one box using an upper-left coordinate and a lower-right coordinate of the at least one box.

41. The system of claim 39, wherein the at least one box is characterized by a number of pixels of the at least one foreground image.

42. The system of claim 39, wherein the at least one feature comprises at least one ring, wherein the at least one ring is an unfilled rectangle region within a box.

43. The system of claim 42, wherein the gesture component applies the at least one feature to a plurality of filters in turn, and identifies the at least one feature as including the appendage when the at least one feature is accepted by all filters of the plurality of filters.

44. The system of claim 43, wherein the appendage comprises a fingertip.

45. The system of claim 44, wherein the body comprises a finger.

46. The system of claim 43, wherein the body comprises a hand.

47. The system of claim 43, wherein the body comprises an arm.

48. The system of claim 43, wherein the gesture component, for each detected instance of the appendage, generates a body prediction corresponding to the appendage.

49. The system of claim 48, wherein the body prediction comprises a predicted position corresponding to the appendage.

50. The system of claim 48, wherein the body prediction comprises the estimated orientation corresponding to the detected region.

51. The system of claim 48, wherein the gesture component generates a body prediction list and includes the body prediction in the body prediction list, wherein the body prediction list comprises a plurality of body predictions.

52. The system of claim 51, wherein the gesture component generates an edge image for the video frame.

53. The system of claim 52, wherein the generating of the edge image is provided by an edge detector.

54. The system of claim 52, wherein the gesture component generates an edge orientation image for each edge pixel of the edge image.

55. The system of claim 54, wherein the generating of the edge orientation image comprises calculating an angle implied by local partial derivatives.

56. The system of claim 54, wherein the gesture component, when tracking of the body is in progress, generates a predicted estimate for the body prediction using a previous estimate of the body prediction from at least one previous video frame.

57. The system of claim 56, wherein the gesture component, when tracking of a plurality of body hypotheses is in progress, generates for each body hypothesis a predicted estimate for the body prediction using a previous estimate of the body prediction from at least one previous video frame.

58. The system of claim 56, wherein the gesture component removes from the body prediction list duplicates of the body predictions corresponding to the video frame.

59. The system of claim 56, wherein the gesture component, for each predicted estimate, identifies a best parameter value.

60. The system of claim 59, wherein the gesture component identifies the best parameter value using particle swarm optimization.

61. The system of claim 59, wherein the gesture component identifies the best parameter value using a set of body models.

62. The system of claim 61, wherein the set of body models comprises a set of hand models.

63. The system of claim 61, comprising generating the set of hand models by creating a contour that matches a shape of a hand in each pose of a plurality of poses.

64. The system of claim 63, comprising representing the contour using a quadratic b-spline.

65. The system of claim 61, wherein the best parameter value comprises at least one parameter value of a body prediction that best matches a body model of the set of body models, wherein the body prediction corresponds to the gesture data.

66. The system of claim 65, wherein the best parameter value comprises at least one of position, scale, and orientation.

67. The system of claim 65, wherein the best parameter value comprises position.

68. The system of claim 65, wherein the best parameter value comprises scale.

69. The system of claim 65, wherein the best parameter value comprises orientation.

70. The system of claim 65, wherein the gesture component, for each parameter value, updates control points of a hand spline of the body model.

71. The system of claim 70, wherein the updating comprises updating via at least one of translation, scaling, and rotation.

72. The system of claim 70, wherein the updating comprises updating via translation.

73. The system of claim 70, wherein the updating comprises updating via scaling.

74. The system of claim 70, wherein the updating comprises updating via rotation.

75. The system of claim 70, comprising sampling along the hand spline.

76. The system of claim 75, wherein the gesture component compares local contour orientation of the hand spline to oriented edges of the edge orientation image of the video frame.

77. The system of claim 76, wherein the gesture component compares by searching along a normal of the hand spline for a closest edge with a matching orientation to the body prediction.

78. The system of claim 76, wherein the gesture component updates the plurality of predicted estimates using the best parameter values.

79. The system of claim 78, wherein the gesture component reports as a current body location a highest scoring predicted estimate when the highest scoring predicted estimate exceeds a threshold.

80. The system of claim 79, wherein the gesture component reports absence of a body in a corresponding frame when the highest scoring predicted estimate when the highest scoring predicted estimates is less than the threshold.

81. The system of claim 27, wherein the gesture component detects a gesture of the body using the gesture data.

82. The system of claim 81, wherein the gesture comprises at least one of poses and motion of the body.

83. The system of claim 81, wherein the gesture component translates the gesture into a gesture signal using a gesture notation.

84. The system of claim 83, wherein the gesture component controls a component coupled to a computer using the gesture signal.

85. The system of claim 84, wherein the gesture component identifies the gesture, wherein the identifying includes identifying a pose and an orientation of a portion of the body.

86. The system of claim 85, wherein the detecting comprises generating three-dimensional space point data representing the gesture and labeling the space point data.

87. The system of claim 86, wherein the translating includes translating the space point data into commands appropriate to a configuration of the computer.

88. The system of claim 84, wherein the translating comprises translating information of the gesture to a gesture notation.

89. The system of claim 88, wherein the gesture notation represents a gesture vocabulary, and the gesture signal comprises communications of the gesture vocabulary.

90. The system of claim 89, wherein the gesture vocabulary represents in textual form instantaneous pose states of kinematic linkages of the body.

91. The system of claim 89, wherein the gesture vocabulary represents in textual form an orientation of kinematic linkages of the body.

92. The system of claim 89, wherein the gesture vocabulary represents in textual form a combination of orientations of kinematic linkages of the body.

93. The system of claim 89, wherein the gesture vocabulary includes a string of characters that represent a state of kinematic linkages of the body.

94. The system of claim 93, wherein the gesture component assigns each position in the string to the appendage.

95. The system of claim 94, wherein the gesture component assigns characters of a plurality of characters to each of a plurality of positions of the appendage.

96. The system of claim 95, wherein the plurality of positions are established relative to a coordinate origin.

97. The system of claim 96, wherein the gesture component establishes the coordinate origin using a position selected from a group consisting of an absolute position and orientation in space, a fixed position and orientation relative to the body irrespective of an overall position and heading of the body, and interactively in response to an action of the body.

98. The system of claim 92, wherein the gesture component assigns characters of the plurality of characters to each of a plurality of orientations of the appendage.

99. The system of claim 84, wherein controlling the component comprises controlling a three-space object in six degrees of freedom simultaneously by mapping the gesture of the appendage to the three-space object.

100. The system of claim 84, wherein controlling the component comprises controlling a three-space object through three translational degrees of freedom and three rotational degrees of freedom.

101. The system of claim 100, wherein the three-space object is presented on a display device coupled to the computer.

102. The system of claim 100, wherein the three-space object is coupled to the computer.

103. The system of claim 100, wherein the detecting comprises detecting when an extrapolated position of the object intersects virtual space, wherein the virtual space comprises space depicted on a display device coupled to the computer.

104. The system of claim 103, wherein controlling the component comprises controlling a virtual object in the virtual space when the extrapolated position intersects the virtual object.

105. The system of claim 81, comprising controlling scaling of the detecting and controlling to generate coincidence between virtual space and physical space, wherein the virtual space comprises space depicted on a display device coupled to the computer, wherein the physical space comprises space inhabited by the body.

106. The system of claim 105, comprising determining dimensions, orientations, and positions in the physical space of a display device coupled to the computer.

107. The system of claim 106, comprising dynamically mapping the physical space in which the display device is located as a projection into the virtual space of at least one application coupled to the computer.

108. The system of claim 105, comprising translating scale, angle, depth, and dimension between the virtual space and the physical space as appropriate to at least one application coupled to the computer.

109. The system of claim 105, comprising controlling at least one virtual object in the virtual space in response to movement of at least one physical object in the physical space.

110. The system of claim 105, comprising controlling rendering of graphics on the display device in response to position of the body in physical space relative to position of the display device.

* * * * *